(12) United States Patent
Li et al.

(10) Patent No.: US 7,989,037 B2
(45) Date of Patent: Aug. 2, 2011

(54) COMPOSITION, RETARDATION PLATE, AND LIQUID-CRYSTAL DISPLAY DEVICE

(75) Inventors: Yi Li, Minami-ashigara (JP); Ichiro Nagata, Minami-ashigara (JP); Takafumi Hosokawa, Minami-ashigara (JP); Makoto Takahashi, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 832 days.

(21) Appl. No.: 11/905,817

(22) Filed: Oct. 4, 2007

(65) Prior Publication Data

US 2008/0090027 A1    Apr. 17, 2008

(30) Foreign Application Priority Data

Oct. 6, 2006 (JP) .................. 2006-274976

(51) Int. Cl.
C09K 19/38 (2006.01)
C09K 19/34 (2006.01)
C09K 19/30 (2006.01)
C09K 19/12 (2006.01)
C09K 19/20 (2006.01)
G02F 1/1335 (2006.01)

(52) U.S. Cl. . 428/1.1; 349/117; 252/299.5; 252/299.61; 252/299.62; 252/299.66; 252/299.67

(58) Field of Classification Search .................. 428/1.1; 349/117; 252/299.61, 299.5, 299.62, 299.67
See application file for complete search history.

(56) References Cited

U.S. PATENT DOCUMENTS

| | | | |
|---|---|---|---|
| 6,436,558 B1 | 8/2002 | Sato et al. | |
| 7,311,949 B2 * | 12/2007 | Yoshizawa et al. | 428/1.1 |
| 7,364,670 B2 * | 4/2008 | Nishikawa et al. | 252/299.01 |
| 7,431,971 B2 | 10/2008 | Nishikawa et al. | |
| 7,431,972 B2 | 10/2008 | Nagai et al. | |
| 2002/0037427 A1 | 3/2002 | Taguchi | |
| 2005/0056811 A1 * | 3/2005 | Nishikawa et al. | 252/299.01 |
| 2006/0035037 A1 * | 2/2006 | Yoshizawa et al. | 428/1.1 |
| 2006/0216440 A1 | 9/2006 | Nishikawa et al. | |
| 2008/0064879 A1 | 3/2008 | Takahashi et al. | |
| 2008/0113112 A1 | 5/2008 | Ikeda et al. | |
| 2008/0193679 A1 | 8/2008 | Nishikawa et al. | |

FOREIGN PATENT DOCUMENTS

| | | |
|---|---|---|
| DE | 102 34 188 A1 | 2/2004 |
| JP | 7-157473 A | 6/1995 |
| JP | 7-306317 A | 11/1995 |
| JP | 11-279165 A | 10/1999 |
| JP | 11-292848 A | 10/1999 |
| JP | 11-345686 A | 12/1999 |
| JP | 2000327924 A * | 11/2000 |
| JP | 2001-166147 A | 6/2001 |
| JP | 2002-20363 A | 1/2002 |
| JP | 2003-57817 A | 2/2003 |
| JP | 2003-138251 A | 5/2003 |
| JP | 2004-184864 A | 7/2004 |

OTHER PUBLICATIONS

English translation by computer for JP 2000-327924, http://www4.ipdl.inpit.go.jp/Tokujitu/PAJdetail.ipdl?N0000=60&N0120=01&N2001=2&N3001=2000-327924.*

Cherioux F et al., "Synthesis and characterization of an octupolar polymer and new molecular octupoles with off-resonant third order optical nonlinearities", Chemical Communications—Chemcon, Royal society of Chemistry, GB, No. 20, 1999, pp. 2083-2084, XP-002261155.

Cherioux F. et al., "Synthesis and Electrochemical Properties of new star-shaped thiophene oligomers and their polymers", Chemical Communications—Chemcom, Royal Society of Chemistry, GB, No. 20, 1998 pp. 2225-2226, XP-002261154.

J.B. Hynes et al., "Hydroxylamine Derivatives as Potential Antimalarial Agents, 3. 1,2,4-Oxadiazoles", Journal of Medicinal Chemistry, vol. 15, No. 11, 1972, pp. 1198-1200, XP-002364208.

* cited by examiner

Primary Examiner — Shean C Wu
(74) Attorney, Agent, or Firm — Buchanan Ingersoll & Rooney PC

(57) ABSTRACT

A composition comprising at least one liquid-crystal compound and a polymer having at least one group of the following formula (A) as the constitutive unit thereof:

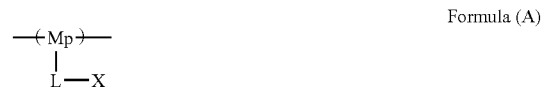

Formula (A)

wherein Mp represents a trivalent linking group; L represents a single bond, or a bivalent linking group; X represents a substituted or unsubstituted functional group having a cyclic structure.

14 Claims, 1 Drawing Sheet

COMPOSITION, RETARDATION PLATE, AND LIQUID-CRYSTAL DISPLAY DEVICE

BACKGROUND OF THE INVENTION

1. Field of the Invention

The present invention relates to a composition useful for forming an optically-anisotropic layer, to a retardation plate produced with the composition, and to a method for producing the retardation plate.

2. Background Art

A liquid-crystal display device generally comprises a liquid-crystal cell sandwiched between a first polarizer and a second polarizer, in which the liquid-crystal cell has a liquid-crystal layer containing a rod-shaped liquid-crystal compound between a pair of substrates. In case where the retardation to occur inside the rod-shaped liquid-crystal compound-containing liquid-crystal cell is to be canceled by an optical compensatory sheet that has an optically-anisotropic layer formed of a discotic liquid-crystal compound (e.g., 2,3,6,7,10,11-hexa{4-(4-acryloyloxyhexyloxy) benzoyloxy}triphenylene) (for example, as in JP-A-8-50206), it is impossible to simultaneously cancel the retardation for the wavelengths of all light since the wavelength dispersion of the rod-shaped liquid-crystal compound differs from that of the discotic liquid-crystal compound, therefore often resulting in discoloration (for example, failure in black coloration).

A benzene compound tri-substituted with a heterocyclic group is reported (Molecular Crystals and Liquid Crystals, 2001, Vol. 370, p. 391). It is not easy to attain low wavelength dispersion by the use of the compound, and a compound having a smaller wavelength dispersion [having a smaller value of Re (short wavelength (e.g., 450 nm))/Re (long wavelength (e.g., 650 nm))] is desired.

The retardation $Re(\lambda)$ of a retardation plate must be determined in accordance with the optical properties of the liquid-crystal cell that the retardation plate is to compensate. The retardation ($\Delta nd$) is a product of the refractive anisotropy ($\Delta n$) of an optically-anisotropic layer and the thickness (d) of the optically-anisotropic layer; and an optically-anisotropic layer having a large refractive anisotropy ($\Delta n$) can compensate a liquid-crystal cell even though the thickness (d) of the layer is small. Regarding a retardation plate where the liquid crystal is aligned and fixed, the retardation Re of the plate varies depending on the tilt angle (mean tilt angle) of the aligned liquid crystal in the plate, and therefore the tilt angle in the retardation plate of the type must be controlled.

However, it is difficult to control the tilt angle of a heterocyclic group-substituted, tri-substituted benzene-type discotic liquid-crystal compound, and in particular, it is difficult to hybrid-align the compound at a low tilt angle, and therefore, an alignment controller capable of lowering the tilt angle of a discotic liquid-crystal compound to a desired angle is desired.

On the other hand, examples of adding an alignment controller or an alignment promoter to a liquid-crystal compound are disclosed, but the effect of the controller or the promoter for a tri-substituted benzene-type discotic liquid-crystal compound is not clarified, and the related art is unsatisfactory for controlling the tilt angle of the compound to a desired angle (JP-A-2002-129162).

Regarding tilt angle control, it is desired that the tilt angle change is small even though the temperature in polymerization varies, but the temperature dependence of tilt angle is great and it is desired to solve the problem.

SUMMARY OF THE INVENTION

An object of the invention is to provide a composition useful for stably forming an optically-anisotropic layer that contributes to optical compensation in liquid-crystal display devices. In particular, it is to provide a composition useful for forming an optically-anisotropic layer of which the optical anisotropy is expressed by the hybrid alignment of a discotic liquid-crystal compound therein, with no (or little) defects caused by fluctuation of optical characteristics or by alignment failure.

Another object of the invention is to provide a retardation plate useful for optical compensation in liquid-crystal display devices.

For attaining the objects, the invention provides the following:

(1) A composition comprising at least one liquid-crystal compound and a polymer having at least one group of the following formula (A) as the constitutive unit thereof:

Formula (A)

wherein Mp represents a trivalent linking group; L represents a single bond, or a bivalent linking group; X represents a substituted or unsubstituted functional group having a cyclic structure.

(2) The composition according to (1), wherein X in the (A) is a substituted or unsubstituted cyclic aliphatic group having from 3 to 20 carbon atoms, or a substituted or unsubstituted phenylene group having from 6 to 30 carbon atoms.

(3) The composition according to (1), wherein in the (A), Mp is the following Mp-1 or Mp-2:

wherein * indicates the linking position to L;
and L is a bivalent linking group selected from —O—, —NR$^{a11}$— (where R$^{a11}$ represents a hydrogen atom, an aliphatic hydrocarbon group having from 1 to 10 carbon atoms), —S—, —C(=O)—, —S(=O)$_2$—, and a substituted or unsubstituted alkylene group having from 1 to 20 carbon atoms, and a group formed by linking two or more of these.

(4) The composition according to (1), wherein the polymer having at least one group of the following formula (A) further has a constitutive unit derived from a fluoroaliphatic group-having monomer.

(5) The composition according to (1), the constitutive unit derived from a fluoroaliphatic group-having monomer is represented by the following formula (B):

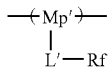

Formula (B)

wherein Mp' represents a trivalent linking group; L' represents a single bond or a bivalent linking group; Rf represents a substituent having at least one fluorine atom.

(6) The composition according to (1), wherein the liquid-crystal compound is a discotic compound.

(7) The composition according to (1), wherein at least one liquid-crystal compound is represented by the following formula (DI):

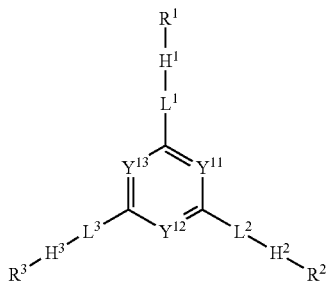

Formula (DI)

wherein $Y^{11}$, $Y^{12}$ and $Y^{13}$ each independently represent a methine group or a nitrogen atom; $L^1$, $L^2$ and $L^3$ each independently represent a single bond or a bivalent linking group; $H^1$, $H^2$ and $H^3$ each independently represent the following formula (DI-A) or (DI-B); $R^1$, $R^2$ and $R^3$ each independently represent the following formula (DI-R):

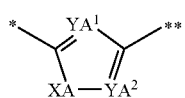

Formula (DI-A)

wherein $YA^1$ and $YA^2$ each independently represent a methine group or a nitrogen atom; XA represents an oxygen atom, a sulfur atom, a methylene group or an imino group; * indicates the position at which the formula bonds to any of $L^1$ to $L^3$; and ** indicates the position at which the formula bonds to any of $R^1$ to $R^3$,

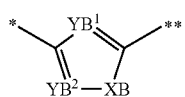

Formula (DI-B)

wherein $YB^1$ and $YB^2$ each independently represent a methine group or a nitrogen atom; XB represents an oxygen atom, a sulfur atom, a methylene group or an imino group; * indicates the position at which the formula bonds to any of $L^1$ to $L^3$; and ** indicates the position at which the formula bonds to any of $R^1$ to $R^3$, $*\text{-}(\text{-}L^{21}\text{-}F^1)_{n1}\text{-}L^{22}\text{-}L^{23}\text{-}Q^1$        Formula (DI-R)

wherein * indicates the position at which the formula bonds to $H^1$, $H^2$ or $H^3$ in the (DI); $F^1$ represents a bivalent linking group having at least one cyclic structure; $L^{21}$ represents a single bond or a bivalent linking group; n1 indicates an integer of from 0 to 4; $L^{22}$ represents —O—, —O—CO—, —CO—O—, —O—CO—O—, —S—, —NH—, —SO$_2$—, —CH$_2$—, —CH═CH— or —C≡C—, $L^{23}$ represents a bivalent linking group selected from —O—, —S—, —C(═O)—, —SO$_2$—, —NH—, —CH$_2$—, —CH═CH— and —C≡C—, and a group formed by linking two or more of these, and when the group has a hydrogen atom, the hydrogen atom may be substituted with a substituent; $Q^1$ represents a polymerizing group or a hydrogen atom.

(8) The composition according to (1), wherein at least one of the liquid-crystal compounds is a liquid-crystal compound of the following formula (DII) or a liquid-crystal compound of the following formula (DIII):

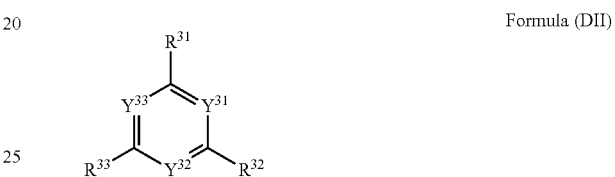

Formula (DII)

wherein $Y^{31}$, $Y^{32}$ and $Y^{33}$ each independently represent a methine group or a nitrogen atom; $R^{31}$, $R^{32}$ and $R^{33}$ each independently represent the following formula (DII-R):

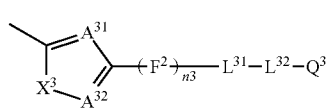

Formula (DII-R)

wherein $A^{31}$ and $A^{32}$ each independently represent a methine group or a nitrogen atom; $X^3$ represents an oxygen atom, a sulfur atom, a methylene group or an imino group; $F^2$ represents a bivalent cyclic linking group having a 6-membered cyclic structure; n3 indicates an integer of from 1 to 3; $L^{31}$ represents —O—, —O—CO—, —CO—O—, —O—CO—O—, —S—, —NH—, —SO$_2$—, —CH$_2$—, —CH═CH— or —C≡C—, $L^{32}$ represents a bivalent linking group selected from —O—, —S—, —C(═O)—, —SO$_2$—, —NH—, —CH$_2$—, —CH═CH— and —C≡C—, and a group formed by linking two or more of these, and when the group has a hydrogen atom, the hydrogen atom may be substituted with a substituent; $Q^3$ represents a polymerizing group or a hydrogen atom,

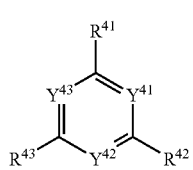

Formula (DIII)

wherein $Y^{41}$, $Y^{42}$ and $Y^{43}$ each independently represent a methine group or a nitrogen atom; $R^{41}$, $R^{42}$ and $R^{43}$ each independently represent the following formula (DIII-A), (DIII-B) or (DIII-C):

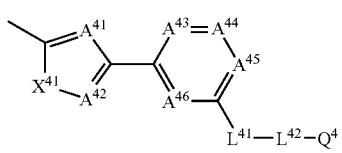

Formula (DIII-A)

wherein $A^{41}$, $A^{42}$, $A^{43}$, $A^{44}$, $A^{45}$ and $A^{46}$ each independently represent a methine group or a nitrogen atom; $X^{41}$ represents an oxygen atom, a sulfur atom, a methylene group or an imino group; $L^{41}$ represents —O—, —O—CO—, —CO—O—, —O—CO—O—, —S—, —NH—, —SO$_2$—, —CH$_2$—, —CH=CH— or —C≡C—, $L^{42}$ represents a bivalent linking group selected from —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^4$ represents a polymerizing group or a hydrogen atom,

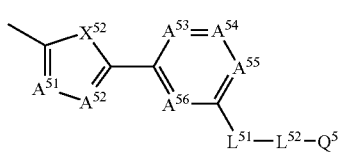

Formula (DIII-B)

wherein $A^{51}$, $A^{52}$, $A^{53}$, $A^{54}$, $A^{55}$ and $A^{56}$ each independently represent a methine group or a nitrogen atom; $X^{52}$ represents an oxygen atom, a sulfur atom, a methylene group or an imino group; $L^{51}$ represents —O—, —O—CO—, —CO—O—, —O—CO—C—, —S—, —NH—, —SO$_2$—, —CH$_2$—, —CH=CH— or —C≡C—, $L^{52}$ represents a bivalent linking group selected from —O—, —S—, —C(=O—O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^5$ represents a polymerizing group or a hydrogen atom,

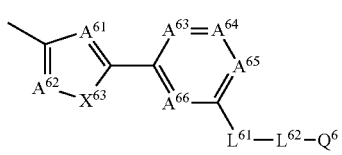

Formula (DIII-C)

wherein $A^{61}$, $A^{62}$, $A^{63}$, $A^{64}$, $A^{65}$ and $A^{66}$ each independently represent a methine group or a nitrogen atom; $X^{63}$ represents an oxygen atom, a sulfur atom, a methine group or an imino group; $L^{61}$ represents —O—, —O—CO—, —CO—O—, —O—CO—O—, —S—, —NH—, —SO$_2$—, —CH$_2$—, —CH=CH— or —C≡C—, $L^{62}$ represents a bivalent linking group selected from —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^6$ represents a polymerizing group or a hydrogen atom.

(9) The composition according to (7), further comprising at least one of other liquid-crystal compound.

(10) The composition according to (8), further comprising at least one of other liquid-crystal compound.

(11) The composition according to (9), wherein the other liquid-crystal compound is represented by the following Formula (T):

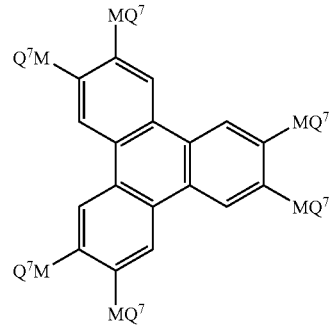

wherein M represents a bivalent linking group, which may be the same or different; $Q^7$ represents a polymerizable group or a hydrogen atom, which may be the same or different.

(12) The composition according to (10), wherein the other liquid-crystal compound is represented by the following Formula (T):

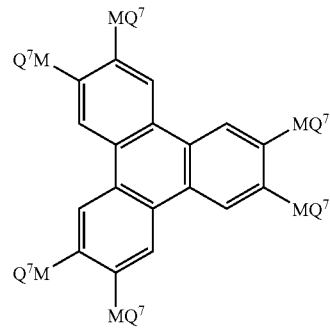

wherein M represents a bivalent linking group, which may be the same or different; $Q^7$ represents a polymerizable group or a hydrogen atom, which may be the same or different.

(13) A retardation plate having an optically-anisotropic layer formed with the composition according to (1).

(14) A liquid-crystal display device having an optically-anisotropic layer formed with the composition according to (1).

(15) A polymer comprising a group represented by the following formula (A) and a group represented by the following formula (B) as the constitutive unit thereof:

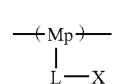

Formula (A)

wherein Mp represents a trivalent linking group; L represents a single bond, or a bivalent linking group; X represents a substituted or unsubstituted functional group having a cyclic structure:

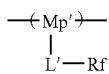

Formula (B)

wherein Mp' represents a trivalent linking group; $L^1$ represents a single bond or a bivalent linking group; Rf represents a substituent having at least one fluorine atom.

(16) A method for controlling a tile angle using a polymer comprising a group represented by the following formula (A) as the constitutive unit thereof:

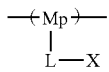

Formula (A)

wherein Mp represents a trivalent linking group; L represents a single bond, or a bivalent linking group; X represents a substituted or unsubstituted functional group having a cyclic structure.

The invention provides a composition useful for stably forming an optically-anisotropic layer that contributes to optical compensation in liquid-crystal display devices. In particular, the invention provides a composition useful for forming an optically-anisotropic layer in which the mean tilt angle of the hybrid-aligned discotic liquid-crystal compound can be accurately controlled to fall within a range of from 10 to 40°, particularly within a range of from 10 to 30°, and in which the mean tilt angle fluctuation caused by some slight change in the alignment temperature of the compound can be reduced. In addition, the present invention provides a retardation plate useful for compensation of a liquid-crystal display.

DETAILED DESCRIPTION OF THE INVENTION

Figure 1:
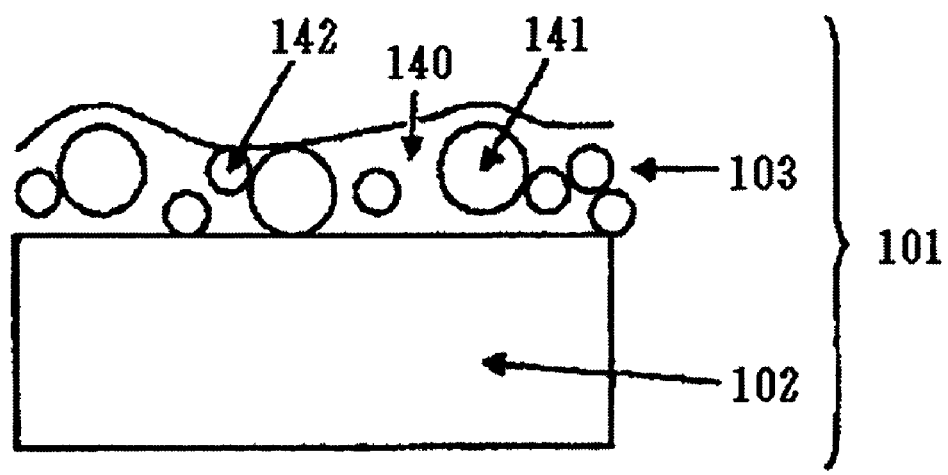
FIG. 1 is a diagrammatic sectional view illustrating a representative embodiment of the light-diffusion film.

The invention is described in detail hereinunder. In this description, the numerical range expressed by the wording "a number to another number" means the range that falls between the former number indicating the lowermost limit of the range and the latter number indicating the uppermost limit thereof.

Re(λ), Rth(λ), tilt angle and mean tilt angle as referred to in this description are described in detail hereinunder.

In the description, the A and B of the phrase "having A to B carbon atoms" include the number of the carbon atoms constituting the substituent of the group unless otherwise stated. Also, a group in the description may have a substituent within the scope of the present invention unless otherwise stated.

(Measure of Re(λ) and Rth(λ))

In the description, Re(λ) and Rth(λ) each indicate the in-plane retardation and the thickness direction retardation of the film at a wavelength %. Re(λ) is measured by applying a light having a wavelength of λ nm in the normal direction of the film, using KOBRA-21ADH or WR (by Oji Scientific Instruments).

When the film tested is represented by an uniaxial or biaxial refractive index ellipsoid, then its Rth(λ) is computed according to the method mentioned below.

With the in-plane slow axis (judged by KOBRA 21ADH or WR) taken as the inclination axis (rotation axis) of the film (in case where the film has no slow axis, the rotation axis of the film may be in any in-plane direction of the film), Re(λ) of the film is measured at 6 points in all thereof, up to +50° relative to the normal direction of the film at intervals of 10°, by applying a light having a wavelength of λ nm from the inclined direction of the film.

With the in-plane slow axis from the normal direction taken as the rotation axis thereof, when the film has a zero retardation value at a certain inclination angle, then the symbol of the retardation value of the film at an inclination angle larger than that inclination angle is changed to a negative one, and then applied to KOBRA 21ADH or WR for computation.

With the slow axis taken as the inclination axis (rotation axis) (in case where the film has no slow axis, the rotation axis of the film may be in any in-plane direction of the film), the retardation values of the film are measured in any inclined two directions; and based on the data and the mean refractive index and the inputted film thickness, Rth may be computed according to the following formulae (1) and (2):

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad (1)$$

wherein Re(θ) means the retardation value of the film in the direction inclined by an angle θ from the normal direction; nx means the in-plane refractive index of the film in the slow axis direction; ny means the in-plane refractive index of the film in the direction vertical to nx; nz means the refractive index of the film vertical to nx and ny.

$$Rth = ((nx+ny)/2 - nz) \times d. \quad (2)$$

When the film to be tested could not be represented by a monoaxial or biaxial index ellipsoid, or that is, when the film does not have an optical axis, then its Rth(λ) may be computed according to the method mentioned below.

With the in-plane slow axis (judged by KOBRA 21ADH or WR) taken as the inclination axis (rotation axis) of the film, Re(λ) of the film is measured at 11 points in all thereof, from −50° to +50° relative to the normal direction of the film at intervals of 10°, by applying a light having a wavelength of λ nm from the inclined direction of the film. Based on the thus-determined retardation data of Re(λ), the mean refractive index and the inputted film thickness, Rth(λ) of the film is computed with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59). The mean refractive index and the film thickness are inputted in KOBRA 21ADH or WR, nx, ny and nz are computed therewith. From the thus-computed data of nx, ny and nz, Nz=(nx−nz)/(nx−ny) is further computed.

(Measure of Tilt Angle)

In an optically-anisotropic layer in which discotic compounds and rod-shaped compounds are oriented, it is difficult to accurately and directly measure the tilt angle $\theta_1$ (the angle formed by the physical symmetric axis of the discotic liquid-crystal compound molecule or the rod-shaped compound and one face of an optically-anisotropic layer is taken as a tile angle) to one face of the layer and the tilt angle θ2 to the other face thereof. Therefore, in this description, θ1 and θ2 are computed as follows: This method could not accurately express the actual alignment state of discotic liquid-crystal compound molecules, but may be effective as a means for indicating the relative relationship of some optical characteristics of an optical film.

In this method, the following two points are assumed for facilitating the computation, and the tilt angle at two interfaces of an optically-anisotropic layer is determined.

1. It is assumed that an optically-anisotropic layer is a multi-layered structure that comprises a layer containing discotic compounds and rod-shaped compounds. It is further assumed that the minimum unit layer constituting the structure (on the assumption that the tilt angle of the discotic compounds and the rod-shaped compounds is uniform inside the layer) is an optically-monoaxial layer.

2. It is assumed that the tilt angle in each layer varies monotonously as a linear function in the direction of the thickness of an optically-anisotropic layer.

A concrete method for computation is as follows:

(1) In a plane in which the tilt angle in each layer monotonously varies as a linear function in the direction of the thickness of an optically-anisotropic layer, the incident angle of light to be applied to the optically-anisotropic layer is varied, and the retardation is measured at three or more angles. For simplifying the measurement and the computation, it is desirable that the retardation is measured at three angles of −40°, 0° and +40° relative to the normal direction to the optically-anisotropic layer of being at an angle of 0°. For the measurement, for example, used are KOBRA-21ADH and KOBRA-WR (by Oji Scientific Instruments), and transmission ellipsometers AEP-100 (by Shimadzu), M150 and M520 (by Nippon Bunko) and ABR10A (by Uniopt).

(2) In the above model, the refractive index of each layer for normal light is represented by n0; the refractive index thereof for abnormal light is by ne (ne is the same in all layers, and the same shall apply to n0); and the overall thickness of the multi-layer structure is by d. On the assumption that the tilting direction in each layer and the monoaxial optical axis direction of the layer are the same, the tilt angle θ1 in one face of the optically-anisotropic layer and the tilt angle θ2 in the other face thereof are fitted as variables in order that the calculated data of the angle dependence of the retardation of the optically-anisotropic layer could be the same as the found data thereof, and θ1 and θ2 are thus computed.

In this, n0 and ne may be those known in literature and catalogues. When they are unknown, they may be measured with an Abbe's refractiometer. The thickness of the optically-anisotropic layer may be measured with an optical interference thickness gauge or on a photograph showing the cross section of the layer taken by a scanning electronic microscope.

The composition and the retardation plate of the invention are sequentially described below.

The composition of the invention contains at least one liquid-crystal compound and a polymer having at least one group of the following formula (A) as the constitutive unit thereof (hereinafter this may be referred to as "polymer for use in the invention"). The polymer for use in the invention, and liquid-crystal compounds preferred for use in the invention are sequentially described below.

Polymer having a group of formula (A) as its constitutive unit:
(1) Group of Formula (A):

Formula (A)

wherein Mp represents a trivalent linking group; L represents a single bond, or a bivalent linking group; X represents a substituted or unsubstituted functional group having a cyclic structure.

In formula (A), Mp is a trivalent linking group, and it forms the backbone chain of the polymer for use in the invention. As will be described hereinunder, the backbone chain of the polymer may contain any other repetitive unit than this. Mp is preferably a substituted or unsubstituted linear or branched alkylene group having from 2 to 20 carbon atoms (the number of the carbon atoms constituting the group does not include the number of the carbon atoms constituting the substituent of the group—the same shall apply to the others of Mp) (e.g., ethylene group, propylene group, methylethylene group, butylene group, hexylene group), a substituted or unsubstituted cyclic alkylene group having from 3 to 10 carbon atoms (e.g., cyclopropylene group, cyclobutylene group, cyclohexylene group), a substituted or unsubstituted vinylene group, a substituted or unsubstituted cyclic vinylene group, a substituted or unsubstituted phenylene group, an oxygen atom-having group (e.g., groups containing any of ether group, acetal group, ester group, carbonate group), a nitrogen atom-having group (e.g., groups containing any of amino group, imino group, amido group, urethane group, ureido group, imido group, imidazole group, oxazole group, pyrrole group, anilide group, maleimido group) a sulfur atom-having group (e.g., groups containing any of sulfido group, sulfone group, thiophene group), a phosphorus atom-having group (e.g., groups containing any of phosphine group, phosphate ester group), a silicon atom-having group (e.g., groups containing siloxane group), or a group formed by linking two or more of these groups, in which one hydrogen is substituted with -L-X; more preferably it is a substituted or unsubstituted ethylene group, a substituted or unsubstituted methylethylene group, a substituted or unsubstituted cyclohexylene group, a substituted or unsubstituted vinylene group, in which one hydrogen atom is substituted with -L-X; even more preferably it is a substituted or unsubstituted ethylene group, a substituted or unsubstituted methylethylene group, a substituted or unsubstituted vinylene group, in which one hydrogen atom is substituted with -L-X; still more preferably a substituted or unsubstituted ethylene group, or a substituted or unsubstituted methylethylene group in which one hydrogen atom is substituted with -L-X. Concretely, Mp-1 and Mp-2 mentioned below are preferred.

Preferred examples of Mp are shown below, to which, however, Mp should not be limited. In the following examples of Mp, the position indicated by * means the position at which the formula bonds to L.

(Mp-1)

(Mp-2)

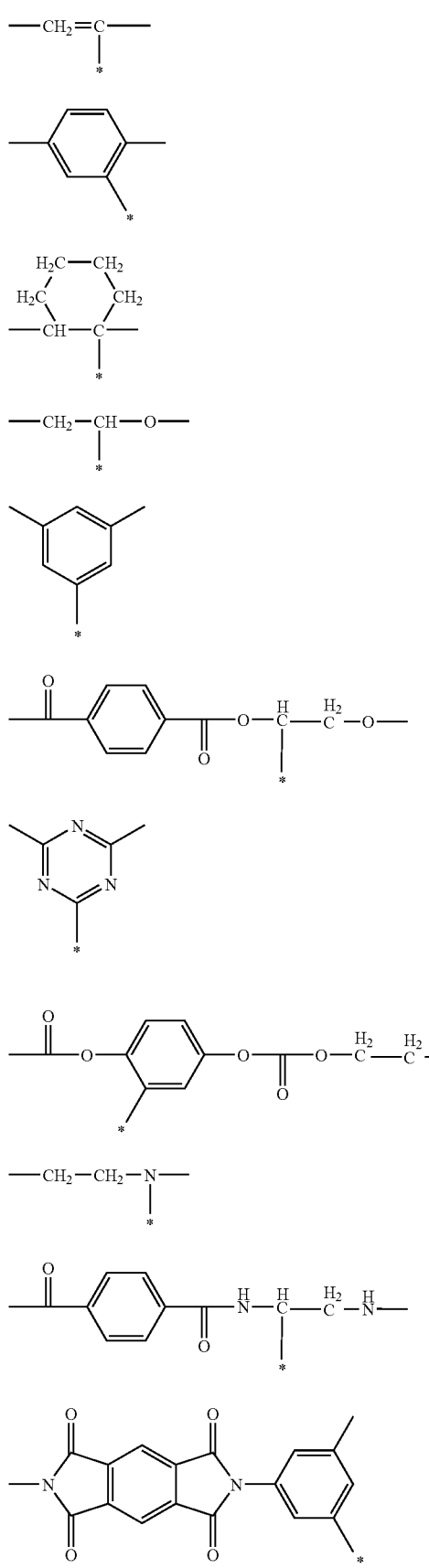
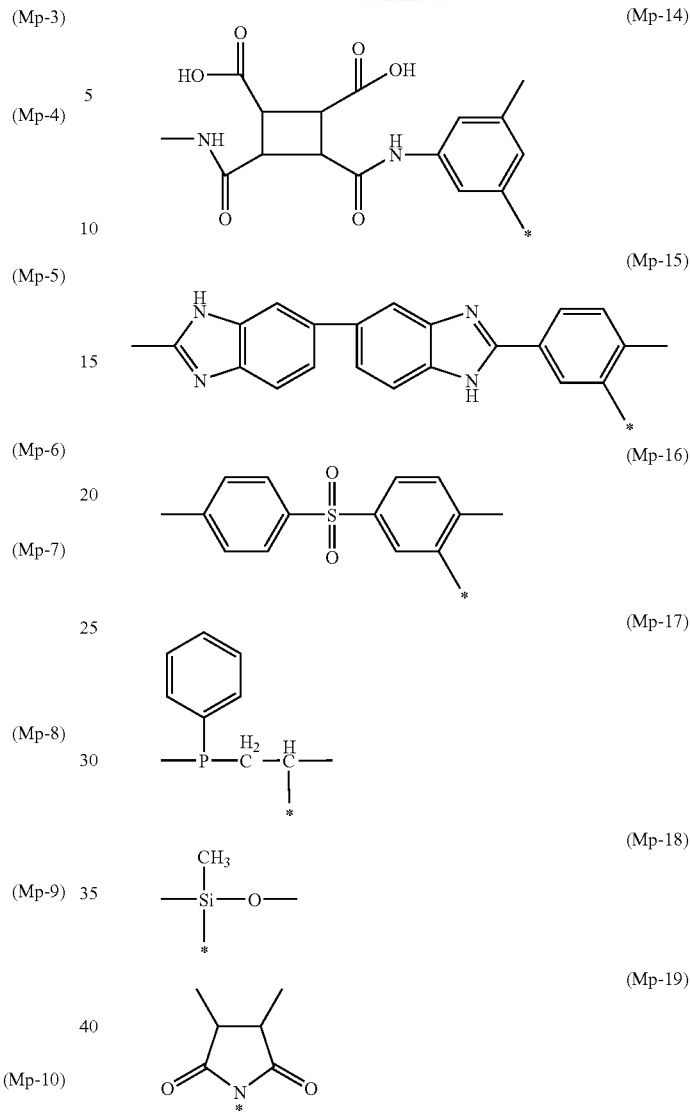

The bivalent linking group L in formula (A) includes a substituted or unsubstituted alkylene group having from 1 to 20 carbon atoms (e.g., methylene group, ethylene group, propylene group, butylene group, isopropylene group), a substituted or unsubstituted alkenylene group having from 2 to 20 carbon atoms (e.g., vinylene group, butane group), —O—, —NR$^{a1}$—, —S—, —PR$^{a2}$—, —Si(R$^{a3}$)(R$^{a4}$)—, —C(=O)—, —C(=O)O—, —C(=O)NR$^{a5}$—, —OC(=O)O—, —OC(=O)NR$^{a6}$, NR$^{a7}$C(=O)NR$^{a8}$, (—O)$_2$CH—, and a bivalent group selected from a group formed by linking two or more of these. R$^{a1}$ to R$^{a8}$ each represents a hydrogen atom or a substitutable substituent, including, for example, a halogen atom, an alkyl group (including a cycloalkyl group such as a monocycloalkyl group and a bicycloalkyl group having one or more cyclic structures), an alkenyl group (including a cycloalkenyl group, a bicycloalkenyl group), an alkynyl group, a cyano group, a hydroxyl group, a nitro group, a carboxyl group, an alkoxy group, a silyloxy group, an acyloxy group, an alkoxycarbonyloxy group, an amino group (excluding an anilino group), an acylamino group, an aminocarbonylamino group, an alkoxycarbonylamino group, a mercapto group, an alkylthio group, a sulfamoyl group, a sulfo group, an alkylsulfinyl group, an alkylsulfonyl group, an acyl group, an alkoxycarbonyl group, an imido group, a phosphino group, a phosphinyl group, a phosphinyloxy group, a phosphinylamino group, a silyl group. Of those, a hydrogen atom and an alkyl group is preferable.

In formula (A), L is more preferably a bivalent linking group selected from —O—, —NR$^{a11}$— (where R$^{a11}$ represents a hydrogen atom and an aliphatic hydrocarbon group having from 1 to 10 carbon atoms), —S—, —C(=O)—, —S(=O)$_2$—, and a substituted or unsubstituted alkylene group having from 1 to 20 carbon atoms, and a group formed by linking two or more of these, and —C(=O)O—, —OC(=O)—, —OC(=O)O—, —C(=O)NH—, —NHC(=O)—, —C(=O)O(CH$_2$)$_m$O—, and even more preferably a bivalent linking group selected from a group formed by linking two or more of these.

Here, m indicates an integer of from 1 to 20. m is preferably an integer of from 1 to 16, more preferably an integer of from 3 to 12, even more preferably an integer of 3 to 6, for suitably controlling the degree of freedom of X. Suitably controlling the degree of freedom of X increases the interaction between the polymer and the liquid crystal to be aligned, whereby the orientation of X may be more suitably controlled and the pretilt angle of the liquid crystal to be aligned may be more effectively controlled.

In addition, a group formed by linking two or more of the above-mentioned linking groups, for example, as shown below is preferable. In L, the position indicated by * is the position at which the group bonds to Mp. In the following formula, m represents an integer of from 1 to 20, and is the same as the above-mentioned "m", and the preferable range of m is the same.

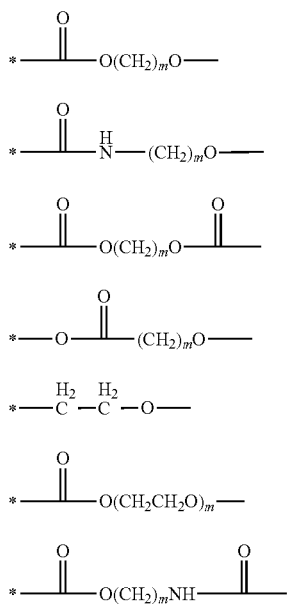

In case where Mp in formula (A) is (Mp-1) or (Mp-2), L is preferably a bivalent linking group selected from —O—, —NR$^{a11}$— (where R$^{a11}$ represents a hydrogen atom or an aliphatic hydrocarbon group having from 1 to 10 carbon atoms), —S—, —C(=O)—, —S(=O)$_2$—, and a substituted or unsubstituted alkylene group having from 1 to 20 carbon atoms, and a group formed by linking two or more of these; more preferably a group selected from —O—, —C(=O)O—, —C(=O)NH—, and a bivalent linking group of a combination of one or more of these with an alkylene group. For example, it is (L-1), (L-2), (L-3) or (L-7) mentioned above.

The substituted or unsubstituted functional group having a cyclic structure for X in formula (A) includes a substituted or unsubstituted cyclic aliphatic group having from 3 to 20 carbon atoms (e.g., unsubstituted cyclopropyl group, unsubstituted cyclobutyl group, unsubstituted cyclopentyl group, cyclohexyl group, pentylcyclohexyl group, propylcyclohexyl group), a substituted or unsubstituted phenyl group having from 6 to 30 carbon atoms (e.g., unsubstituted phenyl group, cyanophenyl group, methoxyphenyl group, ethoxyphenyl group, butoxyphenyl group, octyloxyphenyl group, halogen atom-substituted phenyl group, trifluoromethylphenyl group, trifluoromethoxyphenyl group, perfluorohexylethyloxyphenyl group, hydroxybutylphenyl group, carboxyphenyl group, sulfophenyl group), or a substituted or unsubstituted heterocyclic group (e.g., furan group, thiophene group, pyridyl group, dimethylaminopyridiyl group, N-methylimidazolyl group).

In formula (A), X is more preferably a substituted or unsubstituted cyclohexyl group having from 6 to 15 carbon atoms, or a substituted or unsubstituted phenyl group having from 6 to 20 carbon atoms; even more preferably a substituted or unsubstituted phenyl group having from 6 to 15 carbon atoms; still more preferably a substituted phenyl group having from 6 to 10 carbon atoms.

In formula (A) the group moment of X is preferably at least 2.0 Deby, more preferably at least 3.0 Deby, still more preferably at least 4.0 Deby. Having X of the type, the polymer may be effective for reducing the mean tilt angle within a broad temperature range. For making X have such a large group moment, it is effective to link a substituted cyclic group with a cyano group, a trifluoromethyl group or a halogen atom (e.g., fluorine atom, chlorine atom, bromine atom) as a substituent. Of those substituents, more preferred are a cyano group and a fluorine atom. Of X having the same group moment value, one of which the direction of the group moment is in parallel to the major axis direction of the mesogen moiety of the polymer is more effective, and is favorable in point of the tilt angle temperature dependence thereof. Regarding the position of the substituent in X of the type, the substituent therein is preferably p-positioned and/or m-positioned, more preferably at least p-positioned, even more preferably both of p-positioned and m-positioned. The number of the substituents is preferably from 1 to 3, more preferably 1 or 2.

In particular, when L is a single bond or a bivalent linking group selected from —O—, —NR$^{a11}$— (where R" is a hydrogen atom, or an aliphatic hydrocarbon group having from 1 to 10 carbon atoms), —S—, —C(=O)— and —S(=O)$_2$—, and a group formed by linking at least two of these, then X is preferably a substituted or unsubstituted phenyl group.

Preferred examples of the constitutive units of formula (A) are mentioned below, to which, however, the invention should not be limited.

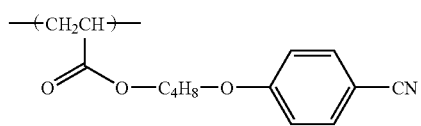

A-1

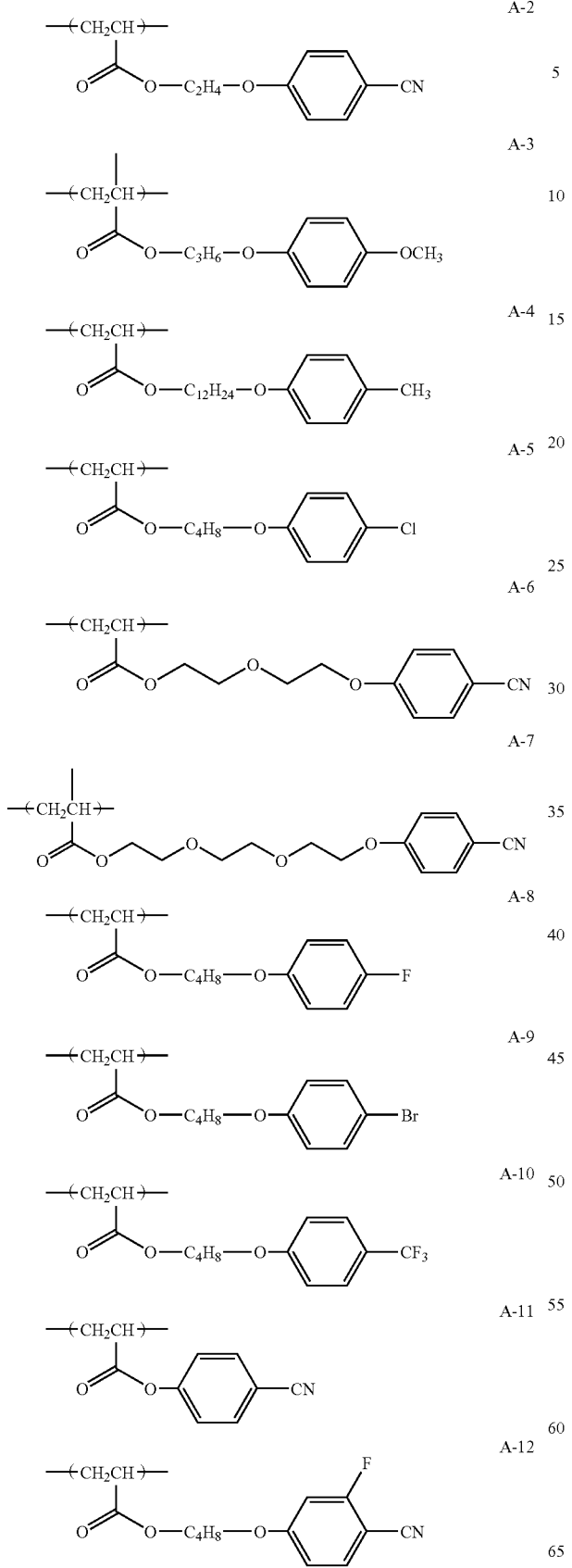
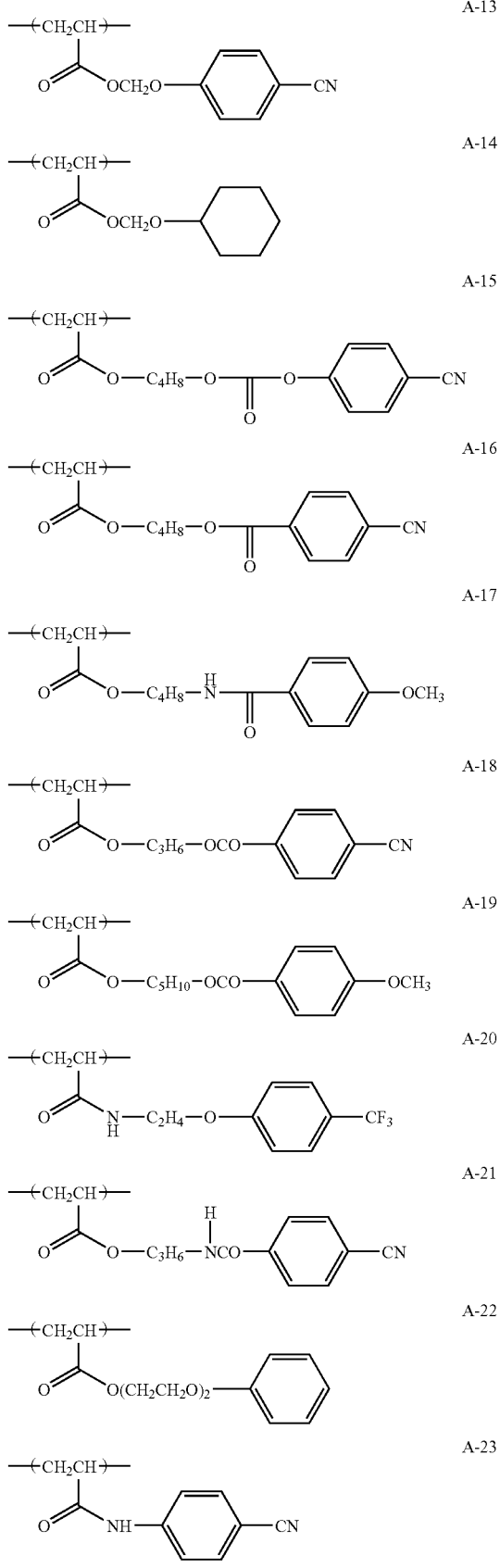

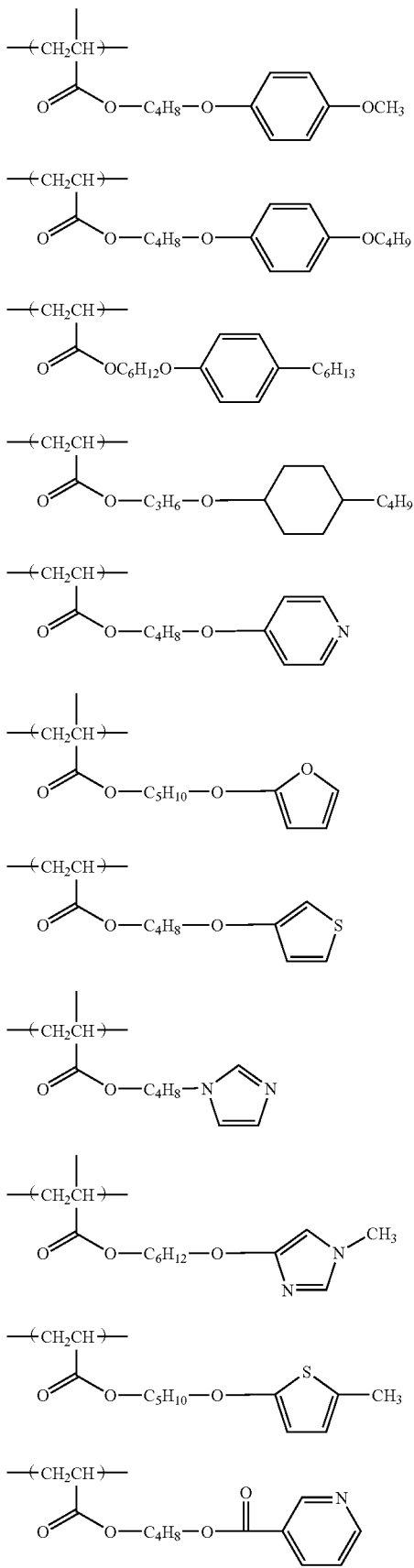

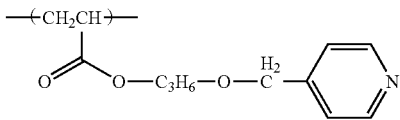

(2) Other Constitutive Units than Group of Formula (A) that May be in the Polymer:

The polymer for use in the invention may be a homopolymer of the constitutive unit of the group of formula (A) alone, but may also be a copolymer comprising a combination of the group with any other constitutive unit. The other constitutive unit is preferably a constitutive unit derived from a fluoro-aliphatic group-having monomer, more preferably a constitutive unit of a group of the following formula (B), details of which are described below:

Formula (B)

$$-\!\!\!+\!\!Mp'\!\!+\!\!-$$
$$\quad\;\; |$$
$$\quad\;\; L'\!-\!Rf$$

wherein Mp' represents a trivalent linking group; L' represents a single bond or a bivalent linking group; Rf represents a substituent having at least one fluorine atom.

Mp' has the same meaning as that of Mp in formula (A), and its preferred range is also the same as that therein.

L' is preferably —O—, —NR$^{a11}$— (where R$^{a11}$ represents a hydrogen atom, an aliphatic hydrocarbon group having from 1 to 10 carbon atoms, or an aryl group having from 6 to 20 carbon atoms), —S—, —C(=O)—, —S(=O)$_2$, and a substituted or unsubstituted alkylene group having from 1 to 20 carbon atoms, and a group formed by linking at least two of these. The bivalent linking group formed by linking at least two or the above groups includes —C(=O)O—, —OC(=O)—, —OC(=O)O—, —C(=O)NH—, —NHC(=O)—, and —C(=O)O(CH$_2$)$_{ma}$O— (where ma indicates an integer of from 1 to 20).

In case where Mp' in formula (B) is (Mp-1) or (Mp-2), L' is preferably a bivalent linking group selected from —O—, —NR$^{a11}$— (where R$^{a11}$ represents a hydrogen atom, an aliphatic hydrocarbon group having from 1 to 10 carbon atoms, or an aryl group having from 6 to 20 carbon atoms), —S—, —C(=O)—, —S(=O)$_2$, and a substituted or unsubstituted alkylene group having from 1 to 20 carbon atoms, and a group formed by linking at least two of these; more preferably a bivalent linking group selected from —O—, —C(=O)O—, and —C(=O)NH—, and a group of a combination of at least one of these groups with an alkylene group (e.g., (L-1), (L-2), (L-3)).

Preferred examples of Rf are an aliphatic hydrocarbon group having from 1 to 30 carbon atoms and substituted with at least one fluorine atom (e.g., trifluoroethyl group, perfluorohexylethyl group, perfluorohexylethoxyethyl group, perfluorohexylpropyl group, perfluorobutylethyl group, perfluorooctylethyl group). Also preferably, Rf has a group CF$_3$ or CF$_2$H at its terminal, more preferably a group CF$_3$.

More preferably, Rf is an alkyl group having a group CF$_3$ at its terminal, or an alkyl group having CF$_2$H at its terminal. The alkyl group having CF$_3$ at its terminal is an alkyl group in which a part or all of the hydrogen atoms constituting the alkyl group are substituted with a fluorine atom. Preferably, at least 50% of the hydrogen atoms constituting the alkyl group having CF$_3$ at its terminal are substituted with a fluorine atom;

more preferably at least 60% thereof are substituted; and even more preferably at least 70% thereof are substituted. The remaining hydrogen atoms may be substituted with the substituent in the substituent group D given hereinunder.

The alkyl group having a group $CF_2H$ at its terminal is an alkyl group in which a part or all of the hydrogen atoms constituting the alkyl group are substituted with a fluorine atom. Preferably, at least 50% of the hydrogen atoms constituting the alkyl group having $CF_2H$ at its terminal are substituted with a fluorine atom; more preferably at least 60% thereof are substituted; and even more preferably at least 70% thereof are substituted. The remaining hydrogen atoms may be substituted with the substituent in the substituent group D given hereinunder.

Substituent Group D:

In this description, the substituent group D includes an alkyl group (preferably having from 1 to 20 carbon atoms, more preferably from 1 to 12 carbon atoms, even more preferably from 1 to 8 carbon atoms, such as methyl group, ethyl group, isopropyl group, tert-butyl group, n-octyl group, n-decyl group, n-hexadecyl group, cyclopropyl group, cyclopentyl group, cyclohexyl group), an alkenyl group (preferably having from 2 to 20 carbon atoms, more preferably from 2 to 12 carbon atoms, even more preferably from 2 to 8 carbon atoms, such as vinyl group, allyl group, 2-butenyl group, 3-pentenyl group), an alkynyl group (preferably having from 2 to 20 carbon atom, more preferably from 2 to 12 carbon atoms, even more preferably from 2 to 8 carbon atoms, such as propargyl group, 3-pentynyl group), an aryl group (preferably having from 6 to 30 carbon atoms, more preferably 6 to 20 carbon atoms, even more preferably from 6 to 12 carbon atoms, such as phenyl group, p-methylphenyl group, naphthyl group), a substituted or unsubstituted amino group (preferably having from 0 to 20 carbon atoms, more preferably from 0 to 10 carbon atoms, even more preferably from 0 to 6 carbon atoms, such as unsubstituted amino group, methylamino group, dimethylamino group, diethylamino group, dibenzylamino group), an alkoxy group (preferably having from 1 to 20 carbon atoms, more preferably from 1 to 12 carbon atoms, even more preferably from 1 to 8 carbon atoms, such as methoxy group, ethoxy group, butoxy group), an aryloxy group (preferably having from 6 to 20 carbon atoms, more preferably from 6 to 16 carbon atoms, even more preferably from 6 to 12 carbon atoms, such as phenyloxy group, 2-naphthyloxy group), an acyl group (preferably having from 1 to 20 carbon atoms, more preferably from 1 to 16 carbon atoms, even more preferably from 1 to 12 carbon atoms, such as acetyl group, benzoyl group, formyl group, pivaloyl group), an alkoxycarbonyl group (preferably having from 2 to 20 carbon atoms, more preferably from 2 to 16 carbon atoms, even more preferably from 2 to 12 carbon atoms, such as methoxycarbonyl group, ethoxycarbonyl group), an aryloxycarbonyl group (preferably having from 7 to 20 carbon atoms, more preferably from 7 to 16 carbon atoms, even more preferably from 7 to 10 carbon atoms, such as phenyloxycarbonyl group), an acyloxy group (preferably having from 2 to 20 carbon atoms, more preferably from 2 to 16 carbon atoms, even more preferably from 2 to 10 carbon atoms, such as acetoxy group, benzoyloxy group), an acylamino group (preferably having from 2 to 20 carbon atoms, more preferably from 2 to 16 carbon atoms, even more preferably from 2 to 10 carbon atoms, such as acetylamino group, benzoylamino group), an alkoxycarbonylamino group (preferably having from 2 to 20 carbon atoms, more preferably from 2 to 16 carbon atoms, even more preferably from 2 to 12 carbon atoms, such as methoxycarbonylamino group), an aryloxycarbonylamino group (preferably having from 7 to 20 carbon atoms, more preferably from 7 to 16 carbon atoms, even more preferably from 7 to 12 carbon atoms, such as phenyloxycarbonylamino group), a sulfonylamino group (preferably having from 1 to 20 carbon atoms, more preferably from 1 to 16 carbon atoms, even more preferably from 1 to 12 carbon atoms, such as methanesulfonylamino group, benzenesulfonylamino group), a sulfamoyl group (preferably having from 0 to 20 carbon atoms, more preferably from 0 to 16 carbon atoms, even more preferably from 0 to 12 carbon atoms, such as sulfamoyl group, methylsulfamoyl group, dimethylsulfamoyl group, phenylsulfamoyl group), a carbamoyl group (preferably having from 1 to 20 carbon atoms, more preferably from 1 to 16 carbon atoms, even more preferably from 1 to 12 carbon atoms, such as unsubstituted carbamoyl group, methylcarbamoyl group, diethylcarbamoyl group, phenylcarbamoyl group), an alkylthio group (preferably having from 1 to 20 carbon atoms, more preferably from 1 to 16 carbon atoms, even more preferably from 1 to 12 carbon atoms, such as methylthio group, ethylthio group), an arylthio group (preferably having from 6 to 20 carbon atoms, more preferably from 6 to 16 carbon atoms, even more preferably from 6 to 12 carbon atoms, such as phenylthio group), a sulfonyl group (preferably having from 1 to 20 carbon atoms, more preferably from 1 to 16 carbon atoms, even more preferably from 1 to 12 carbon atoms, such as mesyl group, tosyl group), a sulfinyl group (preferably having from 1 to 20 carbon atoms, more preferably from 1 to 16 carbon atoms, even more preferably from 1 to 12 carbon atoms, such as methanesulfinyl group, benzenesulfinyl group), an ureido group (preferably having from 1 to 20 carbon atoms, more preferably from 1 to 16 carbon atoms, even more preferably from 1 to 12 carbon atoms, such as unsubstituted ureido group, methylureido group, phenylureido group), a phosphoramido group (preferably having from 1 to 20 carbon atoms, more preferably from 1 to 16 carbon atoms, even more preferably from 1 to 12 carbon atoms, such as diethylphosphoramido group, phenylphosphoramido group), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, and having a hetero atom such as a nitrogen atom, an oxygen atom or a sulfur atom, for example, imidazolyl group, pyridyl group, quinolyl group, furyl group, piperidyl group, morpholino group, benzoxazolyl group, benzimidazolyl group, benzothiazolyl group), a silyl group (preferably having from 3 to 40 carbon atoms, more preferably from 3 to 30 carbon atoms, even more preferably from 3 to 24 carbon atoms, such as trimethylsilyl group, triphenylsilyl group). These substituents may be further substituted with any of these substituents. When the substituent has two or more substituents, then they may be the same or different. If possible, the substituents may bond to each other to form a ring.

Examples of the alkyl group having a group $CF_3$ at its terminal and the alkyl group having a group $CF_2H$ at its terminal are shown below.

R1: n-$C_8F_{17}$—
R2: n-$C_6F_{13}$—
R3: n-$C_4F_9$—
R4: n-$C_8F_{17}$—$(CH_2)_2$—
R5: n-$C_6F_{13}$—$(CH_2)_2$—
R6: n-$C_4F_9$—$(CH_2)_2$—
R7: H—$(CF_2)_8$—
R8: H—$(CF_2)_6$—
R9: H—$(CF_2)_4$—

R10: H—(CF$_2$)$_8$—(CH$_2$)—
R11: H—(CF$_2$)$_6$—(CH$_2$)—
R12: H—(CF$_2$)$_4$—(CH$_2$)—
R13: n-C$_4$F$_9$—(CH$_2$)$_2$—O—(CH$_2$)$_3$—O—
R14: n-C$_6$F$_{13}$—(CH$_2$)$_2$—O—
R15: n-C$_4$F$_9$—(CH$_2$)$_2$—

Specific examples of preferred repetitive units derived from fluoroaliphatic group-having monomers are mentioned below, to which, however, the invention should not be limited.

| —CH$_2$—CH—<br>\|<br>O=C—O—Rf | Rf = |  |
|---|---|---|
|  | —CH$_2$CH$_2$C$_4$F$_9$ | (B-1) |
|  | —CH$_2$CH$_2$C$_4$F$_9$ | (B-2) |
|  | —CH$_2$CH$_2$CH$_2$C$_4$F$_9$ | (B-3) |
|  | —CH$_2$CH$_2$C$_6$F$_{13}$ | (B-4) |
|  | —CH$_2$CH$_2$C$_8$F$_{17}$ |  |
|  | —CH$_2$CH$_2$OCH$_2$CH$_2$C$_4$F$_9$ | (B-5) |
|  | —CH$_2$CH$_2$OCH$_2$CH$_2$CH$_2$C$_4$F$_9$ | (B-6) |
|  | —CH$_2$CH$_2$OCH$_2$CH$_2$C$_6$F$_{13}$ | (B-7) |
|  | —CH$_2$CH$_2$OCH$_2$CH$_2$C$_8$F$_{17}$ | (B-8) |
|  | —CH$_2$CH$_2$C$_4$F$_8$H | (B-9) |
|  | —CH$_2$CH$_2$CH$_2$C$_4$F$_8$H | (B-10) |
|  | —CH$_2$CH$_2$C$_6$F$_{12}$H | (B-11) |
|  | —CH$_2$CH$_2$C$_8$F$_{18}$H | (B-12) |
|  | —CH$_2$CH$_2$OCH$_2$CH$_2$C$_4$F$_8$H | (B-13) |
|  | —CH$_2$CH$_2$OCH$_2$CH$_2$CH$_2$C$_4$F$_8$H | (B-14) |
|  | —CH$_2$CH$_2$OCH$_2$CH$_2$C$_6$F$_{12}$H | (B-15) |
|  | —CH$_2$CH$_2$OCH$_2$CH$_2$C$_8$F$_{16}$H | (B-16) |
|  | —CH$_2$CH$_2$OCH$_2$CH$_2$C$_5$F$_{10}$H | (B-17) |
| CH$_3$<br>\|<br>—CH$_2$—C—<br>\|<br>O=C—O—Rf | Rf = |  |
|  | —CH$_2$CH$_2$C$_4$F$_9$ | (B-18) |
|  | —CH$_2$CH$_2$CH$_2$C$_4$F$_9$ | (B-19) |
|  | —CH$_2$CH$_2$C$_6$F$_{13}$ | (B-20) |
|  | —CH$_2$CH$_2$C$_8$F$_{17}$ | (B-21) |
|  | —CH$_2$CH$_2$OCH$_2$CH$_2$C$_4$F$_9$ | (B-22) |
|  | —CH$_2$CH$_2$OCH$_2$CH$_2$CH$_2$C$_4$F$_9$ | (B-23) |
|  | —CH$_2$CH$_2$OCH$_2$CH$_2$C$_6$F$_{13}$ | (B-24) |
|  | —CH$_2$CH$_2$OCH$_2$CH$_2$C$_8$F$_{17}$ | (B-25) |
|  | —CH$_2$CH$_2$C$_4$F$_8$H | (B-26) |
|  | —CH$_2$CH$_2$CH$_2$C$_4$F$_8$H | (B-27) |
|  | —CH$_2$CH$_2$C$_6$F$_{12}$H | (B-28) |
|  | —CH$_2$CH$_2$C$_8$F$_{16}$H | (B-29) |
|  | —CH$_2$CH$_2$OCH$_2$CH$_2$C$_4$F$_8$H | (B-30) |
|  | —CH$_2$CH$_2$OCH$_2$CH$_2$CH$_2$C$_4$F$_8$H | (B-31) |
|  | —CH$_2$CH$_2$OCH$_2$CH$_2$C$_6$F$_{12}$H | (B-32) |
|  | —CH$_2$CH$_2$OCH$_2$CH$_2$C$_8$F$_{16}$H | (B-33) |
|  | —CH$_2$CH$_2$OCH$_2$CH$_2$C$_5$F$_{10}$H | (B-34) |

The polymer for use in the invention may contain a repetitive unit having a structure of formula (A), and a repetitive unit derived from a fluoroaliphatic group-having monomer, and in addition to these, may further contain any other constitutive unit derived from a monomer copolymerizable with the monomers to form these constitutive units.

The copolymerizable monomer is not specifically defined. Preferred monomers are, for example, monomers to constitute hydrocarbon polymers (e.g., polyethylene, polypropylene, polystyrene, polymaleinimide, polyacrylic acid, polyacrylate, polyacrylamide, polyacrylanilide), polyethers, polyesters, polycarbonates, polyamides, polyamic acids, polyimides, polyurethanes and polyureides. These may be in the polymer for improving the solubility of the polymer in solvent and for preventing aggregation of the polymer.

Preferably, the backbone chain structure of the comonomer is the same as the group of formula (A).

Specific examples of the copolymerizable constitutive units are mentioned below, to which, however, the invention should not be limited. Especially preferred are (C-2), (C-3), (C-10), (C-11), (C-12); and more preferred are (C-2), (C-11).

 (C-1)

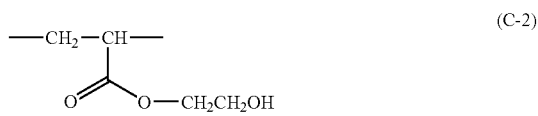 (C-2)

 (C-3)

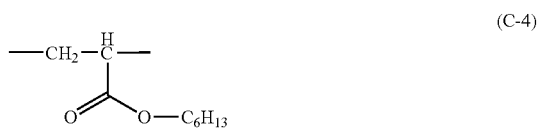 (C-4)

 (C-5)

 (C-6)

 (C-7)

 (C-8)

 (C-9)

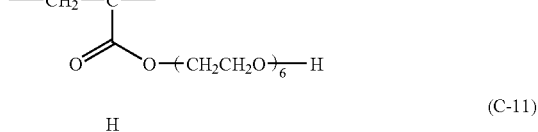 (C-10)

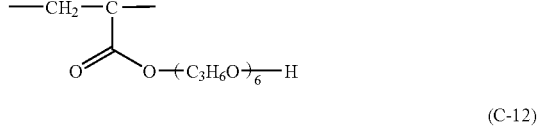 (C-11)

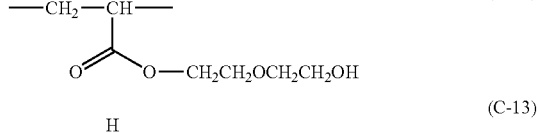 (C-12)

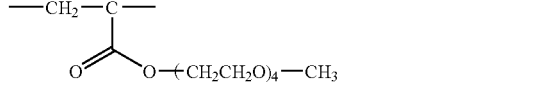 (C-13)

-continued

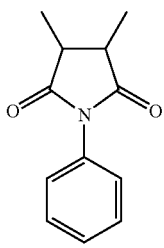
(C-14)

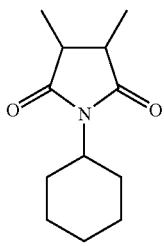
(C-15)

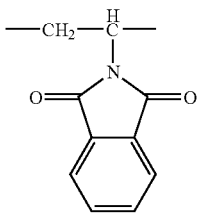
(C-16)

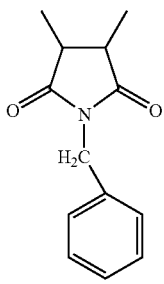
(C-17)

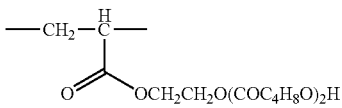
(C-18)

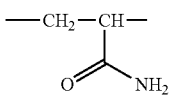
(C-19)

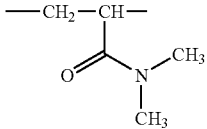
(C-20)

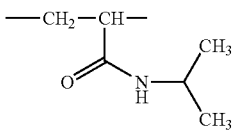
(C-21)

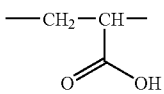
(C-22)

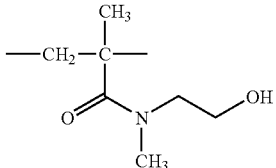
(C-23)

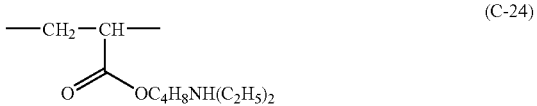
(C-24)

The content of the group of formula (A) in the polymer for use in the invention is preferably from 1 to 90% by mass, more preferably from 3 to 80% by mass.

The content of the repetitive unit derived from a fluoroaliphatic group-having monomer (preferably the group of formula (B)) in the polymer for use in the invention is from 5 to 90% by mass, more preferably from 10 to 80% by mass.

The content of the other constitutive unit than the above-mentioned two in the polymer for use in the invention is preferably at most 60% by mass, more preferably at most 50% by mass.

The copolymer may be a random copolymer where the constitutive units are irregularly aligned, or a block copolymer where they are regularly aligned. In the block copolymer, the constitutive units may be aligned in any order, and the same constitutive component may be aligned twice or more.

One or more different types of the group of formula (A) and the group of formula (B) may constitute the copolymer. In the copolymer that comprises two or more different types of the groups, the content of the constitutive groups is the overall content thereof.

Regarding the molecular weight range of the polymer for use in the invention, the number-average molecular weight (Mn) of the polymer is preferably from 1000 to 1,000,000, more preferably from 2000 to 200,000, even more preferably from 3000 to 100,000. The molecular weight distribution (Mw/Mn, Mw is weight-average molecular weight) of the polymer for use in the invention is preferably from 1 to 4, more preferably from 1 to 3.

The amount of the polymer to be in the composition of the invention is preferably from 0.001 to 10% by mass of the liquid-crystal compound therein, more preferably from 0.01 to 5.0% by mass, even more preferably from 0.05 to 1.0% by mass.

Preferred examples of the polymer to be in the composition of the invention are shown in Table 1 below.

TABLE 1

| Constitution of Repetitive Units in Polymer to be in Composition | Copolymerization Ratio (% by mass) | Number-Average Molecular Weight (Mn) | Weight-average molecular (Mw/Mn) |
|---|---|---|---|
| AD-1 A-1/B-3/C11 | 10/40/50 | 11000 | 2.45 |
| AD-2 A-5/B-3/C11 | 30/40/30 | 9500 | 2.40 |
| AD-3 A-1/A-22/B-3 | 5/55/40 | 9000 | 2.35 |
| AD-4 A-12/A-22/B-3 | 5/55/40 | 10500 | 2.45 |
| AD-5 A-12/B-3/C11 | 5/55/40 | 8500 | 2.35 |
| AD-6 A-15/B-3/C11 | 40/30/30 | 10000 | 2.32 |
| AD-7 A-6/B-3/C2 | 15/40/45 | 9700 | 2.55 |
| AD-8 A-6/B-3/C11 | 15/40/45 | 12000 | 2.35 |
| AD-9 A-1/B-3/C11 | 40/30/30 | 13000 | 2.50 |

The polymer for use in the invention may be produced in any known method. The polymer for use in the invention may be produced through addition, condensation or substitution or a combination of any of these. Not specifically defined, when the polymer for use in the invention has an ethylenic repetitive unit, then it is desirable that the polymer is produced through radical polymerization of an ethylenic unsaturated compound corresponding to the repetitive unit, as the method is simple.

Liquid-Crystal Compound:

Not specifically defined, the liquid-crystal compound for use in the invention is preferably discotic liquid-crystal compound, more preferably a liquid-crystal compound having a discotic nematic phase.

Examples of the liquid-crystal compound for use in the invention are those of the following formula (DI):

Compound of Formula (DI):

The compound of formula (DI) for use in the invention is 0.20 preferably a discotic liquid-crystal compound, more preferably a liquid-crystal compound having a discotic nematic phase.

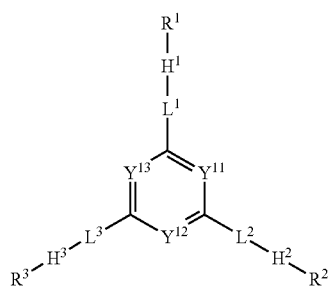
(DI)

In formula (DI), $Y^{11}$, $Y^{12}$ and $Y^{13}$ each independently represent a methine group or a nitrogen atom. When $Y^{11}$, $Y^{12}$ and $Y^{13}$ each are a methine group, the hydrogen atom of the methine group may be substituted with a substituent. The substituent that the methine group may have includes, for example, an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom, and a cyano group. Of those, preferred are an alkyl group, an alkoxy group, an alkoxycarbonyl group, an acyloxy group, a halogen atom and a cyano group; more preferred are an alkyl group having from 1 to 12 carbon atoms, an alkoxy group having from 1 to 12 carbon atoms, an alkoxycarbonyl group having from 2 to 12 carbon atoms, an acyloxy group having from 2 to 12 carbon atoms, a halogen atom and a cyano group.

Preferably, $Y^{11}$, $Y^{12}$ and $Y^{13}$ are all methine groups, more preferably unsubstituted methine groups.

In formula (DI), $L^1$, $L^2$ and $L^3$ each independently represent a single bond or a bivalent linking group. The bivalent linking group is preferably selected from —O—, —S—, —C(=O)—, —NR$^7$—, —CH=CH—, —C≡C—, a bivalent cyclic group, and their combination. $R^7$ represents an alkyl group having from 1 to 7 carbon atoms, or a hydrogen atom, preferably an alkyl group having from 1 to 4 carbon atoms, or a hydrogen atom, more preferably a methyl group, an ethyl group or a hydrogen atom, even more preferably a hydrogen atom.

The bivalent cyclic group for $L^1$, $L^2$ and $L^3$ is preferably a 5-membered, 6-membered or 7-membered group, more preferably a 5-membered or 6-membered group, even more preferably a 6-membered group. The ring in the cyclic group may be a condensed ring. However, a monocyclic ring is preferred to a condensed ring for it. The ring in the cyclic ring may be any of an aromatic ring, an aliphatic ring, or a hetero ring. Examples of the aromatic ring are a benzene ring and a naphthalene ring. An example of the aliphatic ring is a cyclohexane ring. Examples of the hetero ring are a pyridine ring and a pyrimidine ring. Preferably, the cyclic group contains an aromatic ring and a hetero ring.

Of the bivalent cyclic group, the benzene ring-having cyclic group is preferably a 1,4-phenylene group. The naphthalene ring-having cyclic group is preferably a naphthalene-1,5-diyl group or a naphthalene-2,6-diyl group. The pyridine ring-having cyclic group is preferably a pyridine-2,5-diyl group. The pyrimidine ring-having cyclic group is preferably a pyrimidin-2,5-diyl group.

The bivalent cyclic group for $L^1$, $L^2$ and $L^3$ may have a substituent. Examples of the substituent are a halogen atom, a cyano group, a nitro group, an alkyl group having from 1 to 16 carbon atoms, an alkenyl group having from 2 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms.

$L^1$, $L^2$ and $L^3$ are preferably a single bond, *—O—CO—, *—CO—O—, *—CH=CH—, *—C≡C—, *-bivalent cyclic group-, *—O—CO-bivalent cyclic group-, *—CO—O-bivalent cyclic group-, *—CH=CH-bivalent cyclic group-, *—C≡C-bivalent cyclic group-, *-bivalent cyclic group-O—CO—, *-bivalent cyclic group-CO—O—, *-bivalent cyclic group-CH=CH—, or *-bivalent cyclic group-1-. More preferably, they are a single bond, *—CH=CH—, *—C≡C—, *—CH=CH-bivalent cyclic group- or *—C≡C-bivalent cyclic group-, even more preferably a single bond. * indicates the position at which the group bonds to the 6-membered ring of formula (DI) that contains $Y^{11}$, $Y^{12}$ and $Y^{13}$ In formula (DI), $H^1$, $H^2$ and $H^3$ each independently represent the following formula (DI-A) or (DI-B):

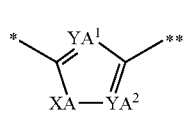
(DI-A)

In formula (DI-A), $YA^1$ and $YA^2$ each independently represent a methine group or a nitrogen atom. Preferably, at least one of $YA^1$ and $YA^2$ is a nitrogen atom, more preferably they are both nitrogen atoms. XA represents an oxygen atom, a sulfur atom, a methylene group or an imino group. XA is preferably an oxygen atom. * indicates the position at which the formula bonds to any of $L^1$ to $L^3$; and ** indicates the position at which the formula bonds to any of $R^1$ to $R^3$.

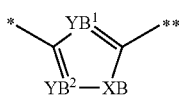

(DI-B)

In formula (DI-B), $YB^1$ and $YB^2$ each independently represent a methine group or a nitrogen atom. Preferably, at least one of $YB^1$ and $YB^2$ is a nitrogen atom, more preferably they are both nitrogen atoms. XB represents an oxygen atom, a sulfur atom, a methylene group or an imino group. XB is preferably an oxygen atom. * indicates the position at which the formula bonds to any of $L^1$ to $L^3$; and ** indicates the position at which the formula bonds to any of $R^1$ to $R^3$.

$R^1$, $R^2$ and $R^3$ each independently represent the following formula (DI-R):

Formula(DI-R)

In formula (DI-R), * indicates the position at which the formula bonds to $H^1$, $H^2$ or $H^3$ in formula (DI). $F^1$ represents a bivalent linking group having at least one cyclic structure. $L^{21}$ represents a single bond or a bivalent linking group. When $L^{21}$ is a bivalent linking group, it is preferably selected from a group consisting of —O—, —S—, —C(=O)—, —NR$^7$—, —CH=CH—, —C≡C—, and their combination. $R^7$ represents an alkyl group having from 1 to 7 carbon atoms, or a hydrogen atom, preferably an alkyl group having from 1 to 4 carbon atoms, or a hydrogen atom, more preferably a methyl group, an ethyl group or a hydrogen atom, even more preferably a hydrogen atom.

$L^{21}$ is preferably a single bond, —O—CO—, —CO—O—, CH=CH— or —C_C— (in which  indicates the left side of $L^{21}$ in formula (DI-R)). More preferably it is a single bond.

In formula (DI-R), $F^1$ represents a bivalent cyclic linking group having at least one cyclic structure. The cyclic structure is preferably a 5-membered ring, a 6-membered ring, or a 7-membered ring, more preferably a 5-membered ring or a 6-membered ring, even more preferably a 6-membered ring. The cyclic structure may be a condensed ring. However, a monocyclic ring is preferred to a condensed ring for it. The ring in the cyclic ring may be any of an aromatic ring, an aliphatic ring, or a hetero ring. Examples of the aromatic ring are a benzene ring, a naphthalene ring, an anthracene ring, a phenanthrene ring. An example of the aliphatic ring is a cyclohexane ring. Examples of the hetero ring are a pyridine ring and a pyrimidine ring.

The benzene ring-having group for $F^1$ is preferably a 1,4-phenylene group or a 1,3-phenylene group. The naphthalene ring-having group is preferably a naphthalene-1,4-diyl group, a naphthalene-1,5-diyl group, a naphthalene-1,6-diyl group, a naphthalene-2,5-diyl group, a naphthalene-2,6-diyl group, or a naphthalene-2,7-diyl group. The cyclohexane ring-having group is preferably a 1,4-cyclohexylene group. The pyridine ring-having group is preferably a pyridine-2,5-diyl group. The pyrimidine ring-having group is preferably a pyrimidin-2,5-diyl group. More preferably, $F^1$ is a 1,4-phenylene group, a 1,3-phenylene group, a naphthalene-2,6-diyl group, or a 1,4-cyclohexylene group.

$F^1$ may have a substituent. Examples of the substituent are a halogen atom (e.g., fluorine atom, chlorine atom, bromine atom, iodine atom), a cyano group, a nitro group, an alkyl group having from 1 to 16 carbon atoms, an alkenyl group having from 1 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. The substituent is preferably a halogen atom, a cyano group, an alkyl group having from 1 to 6 carbon atoms, a halogen atom-substituted alkyl group having from 1 to 6 carbon atoms, more preferably a halogen atom, an alkyl group having from 1 to 4 carbon atoms, a halogen atom-substituted alkyl group having from 1 to 4 carbon atoms, even more preferably a halogen atom, an alkyl group having from 1 to 3 carbon atoms, or a trifluoromethyl group.

n1 indicates an integer of from 0 to 4. n1 is preferably an integer of from 1 to 3, more preferably 1 or 2. When n1 is 0, then $L^{22}$ in formula (DI-R) directly bonds to any of $H^1$ to $H^3$. When n1 is 2 or more, then $(-L^{21}-F^1)$'s may be the same or different.

$L^{22}$ represents —O—, —O—CO—, —CO—O—, —O—CO—O—, —S—, —NH—, —SO$_2$—, —CH$_2$—, —CH=CH— or —C≡C—, preferably —O—, —O—CO—, —CO—O—, —O—CO—O—, —CH$_2$—, —CH=CH— or —C≡C—, more preferably —O—, —O—CO—, —CO—O—, —O—CO—O—, or —CH$_2$—.

When the above group has a hydrogen atom, then the hydrogen atom may be substituted with a substituent. Examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms.

$L^{23}$ represents a bivalent linking group selected from —O—, —S—, —C(=O)—, —SO$_2$—, —NH—, —CH$_2$—, —CH=CH— and —C≡C—, and a group formed by linking two or more of these. The hydrogen atom in —NH—, —CH$_2$— and —CH=CH— may be substituted with any other substituent. Examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms. The group substituted with the substituent improves the solubility of the compound of formula (DI) in solvent, and therefore the composition of the invention containing the compound can readily form a coating liquid.

$L^{23}$ is preferably a linking group selected from a group consisting of —O—, —C(=O)—, —CH$_2$—, —CH=CH— and —C≡C—, and a group formed by linking two or more of these. $L^{23}$ preferably has from 1 to 20 carbon atoms, more preferably from 2 to 14 carbon atoms. Preferably, $L^{23}$ has from 1 to 16 (—$CH_2$—)'s, more preferably from 2 to 12 (—$CH_2$—)'s.

$Q^1$ represents a polymerizing group or a hydrogen atom. In case where the compound of formula (DI) is used in producing optical films of which the retardation is required not to change by heat, such as optical compensatory films, $Q^1$ is preferably a polymerizing group. The polymerization for the group is preferably addition polymerization (including ring-cleavage polymerization) or polycondensation. In other words, the polymerizing group preferably has a functional group that enables addition polymerization or polycondensation. Examples of the polymerizing group are shown below.

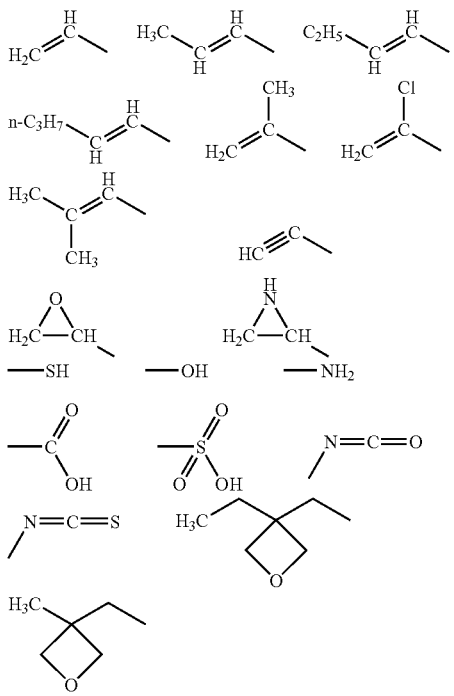

More preferably, the polymerizing group is addition-polymerizing functional group. The polymerizing group of the type is preferably a polymerizing ethylenic unsaturated group or a ring-cleavage polymerizing group.

Examples of the polymerizing ethylenic unsaturated group are the following (M-1) to (M-6):

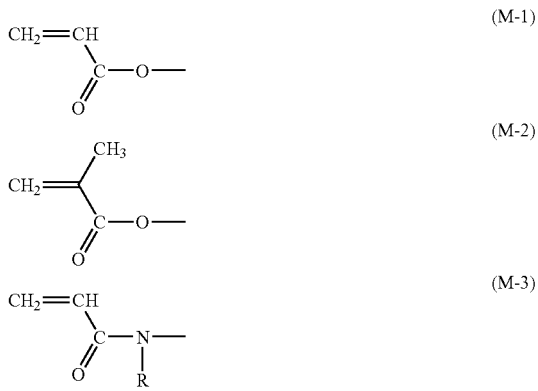

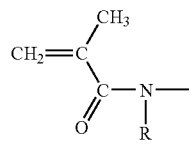

(M-4)

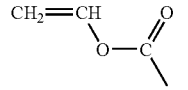

(M-5)

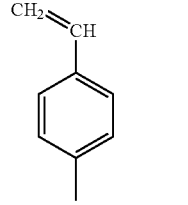

(M-6)

In formulae (M-3) and (M-4), R represents a hydrogen atom or an alkyl group. R is preferably a hydrogen atom or a methyl group. Of formulae (M-1) to (M-6), preferred are formulae (M-1) and (M-2), and more preferred is formula (M-1).

The ring-cleavage polymerizing group is preferably a cyclic ether group, more preferably an epoxy group or an oxetanyl group, most preferably an epoxy group.

A liquid-crystal compound of the following formula (DII) or a liquid-crystal compound of the following formula (DIII) is more preferred for the discotic liquid-crystal compound for use in the invention.

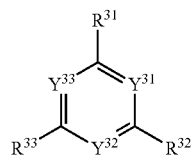

(DII)

In formula (DII), $Y^{31}$, $Y^{32}$ and $Y^{33}$ each independently represent a methine group or a nitrogen atom. $Y^{31}$, $Y^{32}$ and $Y^{33}$ have the same meaning as that of $Y^{11}$, $Y^{12}$ and $Y^{13}$ in formula (DI), and their preferred range is also the same as therein.

$R^{31}$, $R^{32}$ and $R^{33}$ each independently represent the following formula (DII-R):

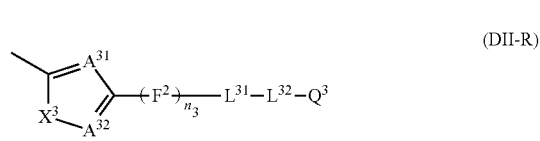

(DII-R)

In formula (DII-R), $A^{31}$ and $A^{32}$ each independently represent a methine group or a nitrogen atom. Preferably, at least one of $A^{31}$ and $A^{32}$ is a nitrogen atom; most preferably the two are both nitrogen atoms.

$X^3$ represents an oxygen atom, a sulfur atom, a methylene group or an imino group. Preferably, $X^3$ is an oxygen atom.

In formula (DII-R), $F^2$ represents a bivalent cyclic linking group having a 6-membered cyclic structure. The 6-membered ring in $F^2$ may be a condensed ring. However, a monocyclic ring is preferred to a condensed ring for it. The 6-membered ring in $F^2$ may be any of an aromatic ring, an aliphatic ring, or a hetero ring. Examples of the aromatic ring are a benzene ring, a naphthalene ring, an anthracene ring and a phenanthrene ring. An example of the aliphatic ring is a cyclohexane ring. Examples of the hetero ring are a pyridine ring and a pyrimidine ring.

Of the bivalent cyclic ring, the benzene ring-having cyclic group is preferably a 1,4-phenylene group or a 1,3-phenylene group. The naphthalene ring-having cyclic group is preferably a naphthalene-1,4-diyl group, a naphthalene-1,5-diyl group, a naphthalene-1,6-diyl group, a naphthalene-2,5-diyl group, a naphthalene-2,6-diyl group, or a naphthalene-2,7-diyl group. The cyclohexane ring-having cyclic group is preferably a 1,4-cyclohexylene group. The pyridine ring-having cyclic group is preferably a pyridine-2,5-diyl group. The pyrimidine ring-having cyclic group is preferably a pyrimidin-2,5-diyl group. More preferably, the bivalent cyclic group is a 1,4-phenylene group, a 1,3-phenylene group, a naphthalene-2,6-diyl group, or a 1,4-cyclohexylene group.

$F^2$ may have a substituent. Examples of the substituent are a halogen atom (e.g., fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. The substituent of the bivalent cyclic group is preferably a halogen atom, a cyano group, an alkyl group having from 1 to 6 carbon atoms, a halogen atom-substituted alkyl group having from 1 to 6 carbon atoms, more preferably a halogen atom, an alkyl group having from 1 to 4 carbon atoms, a halogen atom-substituted alkyl group having from 1 to 4 carbon atoms, even more preferably a halogen atom, an alkyl group having from 1 to 3 carbon atoms, or a trifluoromethyl group.

n3 indicates an integer of from 1 to 3. n3 is preferably 1 or 2. When n3 is 2 or more, then $F^2$'s may be the same or different.

$L^{31}$ represents —O—, —O—CO—, —CO—O—, —O—CO—O—, —S—, —NH—, —SO$_2$—, —CH$_2$—, —CH=CH— or —C≡C—. When the above group has a hydrogen atom, then the hydrogen atom may be substituted with a substituent. The preferred range of $L^{31}$ may be the same as that of $L^{22}$ in formula (DI-R).

$L^{32}$ represents a bivalent linking group selected from —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent. The preferred range of $L^{32}$ may be the same as that of $L^{23}$ in formula (DI-R).

$Q^3$ represents a polymerizing group or a hydrogen atom, and its preferred range is the same as that of $Q^1$ in formula (DI-R).

Compounds of formula (DIII) are described in detail.

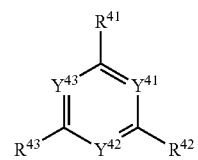

In formula (DIII), $Y^{41}$, $Y^{42}$ and $Y^{43}$ each independently represent a methine group or a nitrogen atom. When $Y^{41}$, $Y^{42}$ and $Y^{43}$ each are a methine group, the hydrogen atom of the methine group may be substituted with a substituent. Preferred examples of the substituent that the methine group may have are an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom, and a cyano group. Of those, more preferred are an alkyl group, an alkoxy group, an alkoxycarbonyl group, an acyloxy group, a halogen atom and a cyano group; even more preferred are an alkyl group having from 1 to 12 carbon atoms, an alkoxy group having from 1 to 12 carbon atoms, an alkoxycarbonyl group having from 2 to 12 carbon atoms, an acyloxy group having from 2 to 12 carbon atoms, a halogen atom and a cyano group.

Preferably, $Y^{41}$, $Y^{42}$ and $Y^{43}$ are all methine groups, more preferably unsubstituted methine groups.

$R^{41}$, $R^{42}$ and $R^{43}$ each independently represent the following formula (DIII-A), (DIII-B) or (DIII-C).

When a retardation plate and the like having a small wavelength dispersion are produced, $R^{41}$, $R^{42}$ and $R^{43}$ are preferably formula (DIII-A) or (DIII-C), more preferably formula (DIII-A).

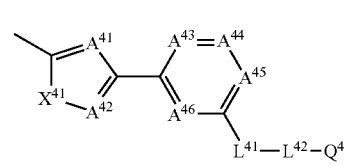

In formula (DIII-A), $A^{41}$, $A^{42}$, $A^{43}$, $A^{44}$, $A^{45}$ and $A^{46}$ each independently represent a methine group or a nitrogen atom. Preferably, at least one of $A^{41}$ and $A^{42}$ is a nitrogen atom; more preferably the two are both nitrogen atoms. Preferably, at least three of $A^{43}$, $A^{44}$, $A^{45}$ and $A^{46}$ are methine groups; more preferably, all of them are methine groups. When $A^{43}$, $A^{44}$, $A^{45}$ and $A^{46}$ are methine groups, the hydrogen atom of the methine group may be substituted with a substituent. Examples of the substituent that the methine group may have are a halogen atom (fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

$X^{41}$ represents an oxygen atom, a sulfur atom, a methylene group or an imino group, but is preferably an oxygen atom.

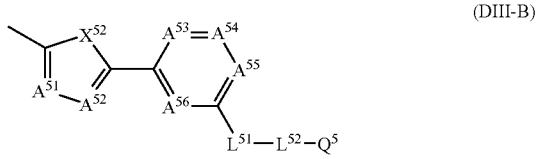

(DIII-B)

In formula (DIII-B), $A^{51}$, $A^{52}$, $A^{53}$, $A^{54}$, $A^{55}$ and $A^{56}$ each independently represent a methine group or a nitrogen atom. Preferably, at least one of $A^{51}$ and $A^{52}$ is a nitrogen atom; more preferably the two are both nitrogen atoms. Preferably, at least three of $A^{53}$, $A^{54}$, $A^{55}$ and $A^{56}$ are methine groups; more preferably, all of them are methine groups. When $A^{53}$, $A^{54}$, $A^{55}$ and $A^{56}$ are methine groups, the hydrogen atom of the methine group may be substituted with a substituent. Examples of the substituent that the methine group may have are a halogen atom (fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

$X^{52}$ represents an oxygen atom, a sulfur atom, a methylene group or an imino group, but is preferably an oxygen atom.

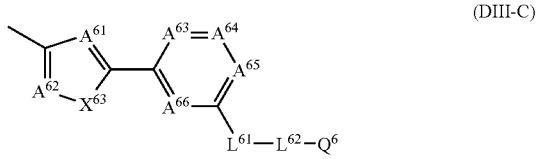

(DIII-C)

In formula (DIII-C), $A^{61}$, $A^{62}$, $A^{63}$, $A^{64}$, $A^{65}$ and $A^{66}$ each independently represent a methine group or a nitrogen atom. Preferably, at least one of $A^{61}$ and $A^{62}$ is a nitrogen atom; more preferably the two are both nitrogen atoms. Preferably, at least three of $A^{63}$, $A^{64}$, $A^{65}$ and $A^{66}$ are methine groups; more preferably, all of them are methine groups. When $A^{63}$, $A^{64}$, $A^{65}$ and $A^{66}$ are methine groups, the hydrogen atom of the methine group may be substituted with a substituent. Examples of the substituent that the methine group may have are a halogen atom (fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

$X^{63}$ represents an oxygen atom, a sulfur atom, a methylene group or an imino group, but is preferably an oxygen atom.

$L^{41}$ in formula (DIII-A), $L^{51}$ in formula (DIII-B) and $L^{61}$ in formula (DIII-C) each independently represent —O—, —O—CO—, —CO—O—, —O—CO—O—, —S—, —NH—, —SO$_2$—, —CH$_2$—, —CH═CH— or —C≡C—; preferably —O—, —O—CO—, —CO—O—, —O—CO—O—, —CH$_2$—, —CH═CH— or —C≡C—; more preferably —O—, —O—CO—, —CO—O—, —O—CO—O— or —CH$_2$—. When above group has a hydrogen atom, then the hydrogen atom may be substituted with a substituent.

Preferred examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms.

$L^{42}$ in formula (DIII-A), $L^{52}$ in formula (DIII-B) and $L^{62}$ in formula (DIII-C) each independently represent a bivalent linking group selected from —O—, —S—, —C(═O)—, —SO$_2$—, —NH—, —CH$_2$—, —CH═CH— and —C≡C—, and a group formed by linking two or more of these. The hydrogen atom in —NH—, —CH$_2$— and —CH═CH— may be substituted with a substituent. Preferred examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms.

Preferably, $L^{42}$, $L^{52}$ and $L^{62}$ each independently represent a bivalent linking group selected from —O—, —C(═O)—, —CH$_2$—, —CH═CH— and —C≡C—, and a group formed by linking two or more of these. Preferably, $L^{42}$, $L^{52}$ and $L^{62}$ each independently have from 1 to 20 carbon atoms, more preferably from 2 to 14 carbon atoms. Preferably, $L^{42}$, $L^{52}$ and $L^{62}$ each independently have from 1 to 16 (—$CH_2$—)'s, more preferably from 2 to 12 (—$CH_2$—)'s.

$Q^4$ in formula (DIII-A), $Q^5$ in formula (DIII-B) and $Q^6$ in formula (DIII-C) each independently represent a polymerizing group or a hydrogen atom. Their preferred range is the same as that of $Q^1$ in formula (DI-R).

Specific examples of the compounds of formulae (DI), (DII) and (DIII) are shown below, to which, however, the invention should not be limited.

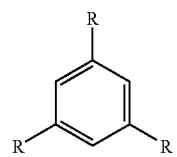 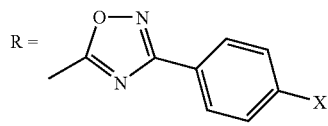 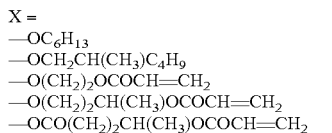

X =                                              D-1
—$OC_6H_{13}$                                   D-2
—$OCH_2CH(CH_3)C_4H_9$                           D-3
—$O(CH_2)_2OCOCH=CH_2$                           D-4
—$O(CH_2)_2CH(CH_3)OCOCH=CH_2$                   D-5
—$OCO(CH_2)_2CH(CH_3)OCOCH=CH_2$

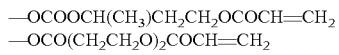

—$OCOOCH(CH_3)CH_2CH_2OCOCH=CH_2$                D-6
—$OCO(CH_2CH_2O)_2COCH=CH_2$                     D-7

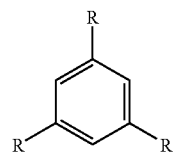 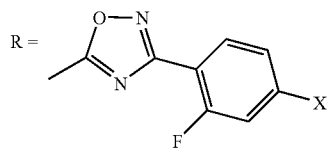 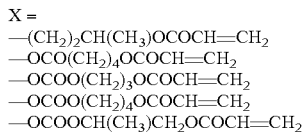

X =                                              D-8
—$(CH_2)_2CH(CH_3)OCOCH=CH_2$                    D-9
—$OCO(CH_2)_4OCOCH=CH_2$                         D-10
—$OCOO(CH_2)_3OCOCH=CH_2$                        D-11
—$OCOO(CH_2)_4OCOCH=CH_2$                        D-12
—$OCOOCH(CH_3)CH_2OCOCH=CH_2$

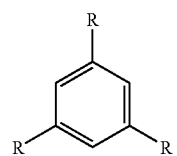 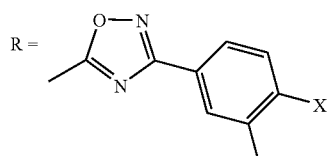 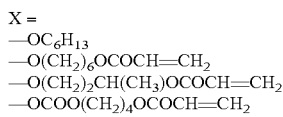

X =                                              D-13
—$OC_6H_{13}$                                   D-14
—$O(CH_2)_6OCOCH=CH_2$                           D-15
—$O(CH_2)_2CH(CH_3)OCOCH=CH_2$                   D-16
—$OCOO(CH_2)_4OCOCH=CH_2$

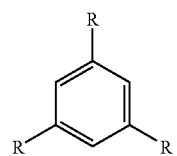 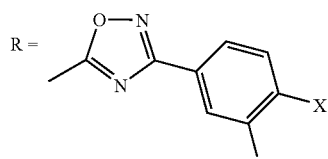 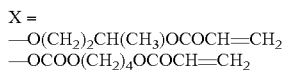

X =                                              D-17
—$O(CH_2)_2CH(CH_3)OCOCH=CH_2$                   D-18
—$OCOO(CH_2)_4OCOCH=CH_2$

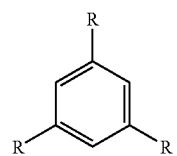 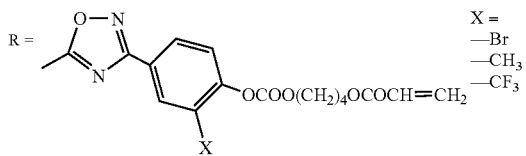

X =                                              D-19
—Br                                              D-20
—$CH_3$                                          D-21
—$CF_3$

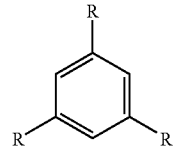 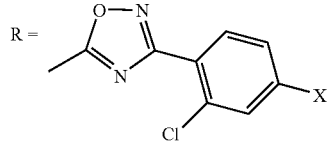

X = —$(CH_2)_6OCOCH=CH_2$                        D-22

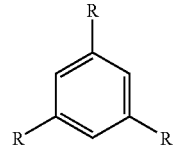 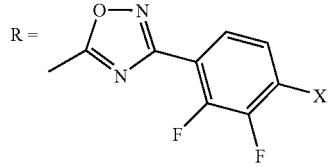

X = —$OCOO(CH_2)_4OCOCH=CH_2$                    D-23

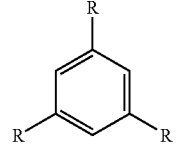 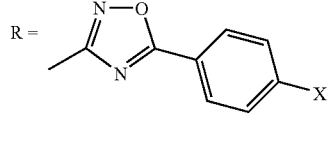

X = —$O(CH_2)_6OCOCH=CH_2$                       D-24

-continued
| | | | |
|---|---|---|---|
| 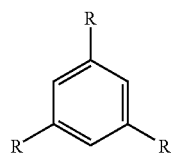 | R = 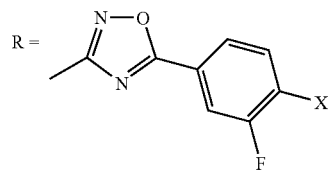 | X = —OCOO(CH$_2$)$_2$OCOCH=CH$_2$ | D-25 |
| 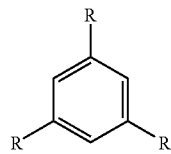 | R = 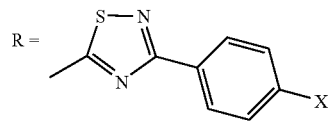 | X = —O(CH$_2$)$_6$OCOCH=CH$_2$ | D-26 |
| 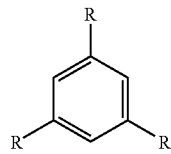 | R = 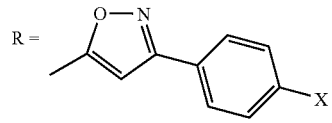 | X = —OCO(CH$_2$)$_3$OCOCH=CH$_2$ | D-27 |
| 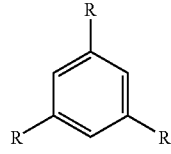 | R = 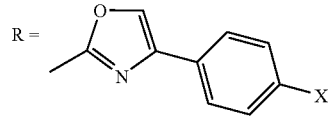 | X =<br>—O(CH$_2$)$_6$OCOCH=CH$_2$<br>—OCO(CH$_2$)$_3$OCOCH=CH$_2$ | D-28<br>D-29 |
| 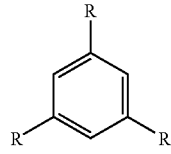 | R = 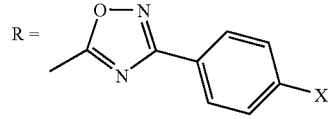 | X = 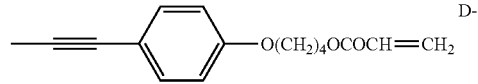 | D-30<br>D-31 |
| 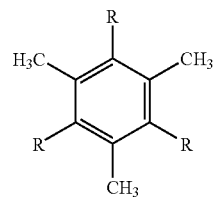 | R = 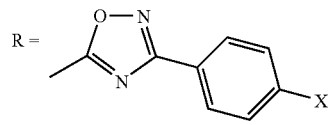 | X = —O(CH$_2$)$_2$OCOCH=CH$_2$ | D-32 |
| 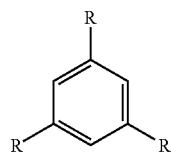 | R = 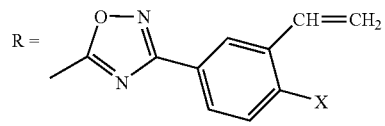 | —O(CH$_2$)$_3$OCOCH=CH$_2$ | D-33 |
| 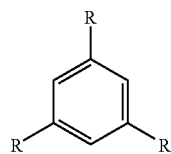 | R = 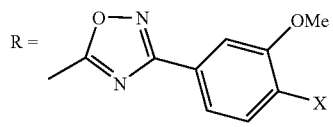 | —O(CH$_2$)$_4$OCOCH=CH$_2$ | D-34 |
| 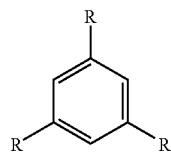 | R = 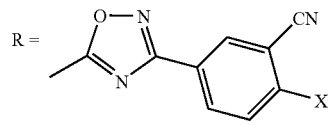 | —O(CH$_2$)$_4$OCOCH=CH$_2$ | D-35 |

-continued
| | | | | |
|---|---|---|---|---|
| 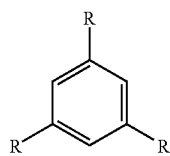 | R = 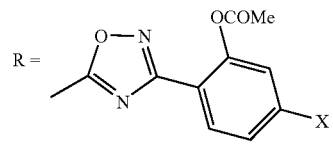 | | —O(CH₂)₃OCOCH=CH₂ | D-36 |
| 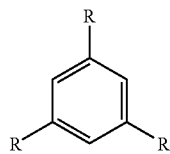 | R = 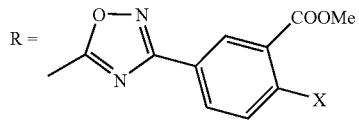 | | —O(CH₂)₄OCOCH=CH₂ | D-37 |
| 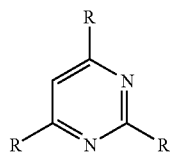 | R = 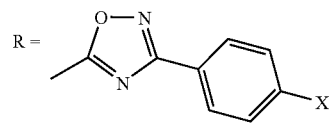 | | —O(CH₂)₃OCOCH=CH₂ | D-38 |
| 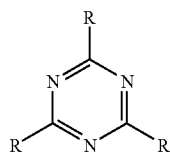 | R = 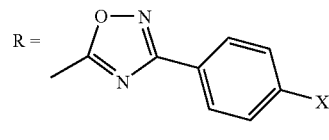 | | —O(CH₂)₄OCOCH=CH₂ | D-39 |
| 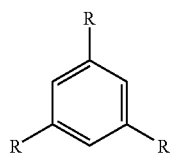 | R = 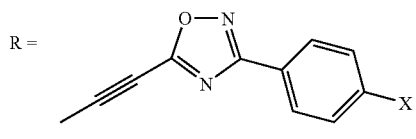 | | X = —O(CH₂)₂OCOCH=CH₂ | D-40 |
| 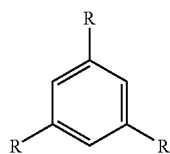 | R = 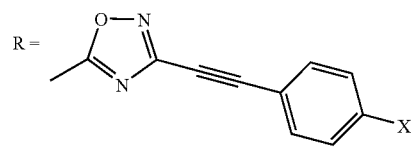 | | X = —O(CH₂)₂OCOCH=CH₂ | D-41 |
| | 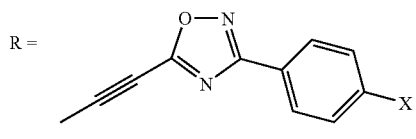 | | X = —O(CH₂)₂OCOCH=CH₂ | D-42 |
| 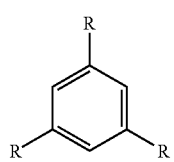 | R = 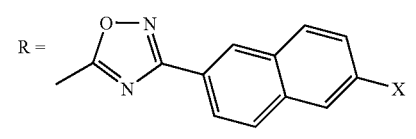 | | X = —OCOO(CH₂CH₂O)₂COCH=CH₂ | D-43 |
| 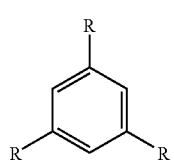 | R = 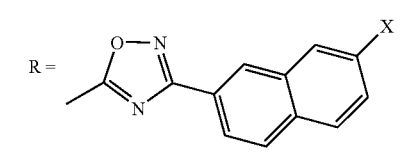 | | X = —OCOO(CH₂CH₂O)₂COCH=CH₂ | D-44 |

Compounds of formula (DIII) are shown below.

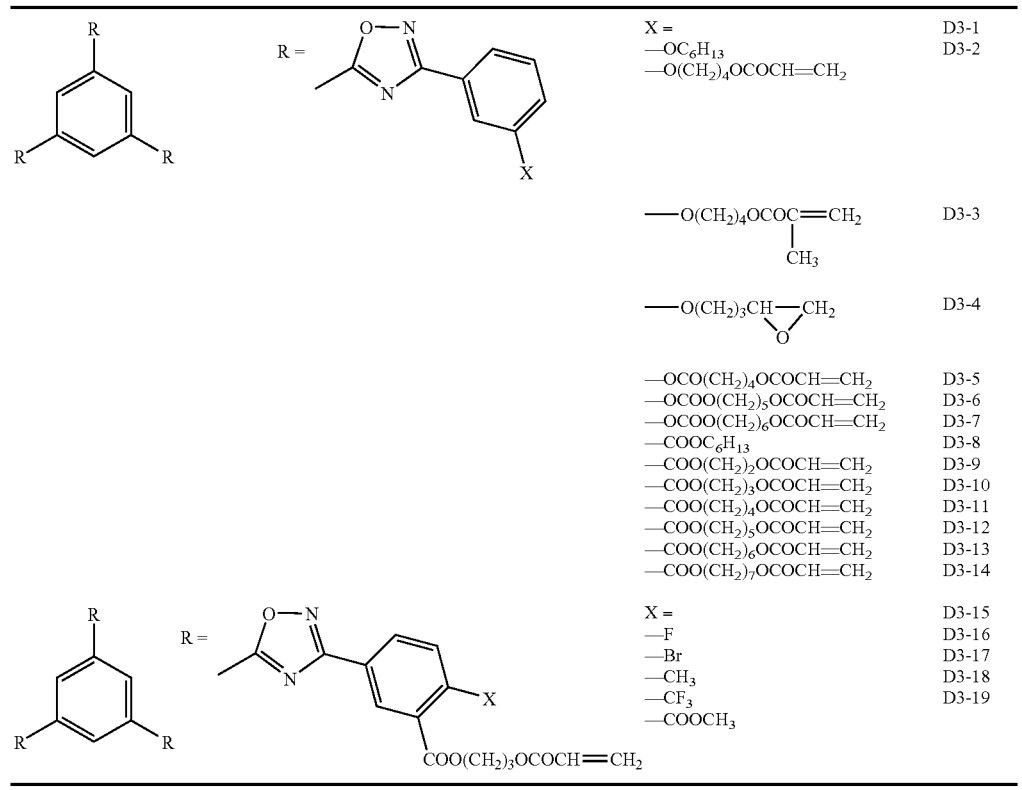

The compounds of the formulae (DI), (DII) and (DII) for used in the invention may be produced in any known method.

As the liquid-crystal compound for used in the invention, only one kind of the compounds of the formulae (DI), (DII) and (DII), or two or more thereof may be used. Further, at least one kind of discotic or rod-shaped liquid-crystal compounds having a different structure from the compounds of the formulae (DI), (DII) and (DII) may be used together with it. Using it in combination with a discotic liquid-crystal compound is preferable, and using it in combination with a liquid-crystal compound represented by the following formula (T) is more preferable. By using together with at least two kinds of discotic compounds, a tilt angle at the air surface can be reduced, and temperature dependency of the average tilt angle is easy to be released.

Formula (T)

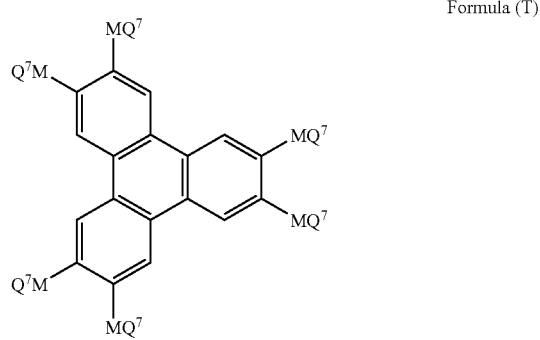

wherein M represents a bivalent linking group, which may be the same or different; $Q^7$ represents a polymerizable group or a hydrogen atom, which may be the same or different.

In the above formula, the bivanet linking group (M) is preferably an alkylene group, an alkenylene group, an arylene group, —CO—, —NH—, —O— and —S—, and a bivalent linking formed by linking two or more thereof. The bivalent linking group (M) is more preferably a bivalent linking group formed by linking at least two groups selected from an alkylene group, an alkenylene group, an arylene group, —CO—, —NH—, —O— and —S—. The bivalent linking group (M) is further preferably a bivalent linking group formed by linking of at least two groups selected from an alkylene group, an alkenylene group, an arylene group, —CO— and —O—. The number of the carbon atoms of the alkylene group is preferably 1 to 12, more preferably 2 to 12, and further more preferably 6 to 10. The alkylene group, the alkenylene group and the arylene group may have a substituent, for example, an alkyl group, a harogen atom, a ciano group, an alkoxy group and an acyloxy group. Specific examples of the bivalent linking group (M) are shown below. In the examples, left side bonds the triphenylene discotic core (TD), and right side bonds the polymerizable group (O). AL means an alkylene group or an alkenylene group, and AR means an arylene group.

M1: -AL-CO—O-AL-
M2: -AL-CO—O-AL-O—
M3: -AL-CO—O-AL-O-AL-
M4: -AL-CO—O-AL-O—CO—
M5:—CO-AR-O-AL-
M6:—CO-AR-O-AL-O—
M7:—CO-AR-O-AL-O—CO—

M8: —CO—NH-AL-
M9: —NH-AL-O—
M10: —NH-AL-O—CO—
M11: —O-AL-
M12: —O-AL-O—
M13: —O-AL-O—CO—
M14: —O-AL-O—CO—NH-AL-
M15: —O-AL-S-AL-
M16: —O—CO-AL-AR-O-AL-O—CO—
M17: —O—CO-AR-O-AL-CO—
M18: —O—CO-AR-O-AL-O—CO—
M19: —O—CO-AR-O-AL-O-AL-O—C
M20: —O—CO-AR-O-AL-O-AL-O-AL-O—CO—
M21: —S-AL-
M22: —S-AL-O—
M23: —S-AL-O—CO—
M24: —S-AL-S-AL-
M25: —S-AR-AL- $Q^7$ represents a polymerizable group or a hydrogen atom, the preferable range thereof is the same as $Q^1$ in the formula (DI-R).

Specific examples of the compounds of formula (T) are shown below, to which, however, the invention should not be limited.

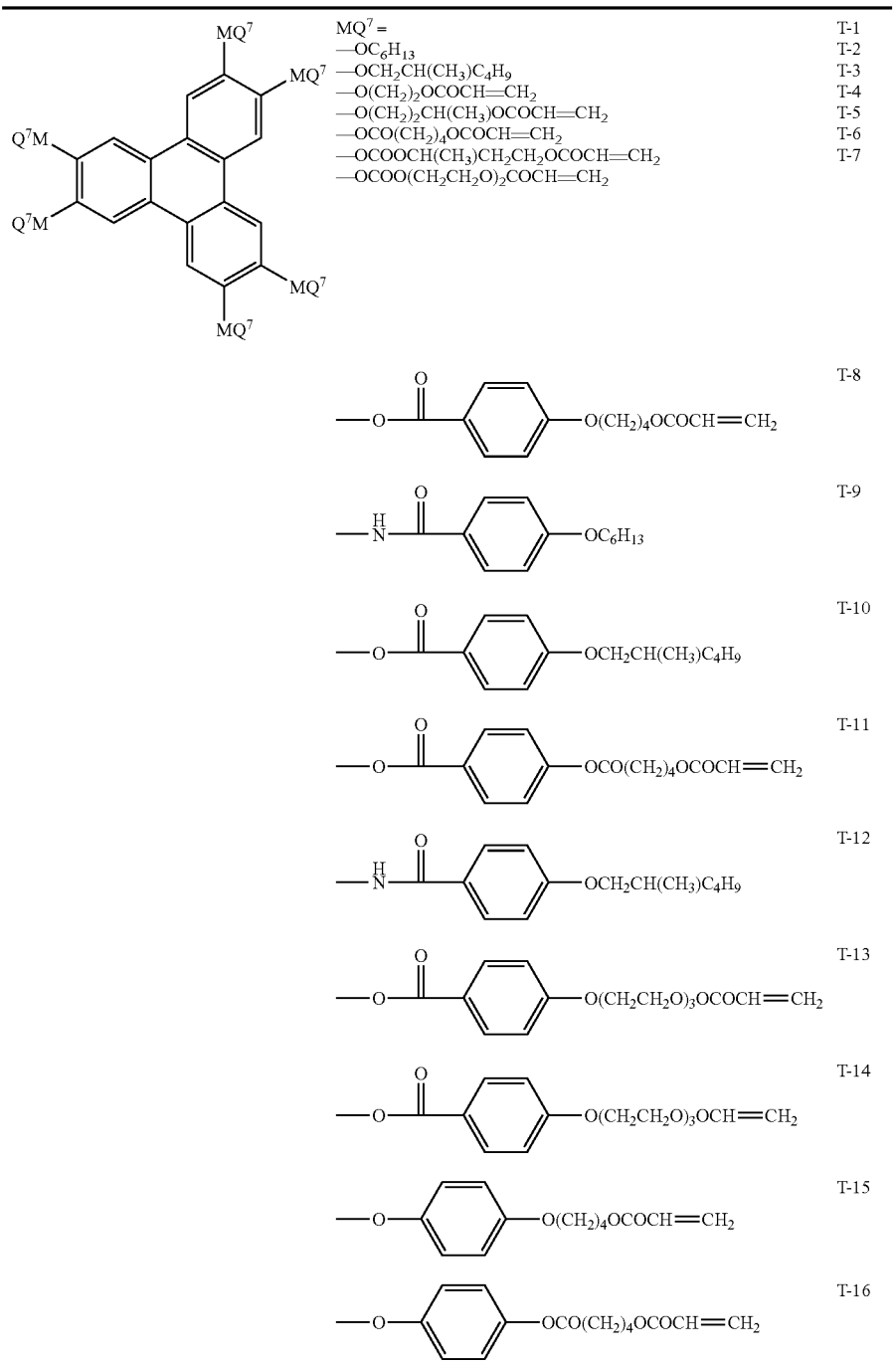

-continued

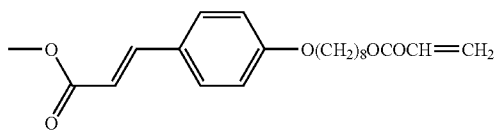

T-17

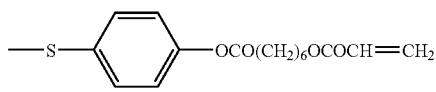

T-18

The compounds of the formula (T) for used in the invention may be produced in any known method.

The compounds of the formula (T) is preferably added in the range of 1 to 20% by weight relative to the compounds of the formulae (DI), (DII) and (DIII), more preferably in the range of 3 to 15% by weight, and further more preferably in the range of 5 to 10% by weight.

The liquid-crystal phase that the liquid-crystal compound of the invention expresses includes a columnar phase and a discotic nematic phase (ND phase). Of those liquid-crystal phases, preferred is a discotic nematic phase (ND phase) having a good monodomain property.

Preferably, the liquid-crystal compound for used in the invention expresses a liquid-crystal phase at a temperature falling within a range of from 20° C. to 300° C., more preferably from 40° C. to 280° C., even more preferably from 60° C. to 250° C. The wording "expresses a liquid-crystal phase at a temperature falling within a range of from 20° C. to 300° C." as referred to herein means that the liquid-crystal temperature range of the compound covers nearly 20° C. (concretely, for example, from 10° C. to 22° C.) and nearly 300° C. (concretely, for example, from 298° C. to 310° C.). The same shall apply to the range of from 40° C. to 280° C., and to the range of from 60° C. to 250° C.

(Retardation Plate)

The retardation plate of the invention is characterized in that it has an optically-anisotropic layer formed with the composition of the invention. One embodiment of the retardation plate of the invention comprises a support, an alignment film formed on the support and an optically-anisotropic layer formed with the composition of the invention, in which the optically-anisotropic layer is controlled for its alignment by the alignment film and this is fixed in the alignment state thereof.

The optically-anisotropic layer, the alignment film and the support are sequentially described below.

(1) Optically-Anisotropic Layer:

The optically-anisotropic layer in the invention is formed with a composition that comprises a liquid-crystal compound of formula (DI) and a polymer having a structure of formula (A). In addition to these, the optically-anisotropic layer may optionally contain a polymerization initiator and any other additives. A coating liquid comprising them may be applied, for example, onto the surface of an alignment film formed on a support, and the liquid-crystal compound in the coating layer may be thereby aligned and fixed to form the intended optically-anisotropic layer. After the liquid-crystal compound in the thus-formed layer has been aligned and fixed therein, the support may be peeled away.

(1)-a Method of Layer Formation:

The optically-anisotropic layer may be formed by applying a coating liquid, which is prepared by dissolving a liquid-crystal compound of formula (DI) and a polymer in a solvent capable of dissolving them, onto an alignment film formed on a support and aligned thereon. If possible, the layer may also be formed in a mode of vapor deposition, but is preferably formed according to such a coating method. The coating method may be any known method of curtain-coating, dipping, spin-coating, printing, spraying, slot-coating, roll-coating, slide-coating, blade-coating, gravure-coating or wire bar-coating. Next, the coating layer is dried at 25° C. to 130° C. to remove the solvent, whereupon the molecules of the liquid-crystal compound therein are aligned and fixed by irradiation with UV rays, and the intended optically-anisotropic layer is thus formed. UV rays are preferably used for irradiation with light for polymerization. The irradiation energy is preferably from 20 mJ/cm$^2$ to 50 J/cm$^2$, more preferably from 100 mJ/cm$^2$ to 800 mJ/cm$^2$. For promoting the optical polymerization, the light irradiation may be attained under heat. Thus formed, the thickness of the optically-anisotropic layer may vary, depending on the optimum retardation value in accordance with the use of the layer for optical compensation or the like, but is preferably from 0.1 to 10 μm, more preferably from 0.5 to 5 μm.

Preferably, the molecules of the liquid-crystal compound are substantially uniformly aligned in the optically-anisotropic layer; more preferably, the molecules are fixed while substantially uniformly aligned therein; most preferably, the liquid-crystal compound is fixed through polymerization.

The ratio of the compound of formula (DI) or a polymer obtained from the compound of formula (DI) in the optically-anisotropic layer is preferably from 10 to 100% by mass, more preferably from 30 to 99% by mass, most preferably from 50 to 99% by mass.

(1)-b Other Materials for Use in Formation of Optically-Anisotropic Layer:

Preferably, the liquid-crystal compound is fixed while kept aligned in the optically-anisotropic layer, in which it is desirable that the fixation of the liquid-crystal compound is attained through polymerization of the polymerizing group introduced into the compound. For this, the coating liquid for the layer preferably contains a polymerization initiator. Polymerization includes thermal polymerization with a thermal polymerization initiator, photopolymerization with a photopolymerization initiator, and EB curing with electronic beams. Of those, preferred are photopolymerization (photo-curing) and EB curing. Preferred examples of the polymerization initiator that generates a radical by the action of light given thereto are α-carbonyl compounds (as in U.S. Pat. Nos. 2,367,661, 2,367,670), acyloin ethers (as in U.S. Pat. No. 2,448,828) α-hydrocarbon-substituted aromatic acyloin compounds (as in U.S. Pat. No. 2,722,512), polycyclic quinone compounds (as in U.S. Pat. Nos. 3,046,127, 2,951, 758), combination of triarylimidazole dimer and p-aminophenyl ketone (as in U.S. Pat. No. 3,549,367), acridine and phenazine compounds (as in JP-A 60-105667, U.S. Pat. No. 4,239,850) and oxadiazole compounds (as in U.S. Pat. No. 4,212,970), acetophenone compounds, benzoin ether compounds, benzyl compounds, benzophenone compounds, thioxanthone compounds. The acetophenone compounds include, for example, 2,2-diethoxyacetophenone, 2-hydroxymethyl-1-phenylpropan-1-one, 4'-isopropyl-2-hydroxy-2-methyl-propiophenone, 2-hydroxy-2-methyl-propiophenone, p-dimethylaminoacetone, p-tert-butyldichloroacetophenone, p-tert-butyltrichloroacetopheone, p-azidobenzalacetophenone. The benzyl compounds include, for example, benzyl, benzyl dimethyl ketal, benzyl β-methoxyethyl acetal, 1-hydroxycyclohexyl phenyl ketone. The benzoin ether compounds include, for example, benzoin, benzoin methyl ether, benzoin ethyl ether, benzoin n-propyl ether, benzoin isopropyl ether, benzoin n-butyl ether, benzoin isobutyl ether. The benzophenone compounds include, for example, benzophenone, methyl o-benzoylbenzoate, Michler's ketone, 4,4'-bisdiethylaminobenzophenone, 4,4'-dichlorobenzophenone. The thioxanthone compounds include, for example, thioxanthone, 2-methylthioxanthone, 2-ethylthioxanthone, 2-isopropylthioxanthone, 4-isopropylthioxanthone, 2-chlorothioxanthone, 2,4-diethylthioxanthone. Of those aromatic ketones serving as a light-sensitive radical polymerization initiator, more preferred are acetophenone compounds and benzyl compounds in point of their curing capability, storage stability and odorlessness. One or more such aromatic ketones may be used herein as a light-sensitive radical polymerization initiator, either singly or as combined depending on the desired performance of the initiator. For the purpose of increasing the sensitivity thereof, a sensitizer may be added to the polymerization initiator. Examples of the sensitizer are n-butylamine, triethylamine, tri-n-butyl phosphine, thioxanthone.

Plural types of the photopolymerization initiators may be combined and used herein, and the amount thereof is preferably from 0.01 to 20% by mass of the solid content of the coating liquid, more preferably from 0.5 to 5% by mass. For light irradiation for polymerization of the liquid-crystal compound, preferably used are UV rays.

The solvent to be used in preparing the coating liquid for the optically-anisotropic layer is preferably an organic solvent. Examples of the organic solvent are amides (e.g., N,N-dimethylformamide), sulfoxides (e.g., dimethylsulfoxide), heterocyclic compounds (e.g., pyridine), hydrocarbons (e.g., toluene, hexane), alkyl halides (e.g., chloroform, dichloromethane), esters (e.g., methyl acetate, butyl acetate), ketones (e.g., acetone, 2-butanone, methyl isobutyl ketone, cyclohexanone), ethers (e.g., tetrahydrofuran, 1,2-dimethoxyethane). Of those, preferred are alkyl halides and ketones. Two or more different types of organic solvents may be combined for use herein.

The solid concentration of the liquid-crystal compound and other additives in the composition of the invention is preferably from 0.1% by mass to 60% by mass, more preferably from 0.5% by mass to 50% by mass, even more preferably 2% by mass to 40% by mass.

(1)-c Alignment State:

When used in a TN (twisted nematic) liquid-crystal mode retardation plate, the optically-anisotropic layer formed with the composition of the invention is preferably such that its discotic nematic phase is in a hybrid alignment state. "Hybrid alignment" as referred to herein means that the tilt angle of the liquid-crystal compound in the layer continuously varies in the direction of the thickness of the film.

When applied onto a support (more preferably onto an alignment film), a liquid-crystal compound may express its liquid-crystal phase, for example, after heated thereon. Accordingly, in the interface adjacent to the support, the liquid-crystal compound may be aligned at a tilt angle to the support surface or to the coating film interface (when an alignment film is provided, this is the alignment film interface) (for example, when a discotic liquid-crystal compound is used, the tilt angle is an angle formed by the direction of the support surface and the direction of the disc face of the liquid-crystal compound), and in interface adjacent to air, the compound may be aligned at a tilt angle to the air interface.

In the invention, the mean tilt angle of the optically-anisotropic layer (for example, the angle formed by the direction of the support surface and the direction of the disc face of the discotic liquid-crystal compound) is preferably from 10 to 400, more preferably from 25 to 35°.

(2) Alignment Film:

An alignment film may be used in forming the retardation plate of the invention. The alignment film may be formed, for example, through rubbing treatment of a compound (preferably polymer), oblique vapor deposition of an inorganic compound, formation of a microgrooved layer, or accumulation of an organic compound (e.g., ω-tricosanoic acid, dioctadecylmethylammonium chloride, methyl stearate) according to a Langmuir-Blodgett's method (LB film). Further, there are known other alignment films that may have an alignment function through impartation of an electric field or magnetic field thereto or through light irradiation thereto.

In principle, the polymer to be used for the alignment film has a molecular structure that has the function of aligning liquid-crystal molecules. Preferably, the polymer for use in the invention has crosslinking functional group (e.g., double bond)-having side branches bonded to the backbone chain thereof or has a crosslinking functional group having the function of aligning liquid-crystal molecules introduced into the side branches thereof, in addition to having the function of aligning liquid-crystal molecules. The polymer to be used for the alignment film may be a polymer that is crosslinkable by itself or a polymer that is crosslinkable with a crosslinking agent, or may also be a combination of the two.

Examples of the polymer are methacrylate polymers, styrene polymers, polyolefins, polyvinyl alcohols and modified polyvinyl alcohols, poly(N-methylolacrylamides), polyesters, polyimides, vinyl acetate polymers, carboxymethyl cellulose and polycarbonates, as in JP-A 8-338913, [0022]. A silane coupling agent is also usable as the polymer. Preferably, the polymer is a water-soluble polymer (e.g., poly(N-methylolacrylamide), carboxymethyl cellulose, gelatin, polyvinyl alcohol, modified polyvinyl alcohol), more preferably gelatin, polyvinyl alcohol or modified polyvinyl alcohol, even more preferably polyvinyl alcohol or modified polyvinyl alcohol. Especially preferably, two different types of polyvinyl alcohols or modified polyvinyl alcohols having a different degree of polymerization are combined for use as the polymer.

Preferably, the degree of saponification of polyvinyl alcohol for use herein is from 70 to 100%, more preferably from 80 to 100%. Also preferably, the degree of polymerization of polyvinyl alcohol is from 100 to 5000.

The side branches having the function of aligning liquid-crystal molecules generally have a hydrophobic group as the functional group. Concretely, the type of the functional group may be determined depending on the type of the liquid-crystal molecules to be aligned and on the necessary alignment state of the molecules.

For example, the modifying group of modified polyvinyl alcohol may be introduced into the polymer through copolymerization modification, chain transfer modification or block polymerization modification. Examples of the modifying group are a hydrophilic group (e.g., carboxylic acid group, sulfonic acid group, phosphonic acid group, amino group, ammonium group, amido group, thiol group), a hydrocarbon group having from 10 to 100 carbon atoms, a fluorine atom-substituted hydrocarbon group, a thioether group, a polymerizing group (e.g., unsaturated polymerizing group, epoxy group, aziridinyl group), and an alkoxysilyl group (e.g., trialkoxy group, dialkoxy group, monoalkoxy group). Specific examples of such modified polyvinyl alcohol compounds are described, for example, in JP-A 2000-155216, [0022] to [0145], and in JP-A 2002-62426, [0018] to [0022].

When crosslinking functional group-having side branches are bonded to the backbone chain of an alignment film polymer, or when a crosslinking functional group is introduced into the side branches of a polymer having the function of aligning liquid-crystal molecules, then the polymer of the alignment film may be copolymerized with the polyfunctional monomer in an optically-anisotropic layer. As a result, not only between the polyfunctional monomers but also between the alignment film polymers, and even between the polyfunctional monomer and the alignment film polymer, they may be firmly bonded to each other in a mode of covalent bonding to each other. Accordingly, introducing such a crosslinking functional group into an alignment film polymer significantly improves the mechanical strength of the resulting retardation plate.

Preferably, the crosslinking functional group of the alignment film polymer contains a polymerizing group, like the polyfunctional monomer. Concretely, for example, those described in JP-A 2000-155216, [0080] to [0100] are referred to herein.

Apart from the above-mentioned crosslinking functional group, the alignment film polymer may also be crosslinked with a crosslinking agent.

The crosslinking agent includes, for example, aldehydes, N-methylol compounds, dioxane derivatives, compounds capable of being active through activation of the carboxyl group thereof, active vinyl compounds, active halide compound, isoxazoles and dialdehyde starches. Two or more different types of crosslinking agents may be combined for use herein. Concretely, for example, the compounds described in JP-A 2002-62426, [0023] to [0024] are employable herein. Preferred are aldehydes of high reactivity, and more preferred is glutaraldehyde.

Preferably, the amount of the crosslinking agent to be added to polymer is from 0.1 to 20% by mass of the polymer, more preferably from 0.5 to 15% by mass. Also preferably, the amount of the unreacted crosslinking agent that may remain in the alignment film is at most 1.0% by mass, more preferably at most 0.5% by mass. When the crosslinking agent in the alignment film is controlled to that effect, then the film ensures good durability with no reticulation even though it is used in liquid-crystal display devices for a long period of time and even though it is left in a high-temperature high-humidity atmosphere for a long period of time.

Basically, the alignment film may be formed by applying the alignment film-forming material of the above-mentioned polymer to a crosslinking agent-containing transparent support, then heating and drying it for crosslinking it and then optionally rubbing the thus-formed film. The crosslinking reaction may be effected in any stage after the film-forming material has been applied onto the transparent support, as so mentioned hereinabove. When a water-soluble polymer such as polyvinyl alcohol is used as the alignment film-forming material, then it is desirable that the solvent for the coating solution is a mixed solvent of a defoaming organic solvent (e.g., methanol) and water. The ratio by mass of water/methanol is preferably (more than 0 to 99)/(100 to less than 1), more preferably (more than 0 to 91)/(less than 100 to 9). The mixed solvent of the type is effective for preventing the formation of bubbles in the coating solution and, as a result, the surface defects of the alignment film and even the optically-anisotropic layer are significantly reduced.

For forming the alignment film, preferably employed is a spin-coating method, a dip-coating method, a curtain-coating method, an extrusion-coating method, a rod-coating method or a roll-coating method. Especially preferred is a rod-coating method. Also preferably, the thickness of the film is from 0.1 to 10 μm, after dried. The drying under heat may be effected, for example, at 20 to 110° C. For sufficient crosslinking, the heating temperature is preferably from 60 to 100° C., more preferably from 80 to 100° C. The drying time may be from 1 minute to 36 hours, but preferably from 1 to 30 minutes. The pH of the coating solution is preferably so defined that it is the best for the crosslinking agent used. For example, when glutaraldehyde is used, the pH of the coating solution is preferably from 4.5 to 5.5, more preferably pH 5.

The alignment film is provided on a support or on an undercoat layer. The alignment film may be formed by crosslinking the polymer layer as above, and then rubbing the surface of the layer.

For the rubbing treatment, usable is any method widely employed for liquid crystal alignment treatment in producing LCD devices. Concretely, for example, the surface of an alignment film is rubbed in a predetermined direction by the use of paper, gauze, felt, rubber, nylon, or polyester fibers, whereby the film may be aligned in the intended direction. In general, a cloth uniformly planted with fibers having the same length and the same thickness is used, and the surface of the film is rubbed a few times with the cloth. A rubbing roll having a roundness, cylindricalness and deflection (eccentricity) of 30 μm is preferably used to perform rubbing. The lapping angle of the film on the rubbing roll is preferably from 0.10° to 90°. As disclosed in JP-A-8-160430, the film can be wound up for 360° or on the rubbing roll to attain stable rubbing.

In order to subject a film of continuous length to rubbing, the film is preferably conveyed with a constant tension at a rate of from 1 to 100 m/min over a conveying device. The rubbing roll is preferably arranged so as to freely rotate parallel to the moving direction of the film to attain arbitrary predetermination of rubbing angle. The rubbing angle is preferably predetermined within a range of from 0° to 60°.

In order to subject a film of continuous length to rubbing, the film is preferably conveyed with a constant tension at a rate of from 1 to 100 m/min over a conveying device. The rubbing roll is preferably arranged so as to freely rotate parallel to the moving direction of the film to attain arbitrary predetermination of rubbing angle. The rubbing angle is preferably predetermined within a range of from 0° to 60°. When the polarizing film is incorporated in a liquid crystal display device, the rubbing angle is preferably from 40° to 50°, particularly preferably 45°.

After the liquid-crystal compound is aligned on the alignment film, if desired, the alignment film polymer and the polyfunctional monomer in the optically-anisotropic layer may be reacted, or the alignment film polymer may be crosslinked with a crosslinking agent. Preferably, the thickness of the alignment film is from 0.1 to 10 μm. A coating solution prepared by dissolving the above-mentioned alignment film polymer in a solvent is applied onto the surface of a support, and then the solvent in the coating solution is removed and dried at 25° C. to 140° C. to thereby form the intended alignment film. If possible, the film may also be formed in a mode of vapor deposition, but is preferably formed according to a coating process. The thickness of the alignment film thus formed is preferably from 0.01 to 5 μm, more preferably from 0.05 to 2 μm.

The solvent for use in preparing the alignment film-forming coating solution includes, for example, water, alcohols (e.g., methanol, ethanol, isopropanol), amides (e.g., N,N-dimethylformamide), acetonitrile, acetone, methyl ethyl ketone, methyl isobutyl ketone, ethyl acetate; preferably water, alcohols and their mixed solvents. The concentration of the alignment film polymer in the coating solution is preferably from 0.1% by mass to 40% by mass, more preferably from 0.5% by mass to 20% by mass, even more preferably from 2% by mass to 10% by mass. The viscosity of the coating solution is preferably from 0.1 cp to 100 cp, more preferably from 0.5 cp to 50 cp.

The coating solution may contain any other additives in addition to the above-mentioned alignment film polymer therein. For example, when the alignment film polymer is hardly soluble in a water-soluble solvent, then a basic compound (e.g., sodium hydroxide, lithium hydroxide, triethylamine) or an acid compound (e.g., hydrochloric acid, acetic acid, succinic acid) may be added thereto to promote its dissolution in the solvent.

The alignment film formed according to the above method is preferably rubbed on its surface thereby having a property of aligning liquid-crystal molecules. The rubbing treatment may be attained by rubbing the surface of the polymer-coated surface a few times with paper or cloth in one direction (generally in the machine direction). Apart from such rubbing treatment, the alignment film may also be processed for impartation of an electric field of a magnetic field thereto, thereby having a property of aligning liquid-crystal molecules. For making the alignment film have the property of aligning liquid-crystal molecules, preferred is the method of rubbing the alignment film in which the thus-rubbed polymer may have the intended property.

(3) Optically Anisotropic Layer 2

The present optically compensatory film may have a second optically anisotropic layer in addition to the first optically anisotropic layer. The second optically compensatory layer enhances display properties of a liquid-crystal display device as well as works as a support of the first optically anisotropic layer. The second optically anisotropic layer is used for a support having optically anisotropic properties.

The optically anisotropic layer 2 is composed of at least one sheet of polymer film. A plurality of polymer films may be used to form an optically anisotropic layer 2 having the optical anisotropy defined herein. However, the optical anisotropy defined herein can be realized with one sheet of polymer film. Accordingly, the optically anisotropic layer 2 is particularly preferably composed of one sheet of polymer film.

Specifically, the optically anisotropic layer 2 preferably exhibits a Rth retardation value of from 100 nm to 300 nm, more preferably from 150 nm to 200 nm at a wavelength of 550 nm. The optically anisotropic layer 2 preferably exhibits a Re retardation value of from 30 nm to 60 nm, more preferably from 35 nm to 50 nm.

The polymer constituting the optically anisotropic layer 2 is preferably a cellulose-based polymer, more preferably a cellulose ester, even more preferably a lower aliphatic ester of cellulose. The term "lower aliphatic acid" as used herein is meant to indicate an aliphatic acid having 6 or less carbon atoms. The polymer is preferably a cellulose acylate having 2 to 4 carbon atoms, particularly preferably a cellulose acetate. A mixed aliphatic acid ester such as cellulose acetate propionate and cellulose acetate butyrate may be used.

The viscosity average polymerization degree (DP) of the cellulose acetate is preferably 250 or more, more preferably 290 or more. The cellulose acetate preferably has a sharp molecular mass distribution Mw/Mn (in Mw represents weight-average molecular weight and Mn represents a number-average molecular weight) as determined by gel permeation chromatography. In some detail, Mw/Mn is preferably from 1.00 to 1.70, more preferably from 1.30 to 1.65, most preferably from 1.40 to 1.60.

The percent acetylation of cellulose acetate is preferably from 55.0% to 62.5%, more preferably from 57.0% to 62.0%. The term "percent acetylation" as used herein is meant to indicate the weight of acetic acid bonded per weight of glucopyranose unit. The percent acetylation is determined by the measurement and calculation of acylation degree according to ASTM: D-817-91 (testing method on cellulose acylate, etc.).

A cellulose acylate tends to have hydroxyl group substituted less in the 6-position rather than uniformly in the 2-position, 3-position and 6-position. The cellulose acylate to be used in the invention preferably has a cellulose substitution degree in the 6-position which is the same as or greater that that in the 2- and 3-positions.

The proportion of the substitution degree in the 6-position in the sum of the substitution degree in the 2-, 3- and 6-positions is preferably from 30% to 40%, more preferably from 31% to 40%, most preferably from 32% to 40%. The substitution degree in the 6-position is preferably 0.88 or more.

For the details of cellulose acylate and its synthesis method, reference can be made to Kokai Giho No. 2001-1745, page 9, Japan Institute of Invention and Innovation.

In order to adjust the retardation value of cellulose acetate, it is normally practiced to apply an external force such as stretching to the cellulose acetate. A retardation developer may be added to adjust the optical anisotropy of the cellulose acetate. As the retardation developer there is preferably used an aromatic compound having at least two aromatic rings. The aromatic compound is preferably used in an amount of from 0.01 to 20 parts by weight based on 100 parts by weight of the polymer. Two or more aromatic compounds may be used in combination. Examples of the aromatic ring in the aromatic compound include aromatic heterocycles in addition to aromatic hydrocarbon rings.

For the details of retardation developer, reference can be made to European Patent Application Disclosure No. 0911656, JP-A-2000-111914 and JP-A-2000-275434.

The cellulose acetate film preferably exhibits a moisture expansion coefficient of $30 \times 10^{-5}$% RH or less, more preferably $15 \times 10^{-5}$% RH or less, most preferably $10 \times 10^{-5}$% RH or less.

The moisture expansion coefficient of the cellulose acetate film is preferably as small as possible but is normally $1.0 \times 10^{-5}$% RH or less. The term "moisture expansion coefficient" as used herein is meant to indicate the change of length of the sample developed when the relative humidity is changed at a constant temperature. By adjusting the moisture expansion coefficient of the cellulose acetate film, the frame-shaped rise of the transmission (light leakage due to strain) can be prevented while keeping the optically compensatory film capable of optically compensating.

For the measurement of moisture expansion coefficient, the polymer film is cut into a sample having a width of 5 mm and a length of 20 mm. The sample is then suspended in an atmosphere of 25° C. and 20% RH (R0) with one end fixed and the other end having a weight of 0.5 g suspended therefrom for 10 minutes. The length (L0) of the sample is then measured. Subsequently, the sample is suspended in an atmosphere of 25° C. and 80% RH (R1) for 10 minutes. The length (L1) of the sample is then measured. The moisture expansion coefficient is calculated by the following equation. The measurement is made on 10 specimens for each sample. The measurements are then averaged.

Moisture expansion coefficient [% RH]={($L1-L0$)/ $L0$}/($R1-R0$)

In order to reduce the dimensional change of the cellulose acetate film with moisture, it is preferred that the cellulose acetate film have a hydrophilic compound incorporated therein. The hydrophobic compound may be in particulate form. The hydrophobic compound is preferably selected from the group consisting of plasticizers and deterioration inhibitors. The hydrophobic compound preferably has a hydrocarbon group (aliphatic group, aromatic group) as a hydrophobic group. The added amount of the hydrophobic compound is preferably from 0.01% to 10% by weight based on the amount of the polymer solution (dope) to be prepared.

In order to reduce the dimensional change of the polymer film with moisture, it is also effective to reduce the free volume in the polymer film. For example, the residual solvent content in the solvent casting method described later can be reduced to reduce the free volume. The polymer film is preferably dried under the conditions that the residual solvent content in the polymer film reaches a range of from 0.01% to 1.00% by weight.

Examples of the additives to be incorporated in the polymer film include ultraviolet inhibitors, release agents, antistatic agents, deterioration inhibitors (e.g., oxidation inhibitor, peroxide decomposer, radical inhibitor, metal inactivator, acid scavenger, amine), and infrared absorbers.

In the case where the polymer film is composed of a number of layers, the kind and added amount of additives may differ from layer to layer. For the details of the additives, reference can be made to Japan Institute of Invention and Innovation's Kokai Giho 2001-1745, pp. 16 to 22. The amount of the additives to be incorporated in the polymer film is normally from 0.001% to 25% by weight based on the amount of the polymer film.

The cellulose acetate film is preferably produced by a solvent casting method. In the solvent casting method, a solution of a polymer material in an organic solvent (dope) is used to produce a film.

Preferred examples of the organic solvent include ethers having 3 to 12 carbon atoms, ketones having 3 to 12 carbon atoms, esters having 3 to 12 carbon atoms, and halogenated hydrocarbons having carbon atoms 1 to 6. These ethers, ketones and esters may have a cyclic structure. A compound having two or more of etheric, ketonic and esteric functional groups (i.e., —O—, —CO— and —COO—) may be used as an organic solvent. The organic solvent may have other functional groups such as alcoholic hydroxyl group. The number of carbon atoms in the organic solvent having two or more functional groups, if used, may be arbitrary so far as it satisfies the requirements for compound having any of these functional groups.

Examples of the ethers having 3 to 12 carbon atoms employable herein include diisopropyl ether, dimethoxymethane, dimethoxy ethane, 1,4-dioxane, 1,3-dioxolane, tetrahydrofurane, anisole, and phenethol. Examples of the ketones having 3 to 12 carbon atoms employable herein include acetone, methyl ethyl ketone, diethyl ketone, diisobutyl ketone, cyclohexanone, and methyl cyclohexanone. Examples of the esters having 3 to 12 carbon atoms employable herein include ethyl formate, propyl formate, pentyl formate, methyl acetate, ethyl acetate, and pentyl acetate. Examples of the organic solvent having two or more functional groups include 2-methoxyethyl acetate, 2-methoxyethanol, and 2-butoxyethanol. The number of carbon atoms in the halogenated hydrocarbon is preferably 1 or 2, most preferably 1. The halogen atom in the halogenated hydrocarbon is preferably chlorine. The proportion of hydrogen atoms substituted by halogen in the halogenated hydrocarbon is preferably from 25 mol % to 75 mol %, more preferably from 30 mol % to 70 mol %, even more preferably from 35 mol % to 65 mol %, most preferably from 40 mol % to 60 mol %. Methylene chloride is a representative example of halogenated hydrocarbon. Two or more organic solvents may be used in admixture.

An ordinary method may be used to prepare a cellulose acetate solution. The term "ordinary method" as used herein is meant to indicate that treatment is effected at a temperature of not lower than 0° C. (ordinary temperature or high temperature). The preparation of the solution can be carried out by a method and apparatus for the preparation of a dope in ordinary solvent casting methods. In ordinary methods, as an organic solvent there is preferably used a halogenated hydrocarbon (particularly methylene chloride). The content of cellulose acetate is adjusted such that cellulose acetate is incorporated in the resulting solution in an amount of from 10 to 40% by weight. The content of cellulose acetate is more preferably from 10 to 30% by weight. The organic solvent (main solvent) may have arbitrary additives described later incorporated therein. The cellulose acetate solution may be prepared by stirring the cellulose acetate and the organic solvent at ordinary temperature (0° C. to 40° C.). A high concentration solution may be stirred under pressure and heating. In some detail, the cellulose acetate and the organic solvent are put in a pressure vessel which is then sealed. The mixture is then heated to a temperature of from not lower than the boiling point of the solvent within ordinary temperature range to the temperature at which the solvent is not boiled with stirring under pressure. The heating temperature is normally not lower than 40° C., preferably from 60° C. to 200° C., more preferably from 80° C. to 110° C.

The various components may be roughly stirred before being put in the vessel. Alternatively, these components may be sequentially put in the vessel. The vessel needs to be arranged to allow agitation. An inert gas such as nitrogen gas may be injected into the vessel to press the interior of the vessel. Alternatively, the rise in the vapor pressure of the solvent by heating may be utilized. Alternatively, the various components may be added under pressure after sealing the vessel. In the case where the components are heated, the vessel may be externally heated. For example, a jacket type heating device may be used. Alternatively, a plate heater may be provided outside the vessel so that the heated liquid is circulated through a piping provided on the vessel to heat the entire vessel. The mixture is preferably stirred by an agitating blade provided inside the vessel. The agitating blade preferably has a length such that it reaches near the wall of the vessel. The agitating blade is preferably terminated by a scraper blade to renew the liquid layer on the wall of the vessel. The vessel may have instruments such as pressure gauge and thermometer provided therein. The various components are dissolved in a solvent in the vessel. The dope thus prepared is cooled, and then withdrawn from the vessel. Alternatively, the dope thus prepared is withdrawn from the vessel, and then cooled by a heat exchanger or the like.

The solution may be prepared by a cold dissolution method. In the cold dissolution method, the cellulose acetate can be dissolved even in an organic solvent in which the cellulose acetate can be difficulty dissolved by ordinary dissolution methods. Even if a solvent in which the cellulose acetate can be dissolved by ordinary methods is used, the cold dissolution method can exert an effect of rapidly obtaining a uniform solution. In the cold dissolution method, the cellulose acetate is gradually added to the organic solvent at room temperature with stirring. The content of the cellulose acetate is preferably adjusted such that the cellulose acetate is incorporated in the mixture in an amount of from 10 to 40% by weight, preferably from 10 to 30% by weight. The mixture may further comprise arbitrary additives described later incorporated therein.

Subsequently, the mixture is cooled to a temperature of from −100° C. to −10° C. (preferably from −80° C. to −10° C., more preferably from −50° C. to −20° C., most preferably from −50° C. to −30° C.). The cooling of the mixture may be effected in a dry ice-methanol bath (−75° C.) or a chilled diethylene glycol solution (−30° C. to −20° C.). In this manner, the mixture of cellulose acetate and organic solvent is solidified. The cooling rate is preferably 4° C./min or more, more preferably 8° C./min or more, most preferably 12° C./min or more. The cooling rate is preferably as high as possible. However, the theoretical upper limit of the cooling rate is 10,000° C./sec. The technical upper limit of the cooling rate is 1,000° C./sec. The practical upper limit of the cooling rate is 100° C./sec. The cooling rate is obtained by dividing the difference between the temperature at which cooling begins and the final cooling temperature by the duration between the time at which cooling begins and the time at which the final cooling temperature is reached.

Further, when the mixture thus solidified is heated to a temperature of from 0° C. to 200° C. (preferably from 0° C. to 150° C., more preferably from 0° C. to 120° C., most preferably from 0° C. to 50° C.), the cellulose acetate is dissolved in the organic solvent. The temperature rise may be carried out by allowing the mixture to stand at room temperature or by heating the mixture over a hot bath. The heating rate is preferably 4° C./min or more, more preferably 8° C./min or more, most preferably 12° C./min or more. The heating rate is preferably as high as possible. The theoretical upper limit of the heating rate is 10,000° C./sec. The technical upper limit of the heating rate is 1,000° C./sec. The practical upper limit of the heating rate is 100° C./sec. The heating rate is obtained by dividing the difference between the temperature at which heating begins and the final heating temperature by the duration between the time at which heating begins and the time at which the final heating temperature is reached. In this manner, a uniform solution is obtained. In the case where dissolution has been insufficiently made, cooling and heating may be repeated. Whether or not dissolution has been insufficiently made can be judged merely by visually observing the external appearance of the solution.

In the cold dissolution method, a sealable vessel is preferably used to avoid the entrance of water content due to moisture condensation. By effecting cooling step under pressure and heating step under reduced pressure, the dissolution time can be reduced. In order to raise and reduce the pressure, a pressure-resistant vessel is preferably used. The 20 weight % solution having a cellulose acetate (acetylation degree: 60.9%; viscosity-average polymerization degree: 299) dissolved in methyl acetate by a cold dissolution method shows a quasi-phase transition point between sol and gel at around 33° C. and becomes uniform gel at a temperature of not higher than 33° C. Accordingly, this solution needs to be stored at a temperature of not lower than the quasi-phase transition temperature, preferably a temperature of about 10° C. higher than the gel phase transition temperature. However, the quasi-phase transition temperature varies with the acylation degree and viscosity-average polymerization degree of cellulose acetate, the concentration of the solution or the organic solvent used.

The cellulose acetate solution (dope) thus prepared can be then subjected to solvent casting to produce a cellulose acylate film. The dope thus prepared is casted over a drum or band so that the solvent is evaporated to form a film. The dope to be casted is preferably adjusted in its concentration such that the solid content is from 18 to 35% by weight. The surface of the drum or band is preferably previously mirror-like finished. For the details of casting and drying in the solvent casting method, reference can be made to U.S. Pat. No. 2,336,310, U.S. Pat. No. 2,367,603, U.S. Pat. No. 2,492,078, U.S. Pat. No. 2,492,977, U.S. Pat. No. 2,492,978, U.S. Pat. No. 2,607,704, U.S. Pat. No. 2,739,069, U.S. Pat. No. 2,739,070, British Patent 640,731, British Patent 736,892, JP-B-45-4554, JP-A-49-5614, JP-A-60-176834, JP-A-60-203430, and JP-A-62-115035. The dope is preferably casted onto a drum or band having a surface temperature of 10° C. or less. The dope thus casted is preferably dried with an air wind for 2 or more seconds. The film thus obtained is peeled off the drum or band, and then optionally dried with a hot air wind having a successive temperature change from 100° C. to 160° C. so that the residual solvent is evaporated. For the details of this method, reference can be made to JP-B-5-17844. In this manner, the time between casting and peeling can be reduced. In order to execute this method, it is necessary that the dope undergo gelation at the surface temperature of the drum or band during casting.

The cellulose acylate solution (dope) thus prepared may be casted into two or more layers to form a film. In this case, a solvent casting method is preferably employed to prepare a cellulose acylate film. In some detail, the dope is casted over a drum or band where the solvent is then evaporated to form a film. The dope which is ready to be casted is preferably adjusted in its concentration such that the solid content reaches a range of from 10% to 40%. The drum or band is preferably mirror-finished.

In order to cast two or more cellulose acylate solutions, a solution containing a cellulose acylate may be discharged and casted from a plurality of casting nozzles capable of casting a plurality of cellulose acylate solutions provided apart from each other at an interval along the movement of the support so that they are laminated to prepare a film. For example, methods as disclosed in JP-A-61-158414, JP-A-1-122419 and JP-A-1-198285 can be applied. Alternatively, a cellulose acylate solution may be casted from two casting nozzles to form a film. For example, methods as disclosed in JP-B-60-27562, JP-A-61-94724, JP-A-61-947245, JP-A-61-104813, JP-A-61-158413 and JP-A-6-134933 can be applied. Further, a cellulose acylate film casting method which comprises wrapping a high viscosity cellulose acylate solution flow with a low viscosity cellulose acylate, and then extruding the high and low viscosity cellulose acylate solutions at the same time as disclosed in JP-A-56-162617 may be used.

Alternatively, two casting nozzles may be used such that a film formed on a support from a first casting nozzle is peeled off the support and a cellulose acylate solution is then casted over the film on the side thereof in contact with the surface of the metallic support to form a film as disclosed in JP-B-44-20235. The cellulose acylate solutions to be casted may be the same or different and are not specifically limited. In order to functionalize the plurality of cellulose acylate layers, cellulose acylate solutions corresponding to respective functions may be extruded from respective casting nozzles. The cellulose acylate solution of the invention may be casted at the same time with other functional layers (e.g., adhesive layer, dye layer, antistatic layer, antihalation layer, UV absorption layer, polarizing layer).

In order to form a film having a desired thickness from the related art single layer solution, it is necessary that a cellulose acylate solution having a high concentration and a high viscosity be extruded. In this case, a problem often arises that the cellulose acylate solution exhibits a poor stability and thus forms a solid material that causes the generation of granular structure or poor planarity. In order to solve these problems, a plurality of cellulose acylate solutions can be casted through casting ports, making it possible to extrude high viscosity solutions onto the metallic support at the same time. In this manner, a film having an improved planarity and hence excellent surface conditions can be prepared. Further, the use of a highly concentrated cellulose acylate solution makes it possible to attain the reduction of the drying load that can enhance the production speed of film.

The cellulose acetate film may comprise a plasticizer incorporated therein to improve the mechanical physical properties or enhance the drying speed. As the plasticizer there may be used a phosphoric acid ester or carboxylic acid ester. Examples of the phosphoric acid ester include triphenyl phosphate (TPP) and tricresyl phosphate (TCP). Representative examples of the carboxylic acid ester include phthalic acid ester and citric acid ester. Examples of the phthalic acid ester include dimethyl phthalate (DMP), diethyl phthalate (DEP), dibutyl phthalate (DBP), dioctyl phthalate (DOP), diphenyl phthalate (DPP), and diethylhexyl phthalate (DEHP). Examples of the citric acid ester include O-acetylcitric acid triethyl (OACTE) and O-acetyltricitric acid tributyl (OACTB). Other examples of carboxylic acid ester include butyl oleate, methyl acetyl ricinoleate, dibutyl sebacate, and various trimellitic acid esters. Phthalic acid ester-based plasticizers (DMP, DEP, DBP, DOP, DPP, DEHP) are preferably used. DEP and DPP are particularly preferred. The added amount of the plasticizer is preferably from 0.1% to 25% by weight, more preferably from 1% to 20% by weight, most preferably from 3% to 15% by weight based on the amount of the cellulose ester.

The cellulose acylate film is preferably subjected to surface treatment. Examples of the surface treatment include corona discharge treatment, glow discharge treatment, flame treatment, acid treatment, alkaline saponification, and ultraviolet irradiation. For the details of surface treatment, reference can be made to Japan Institute of Invention and Innovation's Kokai Giho 2001-1745, pp. 30 to 32.

The alkaline saponification is carried out by dipping the cellulose acylate film in a saponifying solution or spreading the saponifying solution over the cellulose acylate film. The spreading method is preferably used. Examples of the spreading method include dip coating method, curtain coating method, extrusion coating method, bar coating method, and E type coating method. The alkali to be used herein is preferably a hydroxide of alkaline metal (e.g., potassium, sodium). In other words, the alkaline treatment solution is preferably a solution of a hydroxide of an alkaline metal. The concentration of hydroxide ions in the solution is preferably from 0.1 N to 3.0 N.

A solvent having good wetting properties with respect to film, a surface active agent and a wetting agent (e.g., diol, glycerin) may be incorporated in the alkaline treatment solution to improve the wetting properties of the alkaline treatment solution with respect to the second optically anisotropic layer and the stability of the alkaline treatment solution. Preferred examples of the solvent having good wetting properties with respect to film include alcohols (e.g., isopropyl alcohol, n-butanol, methanol, ethanol). For the details of additives for alkaline treatment solution, reference can be made to JP-A-2002-82226 and International Patent Application 02/46809 (pamphlet).

An undercoat layer (as disclosed in JP-A-7-333433) may be provided in place of or in addition to surface treatment. A plurality of undercoat layers may be provided. For example, a polymer layer containing both hydrophobic and hydrophilic groups may be provided as a first undercoat layer. A hydrophilic polymer layer which can be fairly adhered to the alignment film may be provided on the first undercoat layer as a second undercoat layer (as disclosed in JP-A-11-248940).

(Polarizing Plate)

The optical film of the invention is stuck to a polarizing film to form a polarizing plate.

Examples of the polarizing film include aligned polarizing film and coated polarizing film (produced by Optiva Inc.). The aligned polarizing film is composed of a binder and iodine or dichroic dye. Iodine and dichroic dye are aligned in the binder to perform polarizing properties. Iodine and dichroic dye are preferably aligned along the binder molecules. Alternatively, dichroic dye is preferably aligned in one direction by self-structuring as performed in liquid crystal.

Commercially available aligned polarizing films are prepared by dipping a stretched polymer in an iodine or dichroic dye solution in a tank so that the binder is impregnated with iodine or dichroic dye. A commercially available polarizing film has iodine or dichroic dye distributed therein over the region extending from the surface of the polymer to a depth of about 4 μm (about 8 μm in total on both sides). In order to obtain sufficient polarizing properties, at least 10 μm thickness is needed. The penetration of iodine and dichroic dye can be controlled by the concentration of the iodine and dichroic dye solution, the tank temperature and the dipping time.

The thickness of the polarizing film is preferably not greater than that of commercially available polarizing plates (about 30 μm), more preferably 25 μm or less, most preferably 20 μm or less. When the thickness of the polarizing plate is 20 μm or less, light leakage can be no longer observed with 17-inch liquid crystal display devices.

The binder in the polarizing film may be crosslinked. As the polarizing film binder there may be used a polymer which is crosslinkable itself. A polymer having a functional group or a polymer having a functional group incorporated therein can be irradiated with light or given heat or pH change, the functional group is reacted so that the polymers are crosslinked to form a polarizing film. Alternatively, a crosslinking agent may be used to introduce a crosslinked structure into the polymer. A crosslinking agent which is a compound having a high reaction activity may be used to introduce a linkage group derived from crosslinking agent between the binders so that the binder molecules are crosslinked to form a polarizing film.

Crosslinking can be normally effected by spreading a coating solution containing a crosslinkable polymer or a mixture thereof with a crosslinking agent over a transparent support, and then heating the coated material. Since it suffices if the desired durability of the final commercial product is assured, the crosslinking treatment may be effected at any step up to the point at which the final polarizing plate product is obtained.

As the binder of the polarizing film there may be used a polymer which is crosslinkable itself or a polymer which is crosslinked with a crosslinking agent. Examples of the polymer employable herein include polymethyl methacrylates, polyacrylic acids, polymethacrylic acids, polystyrenes, polyvinyl alcohols, modified polyvinyl alcohols, poly(N-methylol acrylamide), polyvinyl toluenes, chlorosulfonated polyethylenes, nitrocelluloses, chlorinated polyolefins (e.g., polyvinyl chloride), polyesters, polyimides, polyvinyl acetates, polyethylenes, carboxymethyl celluloses, polypropylenes, polycarbonates, and copolymers thereof (e.g., acrylic acid/methacrylic acid copolymer, styrene/maleimide copolymer, styrene/vinyl toluene copolymer, vinyl acetate/vinyl chloride copolymer, ethylene/vinyl acetate copolymer). Water-soluble polymers (e.g., poly(N-methylolacrylamide), carboxymethyl cellulose, gelatin, polyvinyl alcohol, polyvinyl alcohol, modified polyvinyl alcohol) are preferably used. Gelatin, polyvinyl alcohols and modified polyvinyl alcohols are more preferably used. Polyvinyl alcohols and modified polyvinyl alcohols are most preferably used.

The percent saponification of the polyvinyl alcohol and modified polyvinyl alcohol is preferably from 70% to 100%, more preferably from 80% to 100%, most preferably from 95% to 100%. The polymerization degree of the polyvinyl alcohol is preferably from 100 to 5,000.

The modified polyvinyl alcohol is obtained by introducing a modifying group into a polyvinyl alcohol by copolymerization modification, chain transfer modification or block polymerization modification. Examples of the modifying group to be introduced in copolymerization include —COONa, —Si(OX)$_3$ (in which X represents a hydrogen atom or alkyl group), —N(CH$_3$)$_3$.Cl, —C$_9$H$_{19}$, —COO, —SO$_3$Na, and —C$_{12}$H$_{25}$. Examples of the modifying group to be introduced in chain transfer modification include —COONa, —SH, —SC$_{12}$H$_{25}$. The polymerization degree of the modified polyvinyl alcohol is preferably from 100 to 3,000. For the details of modified polyvinyl alcohols, reference can be made to JP-A-8-338913, JP-A-9-152509 and JP-A-9-316127.

An unmodified polyvinyl alcohol and an alkylthio-modified polyvinyl alcohol having a percent saponification of from 85% to 95% are particularly preferred.

Two or more polyvinyl alcohols and modified polyvinyl alcohols may be used in combination.

For the details of crosslinking agents, reference can be made to U.S. Reissued Pat. No. 23,297. Boron compounds (e.g., boric acid, borax) may be used as crosslinking agent.

When the binder crosslinking agent is added in a large amount, the heat moisture resistance of the polarizing film can be enhanced. However, when the crosslinking agent is added in an amount of 50% by weight or more based on the weight of binder, the alignability of iodine or dichroic dye is deteriorated. The added amount of the crosslinking agent is preferably from 0.1 to 20% by weight, more preferably from 0.5 to 15% by weight based on the binder. The binder contains unreacted crosslinking agent in some amount even after the termination of the crosslinking reaction. However, the amount of remaining crosslinking agent is preferably 1.0 parts by weight or less, more preferably 0.5% by weight or less based on the binder. When the crosslinking agent is incorporated in the binder in an amount of more than 1.0% by weight, there are some cases where durability problem arises. In other words, when a liquid crystal display device comprising a polarizing film having a large residual amount of a crosslinking agent incorporated therein is used or allowed to stand in a high temperature and humidity atmosphere over an extended period of time, the deterioration of polarization can occur.

Examples of dichroic dye employable herein include azo-based dyes, stilbene-based dyes, pyrazolone-based dyes, triphenylmethane-based dyes, quinoline-based dyes, oxazine-based dyes, thiazine-based dyes, and anthraquinone-based dyes. The dichroic dye is preferably water-soluble. The dichroic dye preferably has a hydrophilic substituent (e.g., sulfo, amino, hydroxyl). Specific examples of the dichroic dye include C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59, and C.I. Acid Red 37. For the details of dichroic dyes, reference can be made to JP-A-1-161202, JP-A-1-172906, JP-A-1-172907, JP-A-1-183602, JP-A-1-248105, JP-A-1-265205, and JP-A-7-261024.

The dichroic dye is used in the form of free acid or salt (e.g., alkaline metal salt, ammonium salt, amine salt). A polarizing film having various hues can be produced by blending two or more dichroic dyes. A polarizing film comprising a compound (dye) which assumes black when the polarizing axes cross each other or a polarizing film having various dichroic dyes blended so as to assume black is excellent in single plate transmission and percent polarization.

In the polarizing film, the binder is stretched in the longitudinal direction (MD direction) of the polarizing film (stretching method). Alternatively, the binder thus rubbed is dyed with iodine and dichroic dye (rubbing method).

In the case of stretching method, the draw ratio is preferably from 2.5 to 30.0, more preferably from 3.0 to 10.0. Stretching may be effected in the air in a dry process. Alternatively, wet stretching may be effected in water. The draw ratio during dry stretching is preferably from 2.5 to 5.0. The draw ratio during wet stretching is preferably from 3.0 to 10.0. Stretching may be effected batchwise in several portions. By stretching the binder batchwise in several portions, the binder can be uniformly stretched even if the draw ratio is high. Before the full stretching, the binder may be somewhat crosswise or longitudinally stretched (to an extent such that the crosswise shrinkage can be prevented).

From the standpoint of yield, the binder is preferably stretched at an angle of from 100 to 80° with respect to longitudinal direction. In this case, stretching can be accomplished by effecting tenter stretching in biaxial stretching at steps which differ from right edge to left edge. The aforementioned biaxial stretching is the same as the stretching to be effected in ordinary film forming. In the biaxial stretching process, stretching is effected at a rate which differs from right edge to left edge. It is thus necessary that the thickness of the unstretched binder film differ from right edge to left edge. In the cast film-forming method, the die can be tapered to make the flow rate of the binder solution different from right to left.

Stretching is preferably effected such that the tilt angle coincides with the angle of the transmission axis of the two sheets of polarizing plates laminated on the respective side of the liquid crystal cell constituting the liquid crystal display device with respect to the longitudinal or crosswise direction of the liquid crystal cell. The tilt angle is normally 45°. However, transmission type, reflection type and semi-transmission type liquid crystal display devices the tilt angle of which is not necessarily 45° have been recently developed. It is thus preferred that the stretching direction be arbitrarily adjusted according to the design of the liquid crystal display device.

In this manner, a binder film which is stretched obliquely at an angle of from 100 to 800 with respect to MD direction of the polarizing film is produced.

A protective film is preferably provided on the both sides of the polarizing film. As one of the protective film there is preferably used a part of a rolled optical film of the invention.

For example, a laminate obtained by superposing a protective film, a polarizing film, an optically anisotropic layer 2 and an optically anisotropic layer 1 in this order or a protective film, a polarizing film, an optically anisotropic layer 2, an alignment layer and an optically anisotropic layer 1 in this order is preferably used. The polarizing film may be stuck to the front surface of the optically anisotropic layer 1. Sticking may be made with an adhesive. As such an adhesive there may be used a polyvinyl alcohol-based resin (including acetoacetyl group-, sulfonic acid group-, carboxyl group- or oxyalkylene group-modified polyvinyl alcohol) or an aqueous solution of boron compound. A polyvinyl alcohol-based resin is preferably used.

As the protective film to be provided on the side of the polarizing film opposed to the optical film of the invention there may be used a triacetyl cellulose film (Fujitac (TD-80UF): produced by FUJIFILM Corporation).

The dried thickness of the adhesive layer is preferably from 0.01 µm to 10 µm, more preferably from 0.05 µm to 5 µm.

A light-diffusion film or anti-glare film may be stuck to the surface of the polarizing plate.

(Light-Diffusion or Anti-Glare Film)

FIG. 1 is a diagrammatic sectional view illustrating a representative embodiment of the light-diffusion film.

A light-diffusion film (101) shown in FIG. 1 comprises a transparent substrate film (102) and a light-diffusion layer (103) laminated therein, the light-diffusion layer (103) having a first light-transmitting particulate material (141) and a second light-transmitting particulate material (142) incorporated in a light-transmitting resin (140). While the present embodiment is described with reference to two light-transmitting particulate materials (having different refractive indexes) having two peaks of particle diameter distribution, the same light-transmitting particulate material (having the same refractive index) having two peaks of particle diameter distribution may be used or one light-transmitting particulate material may be used.

The first light-transmitting particulate material (141) is composed of a light-transmitting resin such as particulate silica (average particle diameter: 1.0 µm; refractive index: 1.51). The second light-transmitting particulate material (142) is composed of a light-transmitting resin such as styrene bead (average particle diameter: 3.5 µm; refractive index: 1.61). The light-diffusion capacity can be obtained by the difference in refractive index between the light-transmitting particulate material (141 and 142) and the light-transmitting resin (140). The difference in refractive index between the light-transmitting particulate material (141 and 142) and the light-transmitting resin (140) is preferably from not smaller than 0.02 to not greater than 0.15. When the difference in refractive index falls below 0.02, the desired light-diffusing effect cannot be obtained. When the difference in refractive index exceeds 0.15, the resulting light-diffusing effect is too high, occasionally causing the whitening of the entire film. The difference in refractive index is more preferably from not smaller than 0.03 to not greater than 0.13, most preferably from not smaller than 0.04 to not greater than 0.10.

In the case where a polarizing film is used in a liquid crystal display device, an anti-reflection layer is preferably provided on the viewing side surface thereof. The anti-reflection layer may act also as a protective layer for the viewing side of the polarizing film. In order to suppress the change of tint of the liquid crystal display device with viewing angle, the inner haze of the anti-reflection layer is preferably predetermined to be 50% or more. For the details of anti-reflection layer, reference can be made to JP-A-2001-33783, JP-A-2001-343646 and JP-A-2002-328228.

The retardation film may be combined with a polarizing film for use for elliptically-polarizing plates. As combined with a polarizing film, the retardation film may also be used in transmission-type, reflection-type and semitransmission-type liquid-crystal display devices, in which the film may contribute toward enlarging the viewing angle of the devices. An elliptically-polarizing plate and a liquid-crystal display device that comprise the retardation plate are described below.

Elliptically-Polarizing Plate:

An elliptically-polarizing plate may be produced by laminating a retardation plate and a polarizing film. Comprising a retardation plate, the elliptically-polarizing plate may be built in a liquid-crystal display device, in which the plate may act to enlarge the viewing angle of the device. The polarizing plate includes an iodine-containing polarizing plate, a dichroic dye-containing polarizing plate and a polyene-containing polarizing plate. The iodine-containing polarizing plate and the dye-containing polarizing plate may be produced generally from polyvinyl alcohol films. The polarization axis of the polarizing film corresponds to the direction vertical to the stretching direction of the film.

The polarizing film is laminated on the side of the optically-anisotropic layer of a retardation plate. Preferably, a protective film is formed on the opposite side to the side of the retardation plate laminated with the polarizing film. The protective film is preferably a transparent film having a light transmittance of at least 80%. The transparent protective film may be generally formed of a cellulose ester film, preferably a triacetyl cellulose film. Preferably, the cellulose ester film is formed according to a solution-casting process. Preferably, the thickness of the protective film is from 20 to 500 µm, more preferably from 50 to 200 µm.

Liquid-Crystal Display Device:

The retardation plate of the invention contributes toward enlarging the viewing angle of liquid-crystal display devices comprising it. A liquid-crystal display device generally comprises a liquid-crystal cell, a polarizing element and a retardation plate (optical compensatory sheet). The polarizing element generally comprises a polarizing film and a protective film, in which the polarizing film and the protective film may be the same as those mentioned for the above elliptically-polarizing plate. A retardation plate (optical compensatory sheet) for TN-mode liquid-crystal cells is described in JP-A 6-214116, U.S. Pat. Nos. 5,583,679, 5,646,703, and German Patent 3911620A1. A retardation plate for IPS-mode or FLC-mode liquid-crystal cells is described in JP-A 10-54982. A retardation plate for OCB-mode or HAN-mode liquid-crystal cells is described in U.S. Pat. No. 5,805,253 and WO96/37804. A retardation plate for STN-mode liquid-crystal cells is described in JP-A9-26572. A retardation plate for VA-mode liquid-crystal cells is described in Japanese Patent 2866372.

In the invention, retardation plates (optical compensatory sheets) for various modes of liquid-crystal cells as above may be produced with reference to the description of the above-mentioned patent publications. The retardation plates may be used in various display modes of liquid-crystal display devices, such as TN (twisted nematic)-mode, IPS (in-plane switching)-mode, FLC (ferroelectric liquid-crystal)-mode, OCB (optically-compensatory bend)-type, STN (super-twisted nematic)-mode, VA (vertically-aligned)-mode and HAN (hybrid aligned nematic)-mode liquid-crystal display devices. The retardation plate is especially effective for optical compensation for TN (twisted nematic)-mode or OCB (optically-compensatory bend)-mode liquid-crystal display devices.

EXAMPLES

The characteristics of the invention are described more concretely with reference to the following Examples and Comparative Examples. In the following Examples, the material used, its amount and ratio, the details of the treatment and the treatment process may be suitably modified or changed not overstepping the sprit and the scope of the invention. Accordingly, the invention should not be limitatively interpreted by the Examples mentioned below.

Production Example 1

Production of D3-12

This was produced according to the following scheme 1:

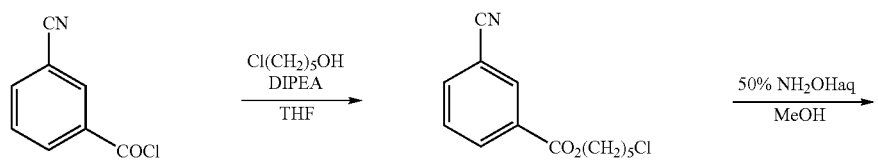

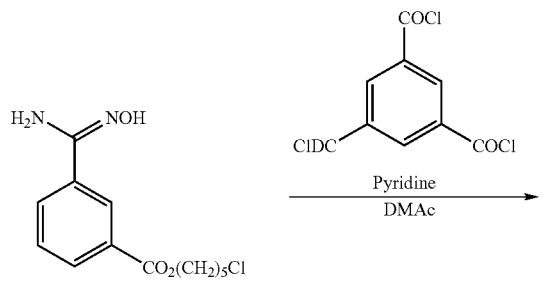

D3-12A

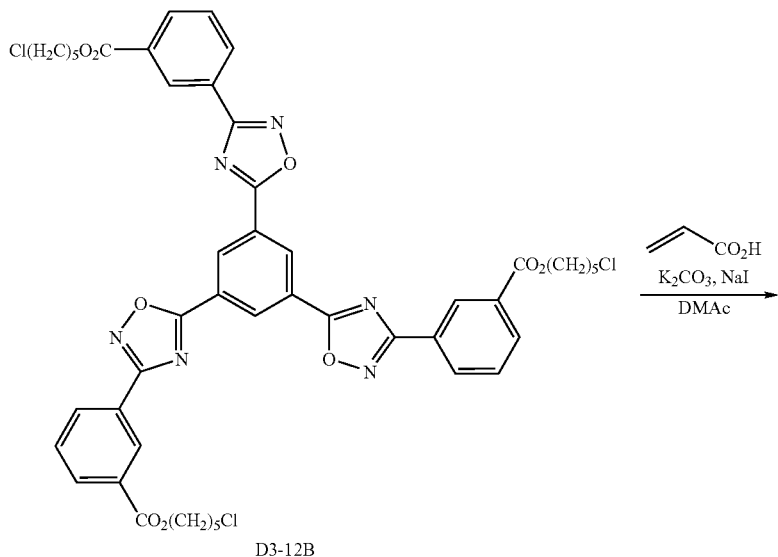

D3-12B

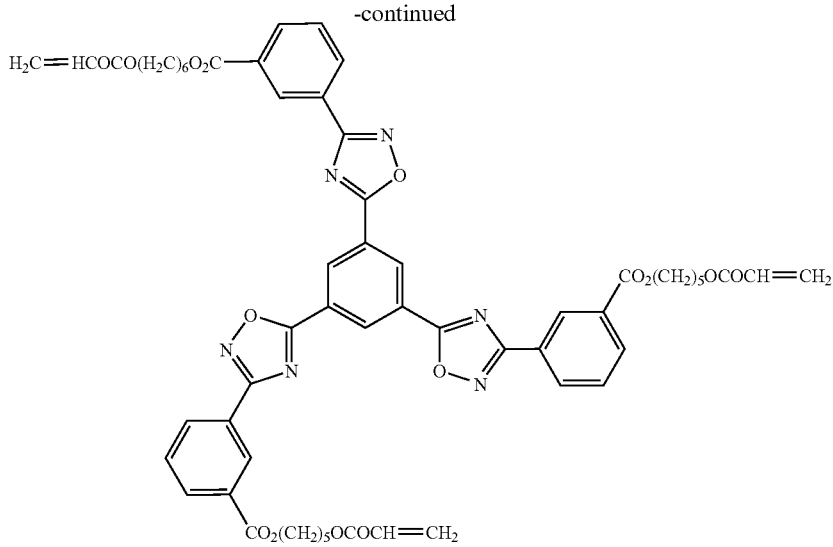

D3-12

Production of D3-12A 2.5 g of 3-cyanobenzoyl chloride was dissolved in 20 ml of tetrahydrofuran (THF), then 5.7 g of 5-chloro-1-propanol and 3.0 ml of diisopropylethylamine (DIPEA) were added thereto, and stirred at room temperature for 1 hour. Water was added to the reaction liquid, extracted with ethyl acetate, and the organic layer was concentrated under reduced pressure. The residue was dissolved in 100 ml of methanol (MeOH), 2.8 ml of 50% hydroxylamine solution was added thereto, and stirred at 40° C. for 1 hour. After cooled, water was added to the reaction liquid, and the precipitated crystal was taken out through filtration, and dried to obtain 3.7 g of D3-12A.

Production of D3-12B 3.7 g of D3-12A was dissolved in 10 ml of dimethylacetamide (DMAc), then 1.2 ml of pyridine and 1.1 g of trimesyl chloride were added thereto, and stirred at 120° C. for 1 hour. After cooled, methanol was added to it, and the precipitated crystal was taken out through filtration and dried to obtain 3.9 g of D3-12B.

Production of D3-12

3.9 g of D3-12B was dissolved in 50 ml of dimethylacetamide, and then 3.7 g of potassium carbonate, 2.0 g of sodium iodide and 1.9 ml of acrylic acid were added thereto, and stirred at 100° C. for 3 hours. Water was added to the reaction liquid, and the precipitated crystal was taken out through filtration. This was purified through column chromatography to obtain 3.0 g of D3-12. The NMR spectrum of the thus-obtained D3-12 is as follows:

$^1$H-NMR (solvent: CDCl$_3$, standard: tetramethylsilane) δ (ppm): 1.60 (6H, m), 1.80-1.90 (12H, m), 4.25 (6H, t), 4.45 (6H, t), 5.80 (3H, dd), 6.15 (3H, dd), 6.40 (3H, dd), 7.65 (3H, t), 8.25 (3H, d), 8.45 (3H, d), 8.90 (3H, s), 9.30 (3H, s).

The phase transition temperature profile of the compound D3-12 was determined through texture observation with a polarizing microscope. While the compound was heated, it changed from a crystal phase to a discotic nematic liquid-crystal phase at around 86° C., and then changed to an isotropic liquid phase at higher 142° C. This confirms that D3-12 exhibits a discotic nematic liquid-crystal phase between 86° C. and 142° C.

Production Example 2

Monomer A-1'

This was produced according to the following scheme 2:

Scheme 2:

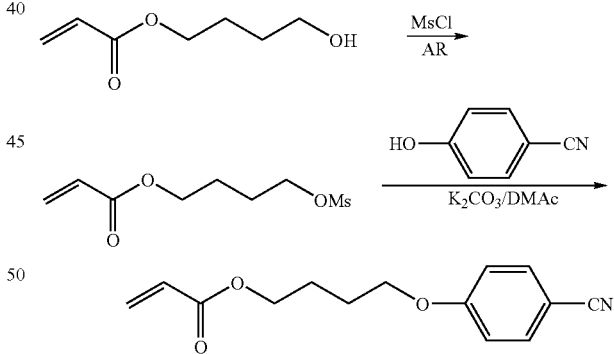

21.6 g (0.15 mol) of 4-hydroxy butyl acrylate (by Tokyo Kasei), 22 ml (0.16 mol) of triethylamine (Et$_3$N) and a good amount of the polymerizable inhibitor of nitor benzene are dissolved in 300 ml of acetic ether, in an ice water bath, 12.2 ml (0.16 mol) of metane sulfonyl chloride (MsCL) was added thereto and stirred for 3 hours. After the reaction, water was added to the reaction liquid and was extracted with acetic ether, and the organic phase was washed with saturated salt solution, and after dried with sodium sulfate, the solvent was removed to obtain the oil-state product (34.13 g, clued yield: 99%).

The above product, which was not purified, was dissolved in 250 ml of N,N-dimethyl acetoamide (DMAc), 35 g (0.25 mol) of anhydrous potassium carbonate and 14.9 g (0.125 mol) of 4-hydroxybenzonitrile (by Tokyo Kasei) was added thereto and the reaction liquid was stirred at 90° C. for 4 hours. After the reaction, this was purified through silica gel column chromatography, and recrystallized from a mixture solvent of hexane and acetic ether to obtain 4-(4-acryloyloxy-butoxy)benzonitrile. Hereinafter, this is abbreviated as A-1' (24 g, yield: 78%). The NMR spectrum is as follows:

$^1$H-NMR (solvent: CDCl$_3$, standard: tetramethylsilane) δ (ppm): 1.90 (4H, m), 4.05 (2H, t), 4.25 (2H, t), 5.85 (1H, dd), 6.15 (1H, dd), 6.42 (1H, dd), 6.92 (2H, d), 7.60 (2H, d).

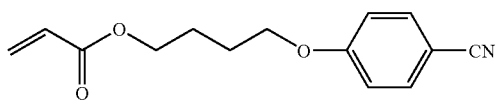

Production Example 3

Monomer A-2'

24 g (yield: 70%) of 4-(2'-acryloylethoxyoxy)benzonitrile was obtained in the same manner as in Production Example 2, for which, however, 4-hydroxybutylacrylate was used in place of 2-hydroxyethylacrylate (by Tokyo Kasei). This is hereinafter abbreviated as A-2'. Its NMR spectrum is as follows:

$^1$H-NMR (solvent: CDCl$_3$, standard: tetramethylsilane) δ (ppm): 4.15 (2H, t), 4.52 (2H, t), 5.86 (1H, dd), 6.15 (1H, dd), 6.45 (1H, dd), 6.96 (2H, d), 7.60 (2H, d).

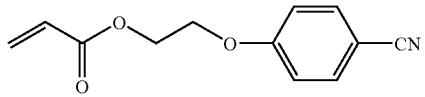

Production Example 4

Monomer A-5'

20 g (yield: 75%) of 1-chloro-4-(4'-acryloyloxybutoxy) benzene was obtained in the same manner as in Production Example 2, for which, however, 4-hydroxy benzonitrile was used in place of 4-chlorophenol (by Tokyo Kasei). This is hereinafter abbreviated as A-5'. Its NMR spectrum is as follows:

$^1$H-NMR (solvent: CDCl$_3$, standard: tetramethylsilane) δ (ppm): 1.88 (4H, m), 3.95 (2H, t), 4.22 (2H, t), 5.82 (1H, dd), 6.12 (1H, dd), 6.40 (1H, dd), 6.80 (2H, d), 7.22 (2H, d).

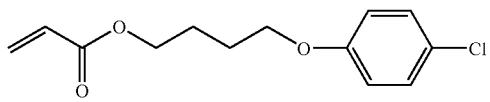

Production Example 5

Monomer A-6'

This was produced according to the following scheme 3:

Scheme 3:

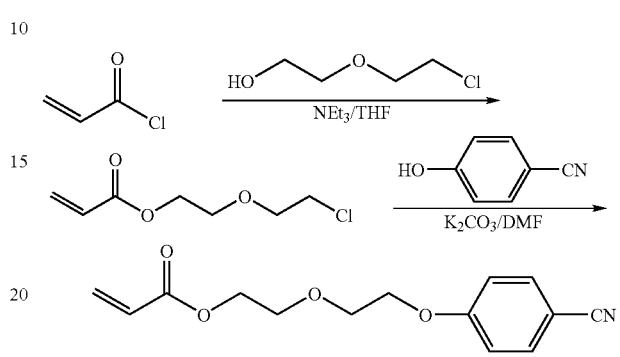

37.4 g (0.3 mol) of 2-(2-chloroethoxy)ethanol, 128 ml (0.9 mol) of triethylamine (Et$_3$N) and 1 g of the polymerizable inhibitor of nitor benzene are dissolved in 400 ml of tetrahydrofuran (THF), in an ice water bath, 27 ml (0.33 mol) of acryloyl chloride was added thereto and stirred for 3 hours. After the reaction, water was added to the reaction liquid and was extracted with acetic ether, and the organic phase was washed with saturated salt solution, and after dried with sodium sulfate, the solvent was removed to obtain the oil-state product (52 g, clued yield: 97%).

The above product, which was not purified, was dissolved in 200 ml of N,N-dimethyl acetoamide (DMAc), 61 g (0.44 mol) of anhydrous potassium carbonate and 26.2 g (0.22 mol) of 4-hydroxybenzonitrile (by Tokyo Kasei) was added thereto and the reaction liquid was stirred at 90° C. for 4 hours. After the reaction, this was purified through silica gel column chromatography, and recrystallized from a mixture solvent of hexane and acetic ether to obtain A-6' (51 g, yield: 89%). Its NMR spectrum is as follows:

$^1$H-NMR (solvent: CDCl$_3$, standard: tetramethylsilane) δ (ppm): 3.80 (2H, t), 3.85 (2H, t), 4.15 (2H, t), 4.35 (2H, t), 5.85 (1H, dd), 6.15 (1H, dd), 6.40 (1H, dd), 6.95 (2H, d), 7.70 (2H, d).

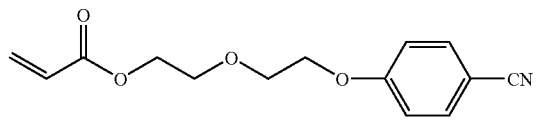

Production Example 6

Monomer A-12'

22 g (yield: 64%) of 2-fluoro-4-(4'-acryloyloxybutoxy) benzonitrile was obtained in the same manner as in Production Example 2, for which, however, 4-hydroxy benzonitrile was used in place of the same amount of 2-fluoro-4-hydroxy benzonitrile (by Tokyo Kasei). This is hereinafter abbreviated as A-12'. Its NMR spectrum is as follows:

$^1$H-NMR (solvent: CDCl$_3$, standard: tetramethylsilane) δ (ppm): 1.90 (4H, m), 4.05 (2H, t), 4.25 (2H, t), 5.83 (1H, dd), 6.12 (1H, dd), 6.40 (1H, dd), 6.70 (2H, m), 7.52 (1H, t).

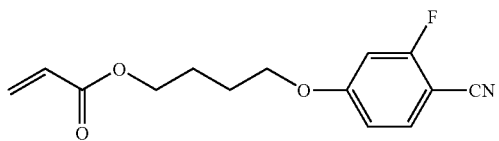

Production Example 7

Monomer A-15'

This was produced according to the following scheme 4:

Scheme 4:

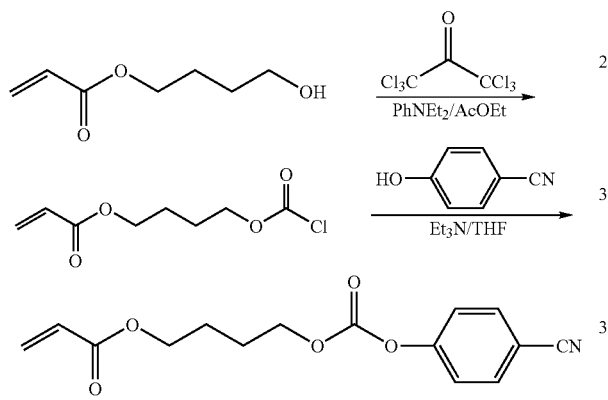

4-hydroxy butyl acrilate (by Tokyo Kasei) in acetic ether was reacted with triphosgene (by Tokyo Kasei) and diethylaniline (PhNEt$_2$) (by Wako Pure Chemical Industries), and the reactant was condensed with triethylamine (Et$_3$N) in 4-cyanophenol (by Tokyo Kasei) and tetrahydrofuran (THF) to obtained 28 g of 4-(4-cyanophenyloxycarbonyloxy) butylacrylate (hereinafter abbreviated as A-15') (yield: 79%). Its NMR spectrum is as follows:

$^1$H-NMR (solvent: CDCl$_3$, standard: tetramethylsilane) δ (ppm): 1.85 (4H, m), 4.25 (2H, t), 4.35 (2H, t), 5.85 (1H, dd), 6.15 (1H, dd), 6.40 (1H, dd), 7.35 (2H, d), 7.70 (2H, d).

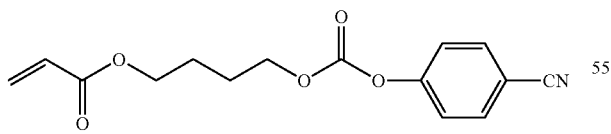

Production Example 8

Monomer A-8'

23 g of 1-fluoro-4-(4'-acryloyloxybutoxy)benzene was obtained in the same manner as in Production Example 2, for which, however, 4-hydroxy benzonitrile was used in place of 4-fluorophenol (by Tokyo Kasei). This is hereinafter abbreviated as A-8' (yield: 63%). Its NMR spectrum is as follows:

$^1$H-NMR (solvent: CDCl$_3$, standard: tetramethylsilane) δ (ppm): 1.85 (4H, m), 3.95 (2H, t), 4.25 (2H, t), 5.82 (1H, dd), 6.12 (1H, dd), 6.40 (1H, dd), 6.80 (2H, m), 6.95 (2H, t).

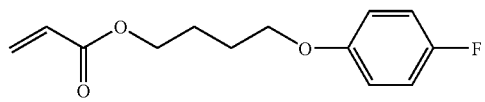

Production Example 9

Monomer A-9'

27 g of 1-bromo-4-(4'-acryloyloxybutoxy)benzene was obtained in the same manner as in Production Example 2, for which, however, 4-hydroxy benzonitrile was used in place of 4-bromophenol (by Tokyo Kasei). This is hereinafter abbreviated as A-9' (yield: 60%). Its NMR spectrum is as follows:

$^1$H-NMR (solvent: CDCl$_3$, standard: tetramethylsilane) δ (ppm): 1.88 (4H, m), 3.95 (2H, t), 4.23 (2H, t), 5.82 (1H, dd), 6.12 (1H, dd), 6.40 (1H, dd), 6.76 (2H, d), 7.38 (2H, d).

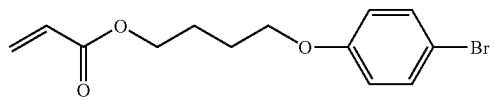

Production Example 10

Monomer A-10'

20 g of 1-trifluoro methyl-4-(4'-acryloyloxybutoxy)benzene was obtained in the same manner as in Production Example 2, for which, however, 4-hydroxy benzonitrile was used in place of the same amount of 4-trifluoromethyl phenol (by Tokyo Kasei). This is hereinafter abbreviated as A-10' (yield: 62%). Its NMR spectrum is as follows:

$^1$H-NMR (solvent: CDCl$_3$, standard: tetramethylsilane) δ (ppm): 1.90 (4H, m), 4.12 (2H, t), 4.25 (2H, t), 5.82 (1H, dd), 6.12 (1H, dd), 6.40 (1H, dd), 6.95 (2H, d), 7.54 (2H, d).

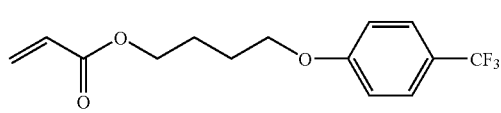

Production Example 11

Production of Polymer AD-1

Polymer AD-1 was produced according to the following scheme:

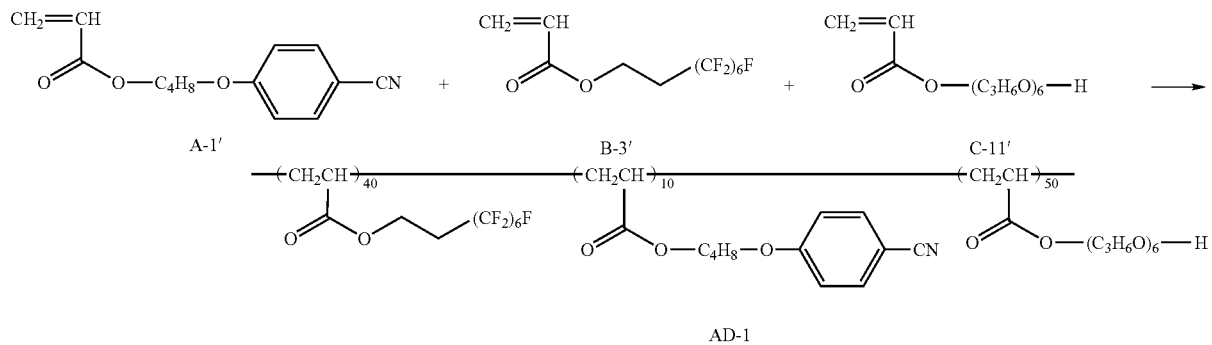

AD-1

5 g of methyl ethyl ketone (MEK) was put into a 100-mL three-neck flask, and heated at 78° C. while nitrogen was introduced thereinto at a flow rate of 35 ml/min. Then, a solution of A-1' (1.6 g), B-3' (6.4 g), C-11' (by NOF corporation, branmer AP-400, 8 g) and a polymerization initiator (V-601 by Wako Pure Chemical Industries, 600 mg) in 8 g of MEK was dropwise added to it, taking 3 hours. After the addition, this was reacted for 4 hours at the temperature at which it was. Next, the reaction system was restored to room temperature, and then slowly introduced into a mixture solution of methanol and water (800 ml) kept stirred. Then, the precipitated polymer was taken out through centrifugal separation, and then dried. 10.5 g of a polymer, AD-1 for use in the invention was thus produced. Through GPC (in terms of polystyrene), the data of the polymer were as follows: Mn=11,000. Mw/Mn=2.45. Each constitutive unit of the polymer AD-1 in the scheme is represented by % by weight (hereinafter, the same is applied for polymers synthesized in the Examples.)

Production Example 12

Production of Polymer AD-2

Polymer AD-2 was produced according to the following scheme:

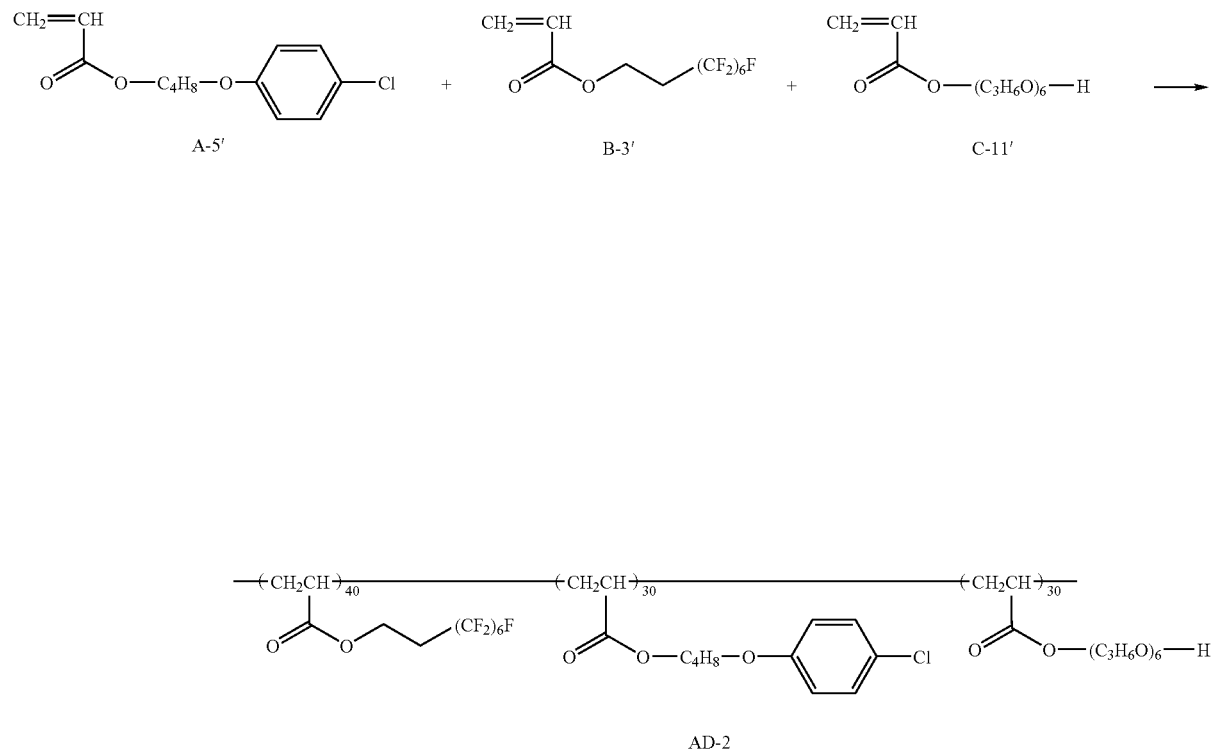

AD-2

4 g of methyl ethyl ketone (MEK) was put into a 100-mL three-neck flask, and heated at 78° C. while nitrogen was introduced thereinto at a flow rate of 35 ml/min. Then, a solution of A-5' (4.8 g), B-3' (6.4 g), C-11' (by NOF corporation, branmer AP-400, 4.8 g) and a polymerization initiator (V-601 by Wako Pure Chemical Industries, 600 mg) in 8 g of MEK was dropwise added to it, taking 3 hours. After the addition, this was reacted for 4 hours at the temperature at which it was. Next, the reaction system was restored to room temperature, and then slowly introduced into 800 ml of a mixture solution of methanol and water (10/90 volume ratio) kept stirred. Then, the precipitated polymer was taken out through centrifugal separation, and then dried. 13.0 g of a polymer, AD-2 for use in the invention was thus produced. Through GPC (in terms of polystyrene), the data of the polymer were as follows: Mn=9,500. Mw/Mn=2.40.

Production Example 13

Production of Polymer AD-3

Polymer AD-3 was produced according to the following scheme:

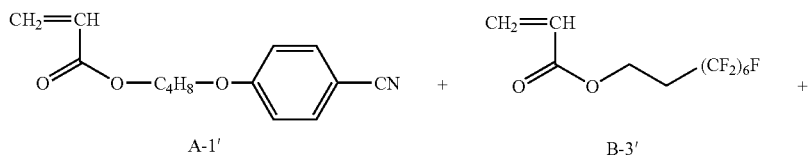

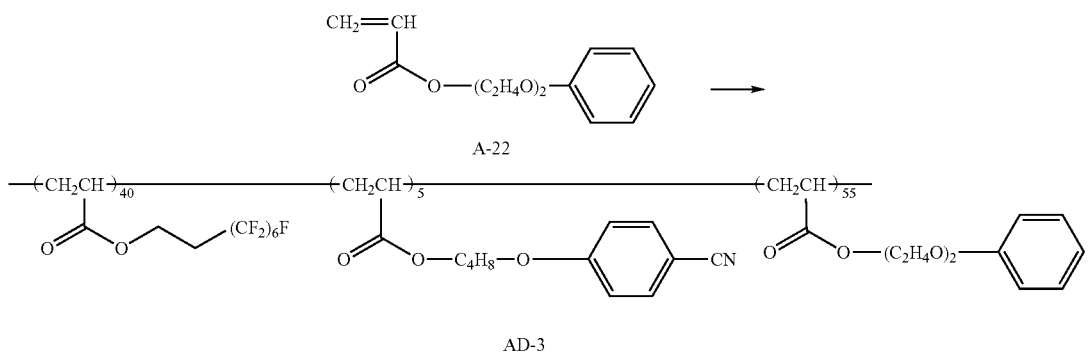

AD-3

4 g of methyl ethyl ketone (MEK) was put into a 100-mL three-neck flask, and heated at 78° C. while nitrogen was introduced thereinto at a flow rate of 35 ml/min. Then, a solution of A-1' (0.8 g), B-3' (6.4 g), A-22' (by SHIN-NAKA-MURA CHEMICAL CO, LTD, NK ester, AMP-20G, 4.8 g) and a polymerization initiator (V-601 by Wako Pure Chemical Industries, 600 mg) in 8 g of MEK was dropwise added to it, taking 3 hours. After the addition, this was reacted for 4 hours at the temperature at which it was. Next, the reaction system was restored to room temperature, and then slowly introduced into 800 ml of a mixture solution of methanol and water (10/90 volume ratio) kept stirred. Then, the precipitated polymer was taken out through centrifugal separation, and then dried. 13.7 g of a polymer, AD-3 for use in the invention was thus produced. Through GPC (in terms of polystyrene), the data of the polymer were as follows: Mn=9,000. Mw/Mn=2.35.

Production Example 14

Production of Polymer AD-4

Polymer AD-4 was produced according to the following scheme.

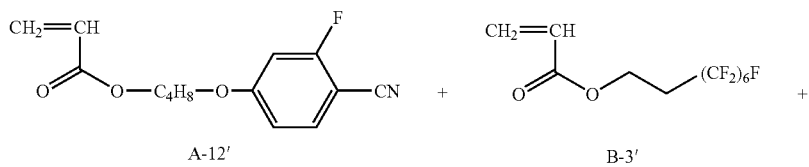

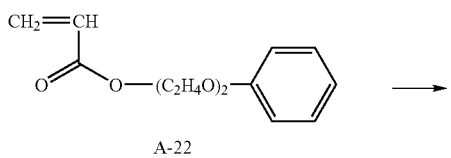

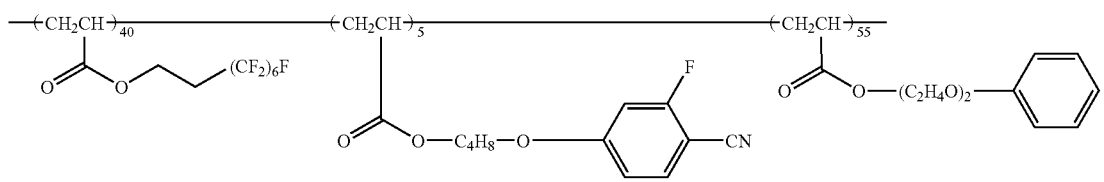

AD-4

4 g of methyl ethyl ketone (MEK) was put into a 100-mL three-neck flask, and heated at 78° C. while nitrogen was introduced thereinto at a flow rate of 35 ml/min. Then, a solution of A-12' (0.8 g), B-3' (6.4 g), A-22' (by SHIN-NA-KAMURA CHEMICAL CO, LTD, NK ester, AMP-20G, 4.8 g) and a polymerization initiator (V-601 by Wako Pure Chemical Industries, 600 mg) in 8 g of MEK was dropwise added to it, taking 3 hours. After the addition, this was reacted for 4 hours at the temperature at which it was. Next, the reaction system was restored to room temperature, and then slowly introduced into 800 ml of a mixture solution of methanol and water (10/90 volume ratio) kept stirred. Then, the precipitated polymer was taken out through centrifugal separation, and then dried. 12.5 g of a polymer, AD-4 for use in the invention was thus produced. Through GPC (in terms of polystyrene), the data of the polymer were as follows: Mn=10500. Mw/Mn=2.45.

Production Example 15

Production of Polymer AD-5

Polymer AD-5 was produced according to the following scheme:

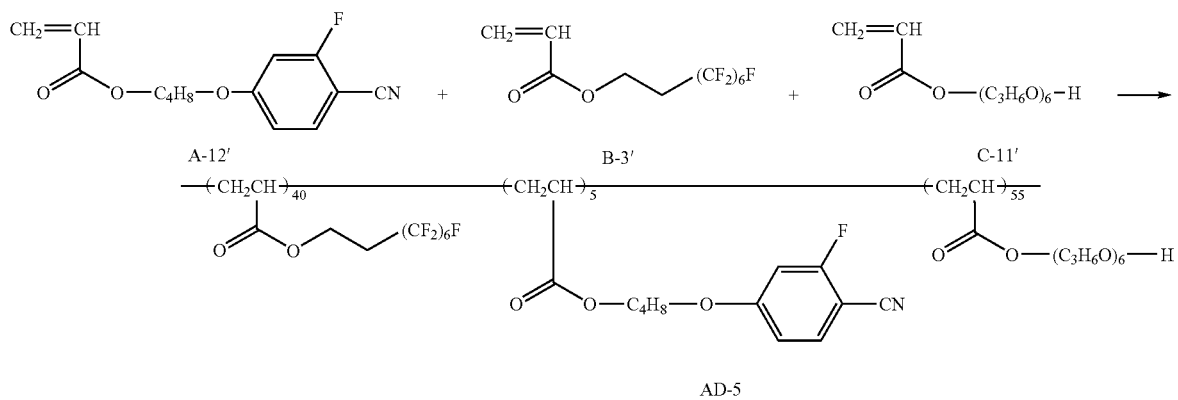

4 g of methyl ethyl ketone (MEK) was put into a 100-mL three-neck flask, and heated at 78° C. while nitrogen was introduced thereinto at a flow rate of 35 ml/min. Then, a solution of A-12' (0.8 g), B-3' (6.4 g), C-11' (by NOF corporation, branmer AP-400, 8.8 g) and a polymerization initiator (V-601 by Wako Pure Chemical Industries, 600 mg) in 8 g of MEK was dropwise added to it, taking 3 hours. After the addition, this was reacted for 4 hours at the temperature at which it was. Next, the reaction system was restored to room temperature, and then slowly introduced into 800 ml of a mixture solution of methanol and water (10/90 volume ratio) kept stirred. Then, the precipitated polymer was taken out through centrifugal separation, and then dried. 13.8 g of a polymer, AD-5 for use in the invention was thus produced. Through GPC (in terms of polystyrene), the data of the polymer were as follows: Mn=8500. Mw/Mn=2.35.

Production Example 16

Production of Polymer AD-6

Polymer AD-6 was produced according to the following scheme:

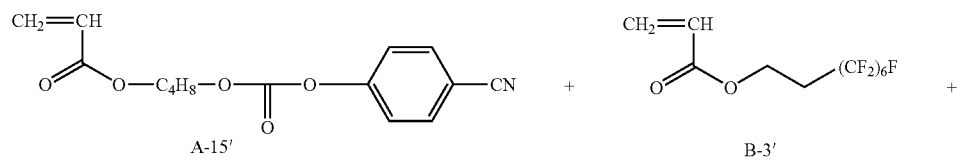

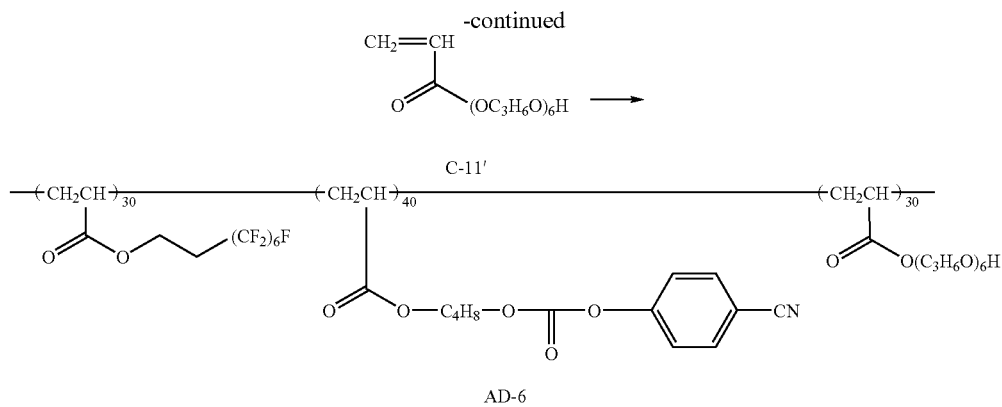

4 g of methyl ethyl ketone (MEK) was put into a 100-mL three-neck flask, and heated at 78° C. while nitrogen was introduced thereinto at a flow rate of 35 ml/min. Then, a solution of A-15' (6.4 g), B-3' (4.8 g), C-11' (by NOF corporation, branmer AP-400, 4.8 g) and a polymerization initiator (V-601 by Wako Pure Chemical Industries, 600 mg) in 8 g of MEK was dropwise added to it, taking 3 hours. After the addition, this was reacted for 4 hours at the temperature at which it was. Next, the reaction system was restored to room temperature, and then slowly introduced into 800 ml of a mixture solution of methanol and water (10/90 volume ratio) kept stirred. Then, the precipitated polymer was taken out through centrifugal separation, and then dried. 12.7 g of a polymer, AD-6 for use in the invention was thus produced. Through GPC (in terms of polystyrene), the data of the polymer were as follows: Mn=10000. Mw/Mn=2.32.

Production Example 17

Production of Polymer AD-7

Polymer AD-7 was produced according to the following scheme:

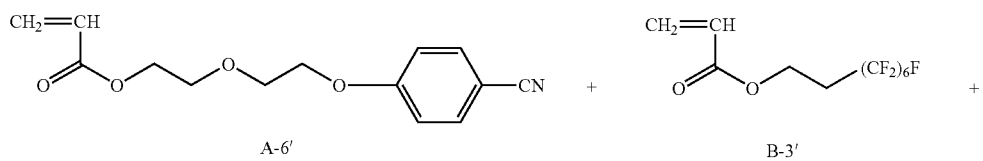

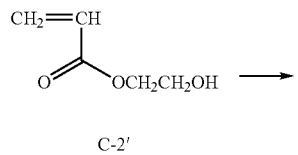

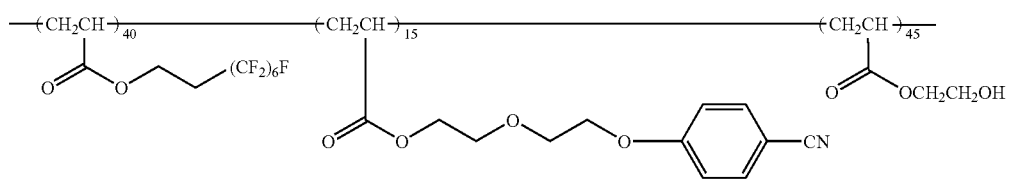

4 g of methyl ethyl ketone (MEK) was put into a 100-mL three-neck flask, and heated at 78° C. while nitrogen was introduced thereinto at a flow rate of 35 ml/min. Then, a solution of A-6' (2.4 g), B-3' (6.4 g), C-2' (by Tokyo Kasei, 7.2 g) and a polymerization initiator (V-601 by Wako Pure Chemical Industries, 600 mg) in 8 g of MEK was dropwise added to it, taking 3 hours. After the addition, this was reacted for 4 hours at the temperature at which it was. Next, the reaction system was restored to room temperature, and then slowly introduced into 800 ml of a mixture solution of methanol and water (10/90 volume ratio) kept stirred. Then, the precipitated polymer was taken out through centrifugal separation, and then dried. 12.7 g of a polymer, AD-7 for use in the invention was thus produced. Through GPC (in terms of polystyrene), the data of the polymer were as follows: Mn=9700. Mw/Mn=2.55.

Production Example 18

Production of Polymer AD-8

Polymer AD-8 was produced according to the following scheme:

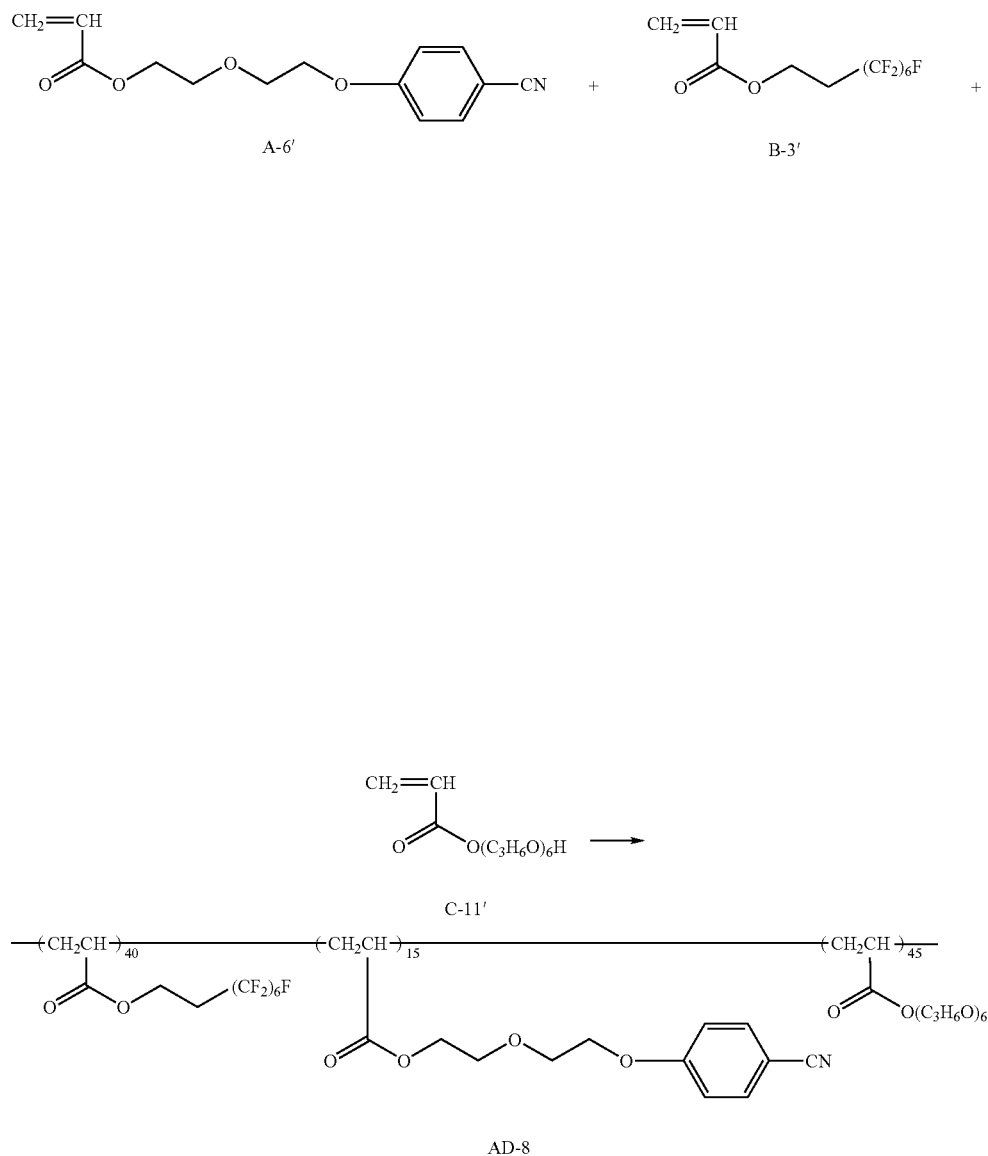

4 g of methyl ethyl ketone (MEK) was put into a 100-mL three-neck flask, and heated at 78° C. while nitrogen was introduced thereinto at a flow rate of 35 ml/min. Then, a solution of A-6' (2.4 g), B-3' (6.4 g), C-11' (by NOF corporation, branmer AP-400, 7.2 g) and a polymerization initiator (V-601 by Wako Pure Chemical Industries, 600 mg) in 8 g of MEK was dropwise added to it, taking 3 hours. After the addition, this was reacted for 4 hours at the temperature at which it was. Next, the reaction system was restored to room temperature, and then slowly introduced into 800 ml of a mixture solution of methanol and water (10/90 volume ratio) kept stirred. Then, the precipitated polymer was taken out through centrifugal separation, and then dried. 12.9 g of a polymer, AD-8 for use in the invention was thus produced. Through GPC (in terms of polystyrene), the data of the polymer were as follows: Mn=12000. Mw/Mn=2.35.

Production Example 19

Production of Polymer AD-9

Polymer AD-9 was produced according to the following scheme:

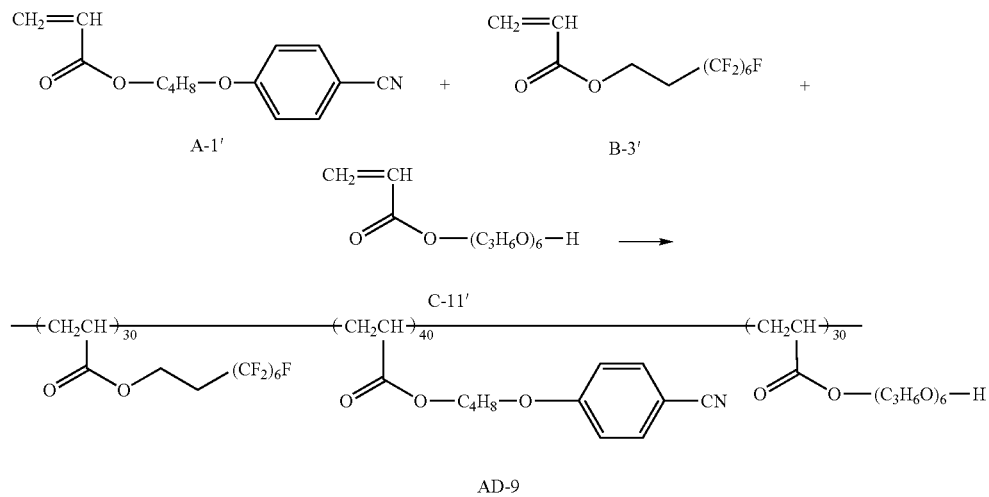

AD-9

4 g of methyl ethyl ketone (MEK) was put into a 100-mL three-neck flask, and heated at 78° C. while nitrogen was introduced thereinto at a flow rate of 35 ml/min. Then, a solution of A-1' (6.4 g), B-3' (4.8 g), C-11' (by NOF corporation, branmer AP-400, 4.8 g) and a polymerization initiator (V-601 by Wako Pure Chemical Industries, 600 mg) in 8 g of MEK was dropwise added to it, taking 3 hours. After the addition, this was reacted for 4 hours at the temperature at which it was. Next, the reaction system was restored to room temperature, and then slowly introduced into 800 ml of a mixture solution of methanol and water (10/90 volume ratio) kept stirred. Then, the precipitated polymer was taken out through centrifugal separation, and then dried. 11.7 g of a polymer, AD-9 for use in the invention was thus produced. Through GPC (in terms of polystyrene), the data of the polymer were as follows: Mn=13000. Mw/Mn=2.50.

Example 1

Preparation of Composition (LM-1) of the Invention

The liquid-crystal compound (1)(D3-12), the liquid-crystal compound (2) (T-8), a polymer for use in the invention (AD-1), an photopolymerization initiator, Irgacure 907 (by Ciba Speciality Chemicals), and an optical sensitizer, diethylthioxanthone were weighed out in a ratio to give the composition mentioned below, and dissolved in methyl ethyl ketone to prepare a composition of the invention (LM-1). Composition of (LM-1):

| | |
|---|---|
| Liquid-crystal compound (1), D3-12 | 92 parts by mass |
| Liquid-crystal compound (2), T-8 | 8 parts by mass |
| Polymer for use in the invention, AD-1 | 0.4 parts by mass |
| Irgacure 907 (by Ciba Speciality Chemicals) | 3.0 parts by mass |
| Diethylthioxanthone | 1.0 part by mass |
| Methyl ethyl ketone | 250 parts by mass |

Example 2

Preparation of Compositions (LM-2 to LM-8) of the Invention

Compositions of the invention, (LM-2) to (LM-8) were prepared in the same manner as in Example 1, for which, however, the liquid-crystal (1) (D3-12), the liquid-crystal (2) (T-8) and the polymer (AD-1) were changed to compounds and a polymer shown in Table 2 below, respectively.

Example 3

Preparation of Compositions (LM-9 to LM-13) of the Invention

A composition of the invention (LM-9) was prepared in the same manner as in Example 1, to which, however, 0.5 parts by mass of the following surfactant (W-1) was added. In the same manner as that for the composition (LM-9), other compositions of the invention (LM-10 to LM-13) were prepared, for which, however, the polymer (AD-1) was changed to a polymer shown in Table 2 below.

Surfactant (W-1)

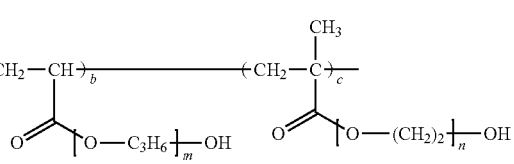
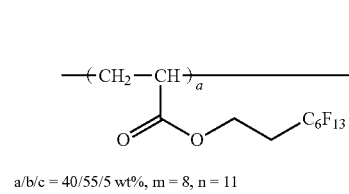

a/b/c = 40/55/5 wt%, m = 8, n = 11

Example 4

Preparation of Composition (LM-14) of the Invention

A liquid-crystal compound (1) (D3-12), a polymer for use in the invention (AD-9), an photopolymerization initiator, Irgacure 907 (by Ciba Speciality Chemicals), and an optical sensitizer, diethylthioxanthone were weighed out in a ratio to give the composition mentioned below, and dissolved in methyl ethyl ketone to prepare a composition of the invention (LM-14).

Composition of (LM-14):

| | |
|---|---|
| Liquid-crystal compound (1), D3-12 | 100 parts by mass |
| Polymer for use in the invention, AD-9 | 0.4 parts by mass |
| Irgacure 907 (by Ciba Speciality Chemicals) | 3.0 parts by mass |
| Diethylthioxanthone | 1.0 part by mass |
| Methyl ethyl ketone | 250 parts by mass |

Comparative Example 1

Preparation of Comparative Compositions (LH-1, LH-2)

A comparative composition (LH-1) was prepared in the same manner as that for the composition (LM-1) in Example 1, to which, however, the polymer (AD-1) was not added. A comparative composition (LH-2) was prepared in the same manner as that for the composition (LM-9) in Example 3, to which, however, the polymer (AD-1) was not added.

TABLE 2

| | Composition | Liquid-Crystal Compound (1) | Liquid-Crystal Compound (2) | Polymer | Surfactant |
|---|---|---|---|---|---|
| Example 1 | LM-1 | D3-12 | T-8 | AD-1 | no |
| Example 2 | LM-2 | D3-12 | T-8 | AD-2 | no |
| | LM-3 | D3-12 | T-8 | AD-3 | no |
| | LM-4 | D3-12 | T-8 | AD-4 | no |
| | LM-5 | D3-12 | T-8 | AD-5 | no |
| | LM-6 | D3-12 | T-8 | AD-6 | no |
| | LM-7 | D3-12 | T-8 | AD-7 | no |
| | LM-8 | D3-12 | T-8 | AD-8 | no |
| Example 3 | LM-9 | D3-12 | T-8 | AD-1 | W-1 |
| | LM-10 | D3-12 | T-8 | AD-2 | W-1 |
| | LM-11 | D3-12 | T-8 | AD-4 | W-1 |
| | LM-12 | D3-12 | T-8 | AD-5 | W-1 |
| | LM-13 | D3-12 | T-8 | AD-7 | W-1 |
| Example 4 | LM-14 | D3-12 | no | AD-9 | no |
| Comparative Example 1 | LH-1 | D3-12 | T-8 | no | no |
| | LH-2 | D3-12 | T-8 | no | W-1 |

Example 5

Formation of Retardation Plate of the Invention (RM-1)

Preparation of Optically Anisotropic Layer 2 (Transparent Support):

The following components were charged in a mixing tank where they were then heated with stirring to prepare a cellulose acetate solution.

| Formulation of cellulose acetate solution | |
|---|---|
| Cellulose acetate having a percent acetylation of 60.9% | 100 parts by mass |
| Triphenyl phosphate | 7.8 parts by mass |
| Biphenyl diphenyl phosphate | 3.9 parts by mass |
| Methylene chloride | 300 parts by mass |
| Methanol | 45 parts by mass |

(Preparation of Retardation Raising Agent Solution)

Into a separate mixing tank were charged 4 parts by mass of a cellulose acetate (linter) having a percent acetylation of 60.9%, 25 parts by mass of the following retardation developer, 0.5 parts by mass of a particulate silica (average particle diameter: 20 nm), 80 parts by mass of methylene chloride and 20 parts by mass of methanol which were then heated with stirring to prepare a retardation developer solution.

Retardation Developer

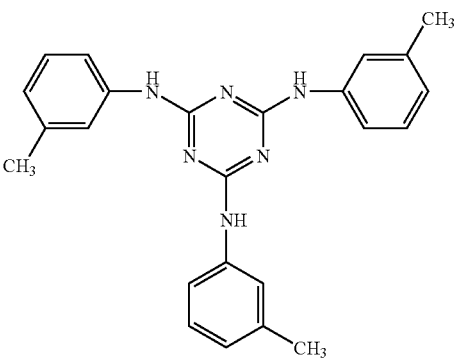

470 parts by mass of a cellulose acetate solution were mixed with 18.5 parts by mass of the retardation developer solution. The mixture was then thoroughly stirred to prepare a dope. The mass ratio of the retardation developer to cellulose acetate was 3.5%. The film having a residual solvent content of 35% by mass was peeled off the band, crosswise stretched at a temperature of 140° C. and a draw ratio of 38% using a film tenter, and then dried at 130° C. with the clip detached therefrom for 45 seconds to prepare a cellulose acetate film as optically anisotropic layer 2. The optically anisotropic layer 2 thus produced had a residual solvent content of 0.2% by mass and a thickness of 88 μm.

(Saponification of Second Optically Anisotropic Layer 2)

A 1.5 mol/L isopropyl alcohol solution of potassium hydroxide was spread over one side of the optically anisotropic layer 2 thus prepared at a rate of 25 ml/m². The coated optically anisotropic layer was allowed to stand at 25° C. for 5 seconds, washed with flowing water for 10 seconds, and then blown with 25° C. air so that the surface of the film was dried. In this manner, the optically anisotropic layer 2 was saponified only on one side thereof.

(Formation of Alignment Film)

An alignment film coating solution having the following formulation was then spread over the optically anisotropic layer 2 on the saponified surface thereof at a rate of 24 ml/m² using a #14 wire bar coater. The coated optically anisotropic layer was dried with 60° C. hot air for 60 seconds and then with 90° C. hot air for 150 seconds.

Subsequently, the film thus formed was subjected to rubbing in the direction of 450 with respect to the stretching direction of the optically anisotropic layer 2 (substantially the same as the slow axis).

---

(Formulation of alignment film coating solution)
Modified polyvinyl alcohol shown below

| | |
|---|---|
| Water | 10 parts by mass |
| Methanol | 371 parts by mass |
| Glutaraldehyde (crosslinking agent) | 119 parts by mass |
| Modified polyvinyl alcohol | 0.5 parts by mass |

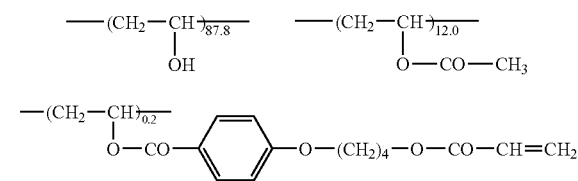

---

Formation of Optically-Anisotropic Layer:

A coating liquid of the composition (LM-1) of the invention that had been prepared in Example 1 was applied onto the rubbing-treated surface of the alignment film formed in the above, using a wire bar. The film thus coated with an optically-anisotropic layer was aligned in a thermostat tank at 120° C., at which the film was irradiated with UV rays at 200 mJ/cm² to thereby fix the alignment state of the optically-anisotropic layer. This was cooled to room temperature, and the process gave a retardation plate of the invention (RM-1). The thickness of the optically-anisotropic layer formed in the plate was about 1.0 μm.

Example 6

Formation of Retardation Plates of the Invention (RM-2 to RM-13)

Retardation plates (RM-2) to (RM-13) were produced in the same manner as in Example 5, for which, however, the composition (LM-1) was changed to any of compositions (LM-2) to (LM-13).

Example 7

Formation of a Retardation Plate of the Invention (RM-14)

A retardation plate (RM-14) was produced in the same manner as in Example 5, for which, however, the composition (LM-1) was changed to a composition (LM-14).

Comparative Example 2

Formation of Comparative Retardation Plates (RH-1, RH-2)

Comparative retardation plates (RH-1) and (RH-2) were produced in the same manner as in Example 5, for which, however, the composition (LM-1) was changed to any of compositions (LH-1) and (LE-2).

TABLE 3

| | Retardation Plate | composition |
|---|---|---|
| Example 5 | RM-1 | LM-1 |
| Example 6 | RM-2 | LM-2 |
| | RM-3 | LM-3 |
| | RM-4 | LM-4 |
| | RM-5 | LM-5 |
| | RM-6 | LM-6 |
| | RM-7 | LM-7 |
| | RM-8 | LM-8 |
| | RM-9 | LM-9 |
| | RM-10 | LM-10 |
| | RM-11 | LM-11 |
| | RM-12 | LM-12 |
| | RM-13 | LM-13 |
| Example 7 | RM-14 | LM-14 |
| Comparative Example 2 | RH-1 | LH-1 |
| | RH-2 | LH-2 |

Evaluation of Retardation Plates

Example 8

Evaluation of Retardation Plates (RM-1 to RM-14)

Determination of Mean Tilt Angle:

Re (589 nm) of the retardation plates (RM-1) to (RM-14) obtained in Examples 5, 6 and 7 was measured by applying light having a wavelength of 589 nm in the normal direction of the film, using KOBRA 21ADH (by Oji Scientific Instruments). Then, Rth (589 nm) measured by applying light having a wavelength of 589 nm to the sample in the direction tilted by +40° relative to the normal direction of the film with the slow axis (judged by KOBRA 21ADH) as the tilt axis (rotation axis) thereof, and further measured by applying light having a wavelength of 589 nm to the sample in the direction tilted by −40° relative to the normal direction of the film with the slow axis as the tilt axis thereof.

With the tilt angle θ1 in one face of the above optically-anisotropic layer and the tilt angle θ2 in the other face thereof fitted as variables in order that the calculated data of the angle dependence of the retardation of the optically-anisotropic layer could be the same as the found data thereof, θ1 and θ2 were computed.

The mean value ((θ1+θ2)/2) is the mean tile angle.

Comparative Example 3

Evaluation of Comparative Retardation Plates RH-1 and RH-2

The mean tilt angle of the retardation plates RH-1 and RH-2 were determined in the same manner as above.

Using a microtome, cross-cut ultra-thin pieces of the retardation plates of Example 8 and Comparative Example 3 were prepared, and observed with a polarizing microscope. It was confirmed that the optically-anisotropic layer in the retardation plates of the invention, RM-1 to RM-14, and the comparative retardation plates RH-1 and RH-2 in Comparative Example 3 was in hybrid alignment.

Temperature Dependence of Mean Tilt Angle:

In forming the optically-anisotropic layer, the layer was cooled to 100° C. after processed for alignment, and its alignment state was cured through irradiation with UV rays, but the other process was the same as in the above. The mean tilt angle of the sample was determined. The data after alignment fixation at 120° C. were compared with those after alignment at 100° C., and the value of the mean tilt angle difference thus obtained is referred to as mean tilt angle temperature dependence, and shown in Table 4 below.

TABLE 4

|  | Retardation Plate | Mean Tilt Angle (120° C.) | Mean Tilt Angle (100° C.) | Mean Tilt Angle Temperature Dependence | Alignment State (observation of cross section) |
|---|---|---|---|---|---|
| Example 8 | RM-1 | about 11° | about 12° | about 1° | hybrid |
|  | RM-2 | about 14° | about 17° | about 3° | hybrid |
|  | RM-3 | about 20° | about 22° | about 2° | hybrid |
|  | RM-4 | about 29° | about 30° | about 1° | hybrid |
|  | RM-5 | about 25° | about 25° | about 0° | hybrid |
|  | RM-6 | about 30° | about 31° | about 1° | hybrid |
|  | RM-7 | about 30° | about 30° | about 0° | hybrid |
|  | RM-8 | about 26° | about 33° | about 7° | hybrid |
|  | RM-9 | about 29° | about 31° | about 2° | hybrid |
|  | RM-10 | about 27° | about 31° | about 4° | hybrid |
|  | RM-11 | about 15° | about 16° | about 1° | hybrid |
|  | RM-12 | about 30° | about 31° | about 1° | hybrid |
|  | RM-13 | about 30° | about 30° | about 0° | hybrid |
|  | RM-14 | about 28° | about 29° | about 1° | hybrid |
| Comparative Example 3 | RH-1 | about 44° | about 44° | about 0° | hybrid |
|  | RH-2 | about 44° | about 43° | about 1° | hybrid |

The results in Table 4 confirm that in the retardation plates of the invention, (RM-1) to (RM-14), the mean tilt angle could be controlled within a range of from 10° to 40°, as compared with that in the comparative retardation plates (RH-1) and (RH-2). In addition, it is also confirmed that the temperature dependence of the mean tilt angle in the retardation plates of the invention is small.

From the results, it is confirmed that, in the retardation plates formed with the composition of the invention that contains a polymer having a group of formula (A) as the constitutive unit thereof, the discotic liquid-crystal molecules can be hybrid-aligned and their alignment has little temperature dependence.

The present disclosure relates to the subject matter contained in Japanese Patent Application No. 274976/2006 filed on Oct. 6, 2006 and Japanese Patent Application No. 252676/2007 filed on Sep. 27, 2007, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

The invention claimed is:

1. A composition comprising at least one liquid-crystal compound and a polymer having at least one group of the following formula (A) as the constitutive unit thereof:

Formula (A)

wherein Mp represents a trivalent linking group; L represents a single bond, or a bivalent linking group; X represents a substituted or unsubstituted functional group having a cyclic structure, wherein the at least one liquid-crystal compound is represented by the following formula (DI):

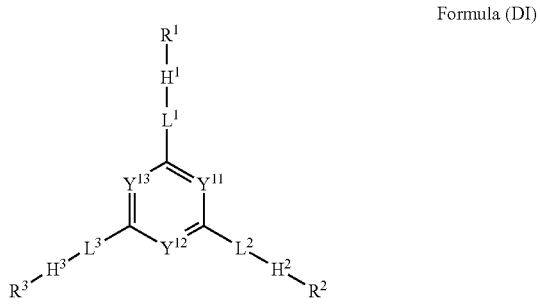

Formula (DI)

wherein $Y^{11}$, $Y^{12}$ and $Y^{13}$ each independently represent a methine group or a nitrogen atom; $L^1$, $L^2$ and $L^3$ each independently represent a single bond or a bivalent linking group; $H^1$, $H^2$ and $H^3$ each independently represent the following formula (DI-A) or (DI-B); $R^1$, $R^2$ and $R^3$ each independently represent the following formula (DI-R):

Formula (DI-A)

wherein $YA^1$ and $YA^2$ each independently represent a methine group or a nitrogen atom; XA represents an oxygen atom, a sulfur atom, a methylene group or an imino group; * indicates the position at which the formula bonds to any of $L^1$ to $L^3$; and ** indicates the position at which the formula bonds to any of $R^1$ to $R^3$,

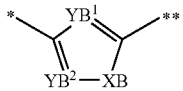

Formula (DI-B)

wherein $YB^1$ and $YB^2$ each independently represent a methine group or a nitrogen atom; XB represents an oxygen atom, a sulfur atom, a methylene group or an imino group; * indicates the position at which the formula bonds to any of $L^1$ to $L^3$; and ** indicates the position at which the formula bonds to any of $R^1$ to $R^3$,

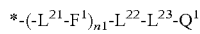

Formula (DI-R)

wherein * indicates the position at which the formula bonds to $H^1$, $H^2$ or $H^3$ in formula (DI); $F^1$ represents a bivalent linking group having at least one cyclic structure; $L^{21}$ represents a single bond or a bivalent linking group; n1 indicates an integer of from 0 to 4; $L^{22}$ represents —O—, —O—CO—, —O—CO—O—, —S—, —NH—, —SO$_2$—, —CH$_2$—, —CH=CH— or —C≡C—, $L^{23}$ represents a bivalent linking group selected from —O—, —S—, —C(=O)—, —SO$_2$—, —NH—, —CH$_2$—, —CH=CH— and —C≡C—, a group formed by linking two or more of these, and when the group has a hydrogen atom, the hydrogen atom may be substituted with a substituent; $Q^1$ represents a polymerizing group or a hydrogen atom.

2. The composition according to claim 1, wherein X in formula (A) is a substituted or unsubstituted cyclic aliphatic group having from 3 to 20 carbon atoms, or a substituted or unsubstituted phenylene group having from 6 to 30 carbon atoms.

3. The composition according to claim 1, wherein in formula (A), Mp is the following Mp-1 or Mp-2:

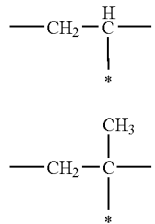

wherein * indicates the linking position to L;
and L is a bivalent linking group selected from —O—, —NR$^{a11}$— (where R$^{a11}$ represents a hydrogen atom, an aliphatic hydrocarbon group having from 1 to 10 carbon atoms), —S—, —C(=O)—, —S(=O)$_2$—, and a substituted or unsubstituted alkylene group having from 1 to 20 carbon atoms, and a group formed by linking two or more of these.

4. The composition according to claim 1, wherein the polymer having at least one group of the following formula (A) further has a constitutive unit derived from a fluoroaliphatic group-having monomer.

5. The composition according to claim 1, further comprising the constitutive unit derived from a fluoroaliphatic group-having monomer is represented by the following formula (B):

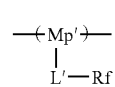

Formula (B)

wherein Mp' represents a trivalent linking group; L' represents a single bond or a bivalent linking group; Rf represents a substituent having at least one fluorine atom.

6. The composition according to claim 1, wherein the liquid-crystal compound is a discotic compound.

7. The composition according to claim 1, wherein at least one of the liquid-crystal compounds is a liquid-crystal compound of the following formula (DII) or a liquid-crystal compound of the following formula (DIII):

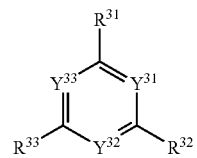

Formula (DII)

wherein $Y^{31}$, $Y^{32}$ and $Y^{33}$ each independently represent a methine group or a nitrogen atom; $R^{31}$, $R^{32}$ and $R^{33}$ each independently represent the following formula (DII-R):

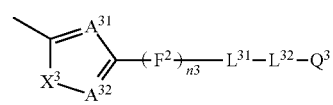

Formula (DII-R)

wherein $A^{31}$ and $A^{32}$ each independently represent a methine group or a nitrogen atom; $X^3$ represents an oxygen atom, a sulfur atom, a methylene group or an imino group; $F^2$ represents a bivalent cyclic linking group having a 6-membered cyclic structure; n3 indicates an integer of from 1 to 3; $L^{31}$ represents —O—, —O—CO—, —CO—O—, —O—CO—O—, —S—, —NH—, —SO$_2$—, —CH$_2$—, —CH=CH— or —C≡C—, $L^{32}$ represents a bivalent linking group selected from —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^3$ represents a polymerizing group or a hydrogen atom,

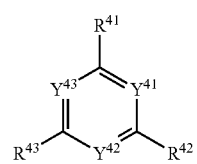

Formula (DIII)

wherein $Y^{41}$, $Y^{42}$ and $Y^{43}$ each independently represent a methine group or a nitrogen atom; $R^{41}$, $R^{42}$ and $R^{43}$ each independently represent the following formula (DIII-A), (DIII-B) or (DIII-C):

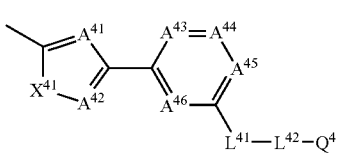

Formula (DIII-A)

wherein $A^{41}$, $A^{42}$, $A^{43}$, $A^{44}$, $A^{45}$ and $A^{46}$ each independently represent a methine group or a nitrogen atom; $X^{41}$ represents an oxygen atom, a sulfur atom, a methylene group or an imino group; $L^{41}$ represents —O—, —O—CO—, —CO—O—, —O—CO—O—, —S—, —NH—, —SO$_2$—, —CH$_2$—, —CH=CH— or —C≡C—, $L^{42}$ represents a bivalent linking group selected from —O—, —S—, —C(=O)—, —SO$_2$—, —NH—, —CH$_2$—, —CH=CH— and —C≡C—, a group formed by linking two or more of these, and when the group has a hydrogen atom, the hydrogen atom may be substituted with a substituent; $Q^4$ represents a polymerizing group or a hydrogen atom,

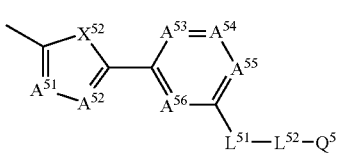

Formula (DIII-B)

wherein $A^{51}$, $A^{52}$, $A^{53}$, $A^{54}$, $A^{55}$ and $A^{56}$ each independently represent a methine group or a nitrogen atom; $X^{52}$ represents an oxygen atom, a sulfur atom, a methylene group or an imino group; $L^{51}$ represents —O—, —O—CO—, —CO—O—, —O—CO—O—, —S—, —NH—, —SO$_2$—, —CH$_2$—, —CH=CH— or —C≡C—, $L^{52}$ represents a bivalent linking group selected from —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^5$ represents a polymerizing group or a hydrogen atom,

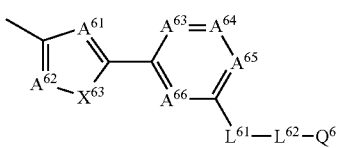

Formula (DIII-C)

wherein $A^{61}$, $A^{62}$, $A^{63}$, $A^{64}$, $A^{65}$ and $A^{66}$ each independently represent a methine group or a nitrogen atom; $X^{63}$ represents an oxygen atom, a sulfur atom, a methine group or an imino group; $L^{61}$ represents —O—, —O—CO—, —CO—O—, —O—CO—O—, —S—, —NH—, —SO$_2$—, —CH$_2$—, —CH=CH— or —C≡C—, $L^{62}$ represents a bivalent linking group selected from —O—, —S—, —C(=O)—, —SO$_2$—, —NH—, —CH$_2$—, —CH=CH— and —C≡C—, a group formed by linking two or more of these, and when the group has a hydrogen atom, the hydrogen atom may be substituted with a substituent; $Q^6$ represents a polymerizing group or a hydrogen atom.

8. The composition according to claim 1, which comprises at least one of a liquid-crystal compound represented by the following formula (DI) and at least one of a liquid-crystal compound represented by the following Formula (T) as the liquid-crystal compound:

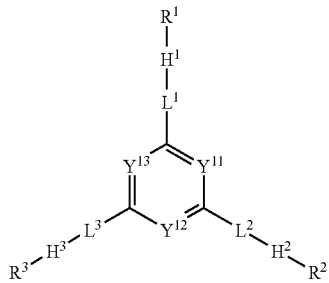

Formula (DI)

wherein $Y^{11}$, $Y^{12}$ and $Y^{13}$ each independently represent a methine group or a nitrogen atom; $L^1$, $L^2$ and $L^3$ each independently represent a single bond or a bivalent linking group; $H^1$, $H^2$ and $H^3$ each independently represent the following formula (DI-A) or (DI-B); $R^1$, $R^2$ and $R^3$ each independently represent the following formula (DI-R):

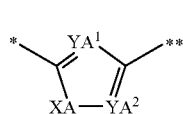

Formula (DI-A)

wherein $YA^1$ and $YA^2$ each independently represent a methine group or a nitrogen atom; XA represents an oxygen atom, a sulfur atom, a methylene group or an imino group; * indicates the position at which the formula bonds to any of $L^1$ to $L^3$; and ** indicates the position at which the formula bonds to any of $R^1$ to $R^3$,

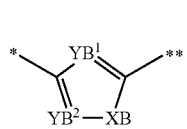

Formula (DI-B)

wherein $YB^1$ and $YB^2$ each independently represent a methine group or a nitrogen atom; XB represents an oxygen atom, a sulfur atom, a methylene group or an imino group; * indicates the position at which the formula bonds to any of $L^1$ to $L^3$; and ** indicates the position at which the formula bonds to any of $R^1$ to $R^3$,

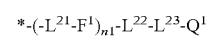

*-(-$L^{21}$-$F^1$)$_{n1}$-$L^{22}$-$L^{23}$-$Q^1$   Formula (DI-R)

wherein * indicates the position at which the formula bonds to $H^1$, $H^2$ or $H^3$ in formula (DI); $F^1$ represents a bivalent linking group having at least one cyclic structure; $L^{21}$ represents a single bond or a bivalent linking group; n1 indicates an integer of from 0 to 4; $L^{22}$ represents —O—, —O—CO—, —CO—O—, —O—CO—O—, —S—, —NH—, —SO$_2$—, —CH$_2$—, —CH=CH— or -C≡C—, $L^{23}$ represents a bivalent linking group selected from —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^1$ represents a polymerizing group or a hydrogen atom, Formula (T)

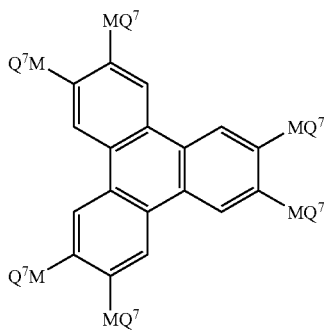

wherein M represents a bivalent linking group, which may be the same or different; $Q^7$ represents a polymerizable group or a hydrogen atom, which may be the same or different.

9. The composition according to claim 1, which comprises at least one of a liquid-crystal compound of the following formula (DII) and a liquid-crystal compound of the following formula (DIII), and at least one of a liquid-crystal compound represented by the following Formula (T) as the liquid-crystal compound:

Formula (DII)

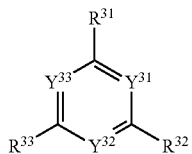

wherein $Y^{31}$, $Y^{32}$ and $Y^{33}$ each independently represent a methine group or a nitrogen atom; $R^{31}$, $R^{32}$ and $R^{33}$ each independently represent the following formula (DII-R):

Formula (DII-R)

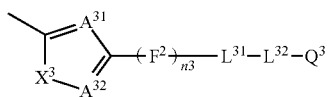

wherein $A^{31}$ and $A^{32}$ each independently represent a methine group or a nitrogen atom; $X^3$ represents an oxygen atom, a sulfur atom, a methylene group or an imino group; $F^2$ represents a bivalent cyclic linking group having a 6-membered cyclic structure; n3 indicates an integer of from 1 to 3; $L^{31}$ represents —O—, —O—CO—, —CO—O—, —O—CO—O—, —S—, —NH—, —SO$_2$—, —CH$_2$—, —CH=CH— or —C≡C—, $L^{32}$ represents a bivalent linking group selected from —O—, —S—, —SO$_2$—, —NH—, —CH$_2$—, —CH=CH— and —C≡C— a group formed by linking two or more of these, and when the group has a hydrogen atom, the hydrogen atom may be substituted with a substituent; $Q^3$ represents a polymerizing group or a hydrogen atom, Formula (DIII)

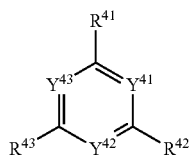

wherein $Y^{41}$, $Y^{42}$ and $Y^{43}$ each independently represent a methine group or a nitrogen atom; $R^{41}$, $R^{42}$ and $R^{43}$ each independently represent the following formula (DIII-A), (DIII-B) or (DIII-C):

Formula (DIII-A)

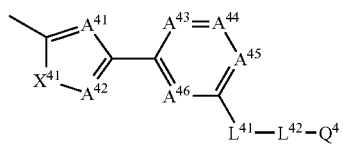

wherein $A^{41}$, $A^{42}$, $A^{43}$, $A^{44}$, $A^{45}$ and $A^{46}$ each independently represent a methine group or a nitrogen atom; $X^{41}$ represents an oxygen atom, a sulfur atom, a methylene group or an imino group; $L^{41}$ represents —O—, —O—CO—, —CO—O—, —O—CO—O—, —S—, —NH—, —SO$_2$—, —CH$_2$—, —CH=CH— or —C≡C—, $L^{42}$ represents a bivalent linking group selected from —O—, —S—, —C(=O)—, —SO$_2$—, —NH—, —CH$_2$—, —CH=CH— and —C≡C—, a group formed by linking two or more of these, and when the group has a hydrogen atom, the hydrogen atom may be substituted with a substituent; $Q^4$ represents a polymerizing group or a hydrogen atom, Formula (DIII-B)

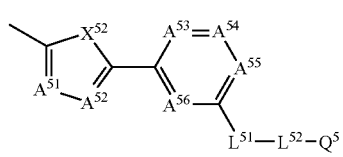

wherein $A^{51}$, $A^{52}$, $A^{53}$, $A^{54}$, $A^{55}$ and $A^{56}$ each independently represent a methine group or a nitrogen atom; $X^{52}$ represents an oxygen atom, a sulfur atom, a methylene group or an imino group; $L^{51}$ represents —O—, —O—CO—, —CO—O—, —O—CO—O—, —S—, —NH—, —SO$_2$—, —CH$_2$—, —CH=CH— or —C≡C—, $L^{52}$ represents a bivalent linking group selected from —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^5$ represents a polymerizing group or a hydrogen atom, Formula (DIII-C)

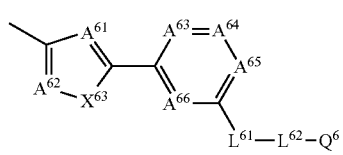

wherein $A^{61}$, $A^{62}$, $A^{63}$, $A^{64}$, $A^{65}$ and $A^{66}$ each independently represent a methine group or a nitrogen atom; $X^{63}$ represents an oxygen atom, a sulfur atom, a methine group or an imino group; $L^{61}$ represents —O—, —O—CO—, —CO—O—, —O—CO—O—, —S—, —NH—, —SO$_2$—, —CH$_2$—, —CH=CH— or —C≡C—, $L^{62}$ represents a bivalent linking group selected from —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent; $Q^6$ represents a polymerizing group or a hydrogen atom,

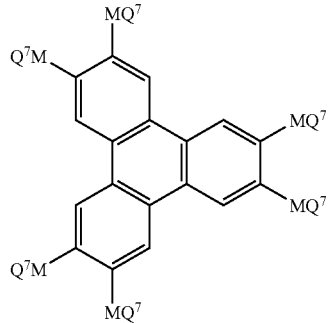

Formula (T)

wherein M represents a bivalent linking group, which may be the same or different; $Q^7$ represents a polymerizable group or a hydrogen atom, which may be the same or different.

10. A retardation plate having an optically-anisotropic layer formed with the composition according to claim 1.

11. A liquid-crystal display device having an optically-anisotropic layer formed with the composition according to claim 1.

12. The composition according to claim 1, wherein Mp in formula (A) is the following MP-1:

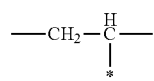

Mp-1 wherein * indicates the linking position to L;
and L is a bivalent linking group selected from —O—, —NR$^{a11}$— (where R$^{a11}$ represents a hydrogen atom, an aliphatic hydrocarbon group having from 1 to 10 carbon atoms), —S—, —C(=O)—, —S(=O)$_2$—, and a substituted or unsubstituted alkylene group having from 1 to 20 carbon atoms, and a group formed by linking two or more of these.

13. The composition according to claim 1, wherein L represents a group selected from the group consisting of the following L-1, L-3, L-4, L-5 and L-6:

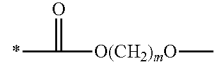 (L-1)

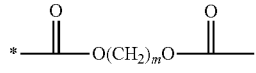 (L-3)

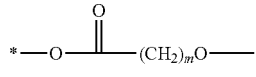 (L-4)

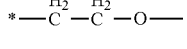 (L-5)

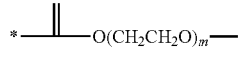 (L-6)

wherein * indicates the linking position to Mp; and m represents an integer of from 1 to 20.

14. The composition according to claim 1, wherein Mp in formula (A) is the following MP-1 and L represents a group selected from the group consisting of the following L-1, L-3, L-4, L-5 and L-6:

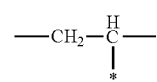 Mp-1 wherein * indicates the linking position to L;

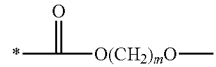 (L-1)

 (L-3)

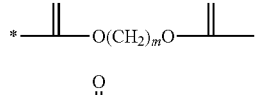 (L-4)

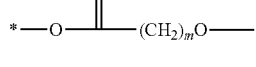 (L-5)

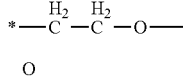 (L-6)

wherein * indicates the linking position to Mp; and m represents an integer of from 1 to 20.

* * * * *